United States Patent
Choudhary et al.

(10) Patent No.: US 10,726,029 B2
(45) Date of Patent: *Jul. 28, 2020

(54) SYSTEMS AND METHODS FOR DATABASE PROXY REQUEST SWITCHING

(71) Applicant: Citrix Systems, Inc., Fort Lauderdale, FL (US)

(72) Inventors: Akshat Choudhary, Bangalore (IN); Pratap Ramachandra, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 652 days.

This patent is subject to a terminal disclaimer.

(21) Appl. No.: 15/427,775

(22) Filed: Feb. 8, 2017

(65) Prior Publication Data
US 2017/0147656 A1   May 25, 2017

Related U.S. Application Data

(63) Continuation of application No. 13/327,253, filed on Dec. 15, 2011, now Pat. No. 9,589,029.
(Continued)

(51) Int. Cl.
*H04L 29/08* (2006.01)
*G06F 16/2458* (2019.01)
*G06F 16/25* (2019.01)

(52) U.S. Cl.
CPC ........ *G06F 16/2471* (2019.01); *G06F 16/256* (2019.01); *H04L 67/2814* (2013.01)

(58) Field of Classification Search
CPC ......... G06F 17/30545; G06F 16/24539; G06F 16/2471; G06F 16/256; H04L 67/2814
See application file for complete search history.

(56) References Cited

U.S. PATENT DOCUMENTS

| 6,115,703 A | 9/2000 | Bireley et al. |
| 6,567,806 B1 | 5/2003 | Tsuchida et al. |

(Continued)

FOREIGN PATENT DOCUMENTS

| CN | 1374606 A | 10/2002 |
| GB | 2 403 825 A | 1/2005 |

OTHER PUBLICATIONS

CN Office Action for Appl. No. 201180068661.2, dated Mar. 21, 2017.
(Continued)

*Primary Examiner* — Jean M Corrielus
(74) *Attorney, Agent, or Firm* — Foley & Lardner LLP

(57) ABSTRACT

The present application is directed towards systems and methods for selecting a database from a plurality of databases to forward a SQL query request based on a property of the SQL request. A device intermediary to a plurality of clients and databases may establish a plurality of connections to the plurality of databases. The device may receive, from a client of the plurality of clients, a request to execute a SQL query. The device may evaluate one or more properties of the request to execute the SQL query responsive to a policy. The device may select a database from the plurality of databases based on a result of evaluation of the one or more properties of the request to execute the SQL query. The device may forward the request to execute the SQL query to the selected database via a connection of the plurality of connections.

20 Claims, 39 Drawing Sheets

Related U.S. Application Data

(60) Provisional application No. 61/427,696, filed on Dec. 28, 2010.

(56) References Cited

U.S. PATENT DOCUMENTS

| | | | |
|---|---|---|---|
| 6,598,058 B2 | | 7/2003 | Bird et al. |
| 6,950,848 B1 | * | 9/2005 | Yousefi'zadeh ........... G06F 9/50 |
| | | | 707/999.01 |
| 7,831,621 B1 | * | 11/2010 | Banks ................. G06F 21/6227 |
| | | | 707/790 |
| 7,962,513 B1 | * | 6/2011 | Boles ...................... H04L 63/20 |
| | | | 707/781 |
| 8,484,287 B2 | | 7/2013 | Gavini et al. |
| 8,893,259 B2 | * | 11/2014 | Agarwal ........... H04L 29/08846 |
| | | | 726/15 |
| 8,904,475 B2 | * | 12/2014 | Mullick .............. H04L 63/0272 |
| | | | 726/1 |
| 8,955,033 B2 | * | 2/2015 | Khemani ................ G06F 9/468 |
| | | | 726/1 |
| 9,235,618 B2 | | 1/2016 | Sharma et al. |
| 9,292,587 B2 | | 3/2016 | Kann et al. |
| 2002/0129145 A1 | | 9/2002 | Chow |
| 2003/0065646 A1 | | 4/2003 | Joseph et al. |
| 2003/0135505 A1 | | 7/2003 | Hind et al. |
| 2005/0021511 A1 | | 1/2005 | Zarom |
| 2005/0094582 A1 | * | 5/2005 | Forissier ........... H04L 29/06027 |
| | | | 370/261 |
| 2006/0129528 A1 | | 6/2006 | Miyamoto et al. |
| 2006/0146877 A1 | | 7/2006 | Srivastava |
| 2006/0156023 A1 | | 7/2006 | Luo et al. |
| 2006/0167883 A1 | * | 7/2006 | Boukobza ........... H04L 67/1095 |
| 2006/0271557 A1 | | 11/2006 | Harward et al. |
| 2006/0274761 A1 | | 12/2006 | Error et al. |
| 2007/0073703 A1 | | 3/2007 | Quin |
| 2007/0198684 A1 | | 8/2007 | Mizushima |
| 2007/0203910 A1 | * | 8/2007 | Ferguson ................ G06F 16/27 |
| 2008/0225720 A1 | | 9/2008 | Khemani et al. |
| 2008/0320007 A1 | * | 12/2008 | Hind .................... G06F 16/252 |
| 2009/0271385 A1 | * | 10/2009 | Krishnamoorthy .......................... |
| | | | G06F 16/24532 |
| 2010/0132009 A1 | | 5/2010 | Khemani et al. |
| 2010/0242092 A1 | | 9/2010 | Harris et al. |
| 2011/0072217 A1 | | 3/2011 | Hoang et al. |
| 2012/0023077 A1 | * | 1/2012 | Kann ................... G06F 16/275 |
| | | | 707/702 |
| 2012/0023554 A1 | | 1/2012 | Murgia et al. |

OTHER PUBLICATIONS

EP Examination Report for Appl. No. 11810724.2, dated Nov. 6, 2017.
Das, et al., "Ricardo: Integrating R and Hadoop", SIGMOD' 10, Jun. 6-11, 2010, pp. 987-998.
English Translation of the First Chinese Office Action on 2011800686612 dated Feb. 5, 2016.
International Preliminary Report on Patentability dated Jul. 25, 2013 in PCT Application No. PCT/US2011/065241.
International Search Report and Written Opinion dated Jul. 11, 2013 in PCT Application No. PCT/US2011/065241.
Second Office Action for Chinese Patent Application No. 201180068661.2, dated Sep. 23, 2016.
U.S. Notice of Allowance on U.S. Appl. No. 13/327,253, dated Oct. 24, 2016.
U.S. Office Action on U.S. Appl. No. 13/327,253, dated Jan. 28, 2014.
U.S. Office Action on U.S. Appl. No. 13/327,253, dated Jan. 28, 2015.
U.S. Office Action on U.S. Appl. No. 13/327,253, dated Sep. 3, 2013.
U.S. Office Action on U.S. Appl. No. 13/327,253, dated Sep. 3, 2014.
U.S. Office Action on U.S. Appl. No. 13/327,253, dated Dec. 24, 2015.
U.S. Office Action on U.S. Appl. No. 13/327,253 dated May 19, 2016.
First Examination Report for IN Appl. No. 5889/CHENP/2013, dated Oct. 16, 2019.
Examination Report for EP Appl. No. 11810724.2, dated Dec. 11, 2019.

* cited by examiner

| Service Name | Monitor Name | Activity | Probe Time |
|---|---|---|---|
| Service 1 | Monitor 1 | Non-Schedulable | Time 1 |
| Service 1 | Monitor 2 | Schedulable | Time 2 |
| .... | .... | .... | .... |
| Service 1 | Monitor n1 | Schedulable | Time 3 |
| Service 2 | Monitor 1 | Schedulable | Time 4 |
| Service 2 | Monitor 2 | Non-Schedulable | Time 5 |
| .... | .... | .... | .... |
| Service 2 | Monitor n2 | Schedulable | Time 6 |
| Service N | Monitor 1 | Non-Schedulable | Time 7 |
| Service N | Monitor 2 | Non-Schedulable | Time 8 |
| .... | .... | .... | .... |
| Service N | Monitor nN | Schedulable | Time 9 |

Table 600

*FIG. 6B*

SYSTEMS AND METHODS FOR DATABASE PROXY REQUEST SWITCHING

CROSS-REFERENCE TO RELATED APPLICATIONS

The present application is a continuation of and claims priority to U.S. Non-Provisional patent application Ser. No. 13/327,253, titled "SYSTEMS AND METHODS FOR DATABASE PROXY REQUEST SWITCHING", and filed Dec. 15, 2011, which claims the benefit of and priority to U.S. Provisional Patent Application No. 61/427,696, titled "SYSTEMS AND METHODS FOR DATABASE PROXY REQUEST SWITCHING", and filed Dec. 28, 2010, all of which are incorporated herein by reference in their entirety for all purposes.

FIELD OF THE DISCLOSURE

The present application generally relates to data communication networks. In particular, the present application relates to systems and methods for providing database proxy services.

BACKGROUND OF THE DISCLOSURE

A typical network incorporates a plurality of intermediaries between servers and clients to facilitate communication and to provide a variety of network services. The servers may be application or webservers, providing various types of information and/or services to other servers or clients. However, as the types and amount of information increases exponentially, managing this becomes more complex as well. Databases and database servers are increasingly common and integrated with network systems to store, organize and provide various types of information. In particular, database servers generally operate according to a client-server relationship with another network device. Database servers may communicate using one or more protocols, but commonly using Standard Query Language (SQL).

BRIEF SUMMARY

The present application is directed towards systems and methods for providing database proxy services between a database server and a client. In some embodiments, a network appliance serves as an intermediary or proxy between the database server and a client. The appliance may provide one or more database-related services, including but not limited to server-side connection multiplexing, load balancing, database health monitoring, authentication, database caching, SQL firewall, and content switching for scalable databases. To support at least some of these services, the appliance may be configured to support the SQL language and/or one or more database protocols. The appliance may be configured to adapt some of the available services for supporting application or web servers, to support database servers. For example, policy expressions for HTTP transactions may be modified or extended to support SQL-related protocols. In some other aspects, service monitors may be modified or extended to provide monitoring for databases. Further, the appliance for supporting the database-related services may include a multi-core architecture (also referred to herein as a "multi-core system").

In one aspect, the disclosure is directed to a method for selecting by an intermediary device a database from a plurality of databases to forward a structured query language (SQL) query request based on a property of the SQL request. The method may include establishing, by a device intermediary to a plurality of clients and a plurality of databases, a plurality of connections to the plurality of databases. The device may receive, from a client of the plurality of clients, a request to execute a structured query language (SQL) query. The device may evaluate, responsive to a policy, one or more properties of the request to execute the SQL query. The device may select a database from the plurality of databases based on a result of evaluation of the one or more properties of the request to execute the SQL query. The device may forward the request to execute the SQL query to the selected database via a connection of the plurality of connections.

In some embodiments, the device establishes a pool of connections to each database of the plurality of databases. The device may multiplex structured query language (SQL) requests from the plurality of clients via the pool of connections to a database of the plurality of databases. The policy may specify an expression to evaluate the one or more properties comprising a characteristic of a database connection for the request to execute the SQL query comprising one of the following: identification of an authenticated user, a name of the database, a character set sent by the client and client's capabilities. The policy may specify an expression to evaluate the one or more properties of the request to execute the SQL query. The one or more properties may include command parameters of the request for the SQL query comprising one or more of the following: a size of the request and a type of command. In some embodiments, the policy may specify an expression to evaluate the one or more properties of the request to execute the SQL query comprising a grammar part and a data part of the SQL query.

In certain embodiments, a load balancer may select the database from the plurality of databases based on least connection load balancing. The device may determine, responsive to the result of the evaluation, that the request to execute the SQL query comprises a write query and selecting the database comprising a master database in a master and slave configuration. The device may determine, responsive to the result of the evaluation, that the request for the SQL query comprises a read query and selecting the database comprising a slave database in a master and slave configuration. The device may determine, responsive to the result of the evaluation, that the SQL query is for the database corresponding to one or more of a predetermined user, a predetermined database name and a predetermined table.

In another aspect, the disclosure is directed to a system for selecting by an intermediary device a database from a plurality of databases to forward a structured query language (SQL) query request based on a property of the SQL request. The system may include a device intermediary to a plurality of clients and a plurality of databases. The device may establish a plurality of connections to the plurality of databases. A database proxy of the device may receive from a client of the plurality of clients, a request to execute a structured query language (SQL) query. A policy engine of the database proxy may evaluate, responsive to a policy, one or more properties of the request to execute the SQL query. The database proxy may select a database from the plurality of databases based on a result of evaluation of the one or more properties of the request to execute the SQL query. The database proxy may forward the request to execute the SQL query to the selected database via a connection of the plurality of connections.

In some embodiments, the device establishes a pool of connections to each database of the plurality of databases. The database proxy may multiplex structured query language (SQL) requests from the plurality of clients via the pool of connections to a database of the plurality of databases. The policy may specify an expression to evaluate the one or more properties comprising a characteristic of a database connection for the request to execute the SQL query comprising one of the following: identification of an authenticated user, a name of the database, a character set sent by the client and client's capabilities. The policy may specify an expression to evaluate the one or more properties of the request to execute the SQL query. The one or more properties may include command parameters of the request for the SQL query comprising one or more of the following: a size of the request and a type of command. The policy may specify an expression to evaluate the one or more properties of the request to execute the SQL query comprising a grammar part and a data part of the SQL query.

In some embodiments, a load balancer of the device selects the database from the plurality of databases based on least connection load balancing. The database proxy, responsive to the result of the evaluation by the policy engine, may determine that the request to execute the SQL query comprises a write query and selecting the database comprising a master database in a master and slave configuration. The database proxy, responsive to the result of the evaluation by the policy engine, may determine that the request for the SQL query comprises a read query and selecting the database comprising a slave database in a master and slave configuration. The database proxy, responsive to the result of the evaluation by the policy engine, may determine that the SQL query is for the database corresponding to one or more of a predetermined user, a predetermined database name and a predetermined table.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 6B is a block diagram of an embodiment of a table on a core used for monitoring in a multi-core system;

Figure 1A:
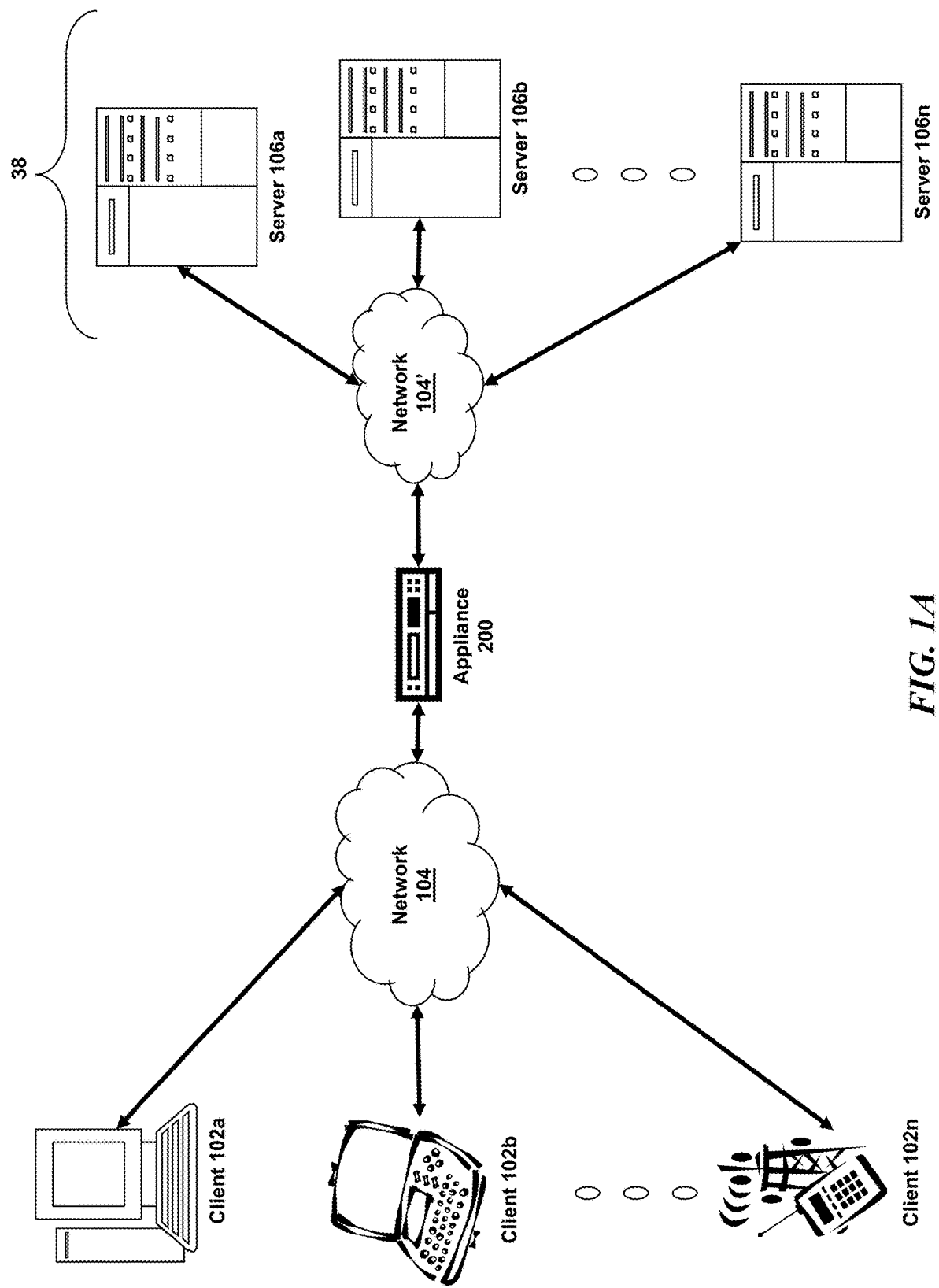
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE DISCLOSURE

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment; Section F describes embodiments of systems and methods for monitoring in a multi-core system.

Section G describes embodiments of systems and methods for configuring and using object-oriented policy expressions;

Section H describes embodiments of systems and methods for handling undefined policy expressions;

Section I describes embodiments of systems and methods for configuring and using policy groups; and Section J describes embodiments of systems and methods for database proxy request switching.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network.

In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
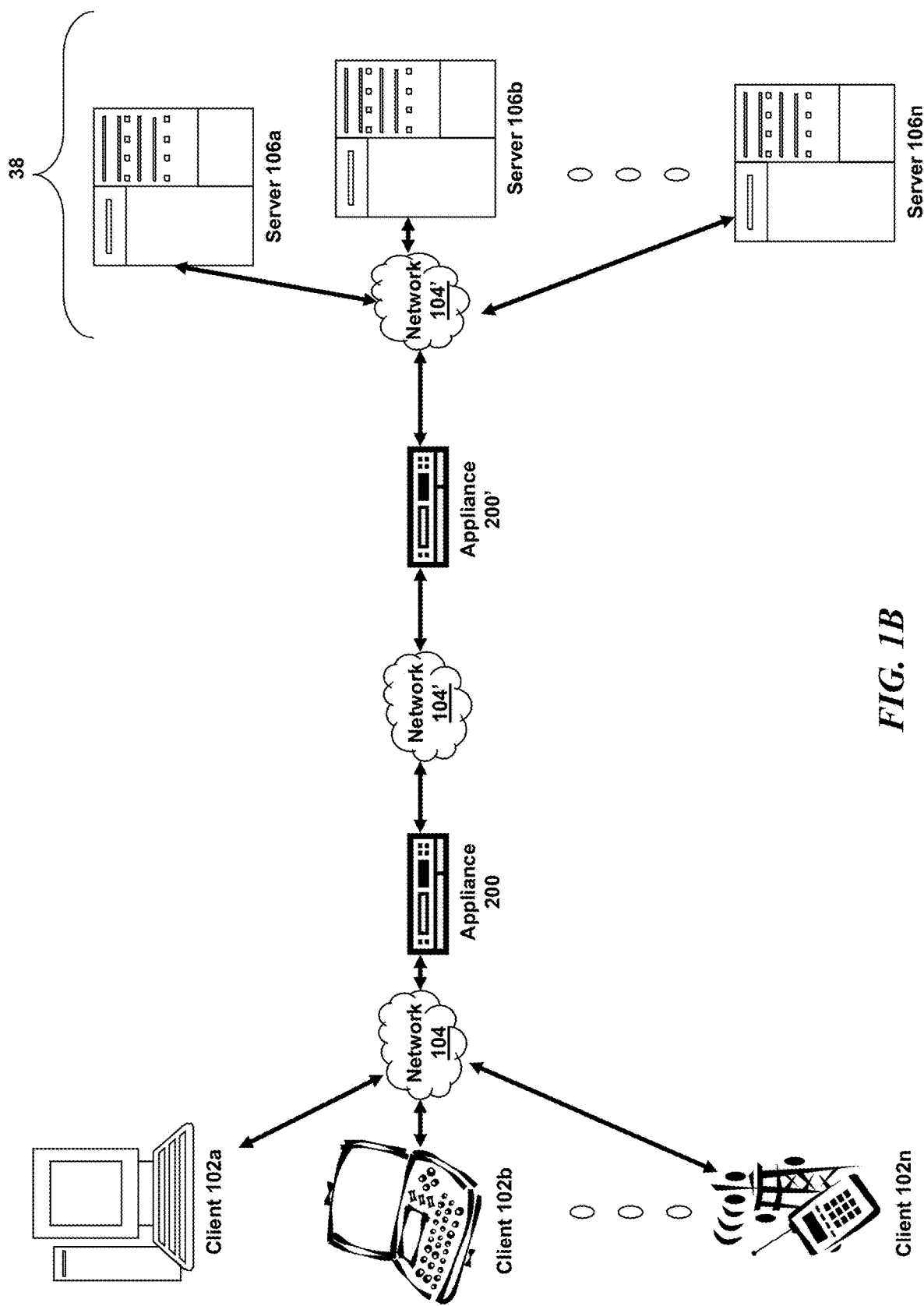
FIG. 1B is a block diagram of an embodiment of an environment for delivering a computing environment from a server to a client via an appliance.
Figure 1C:
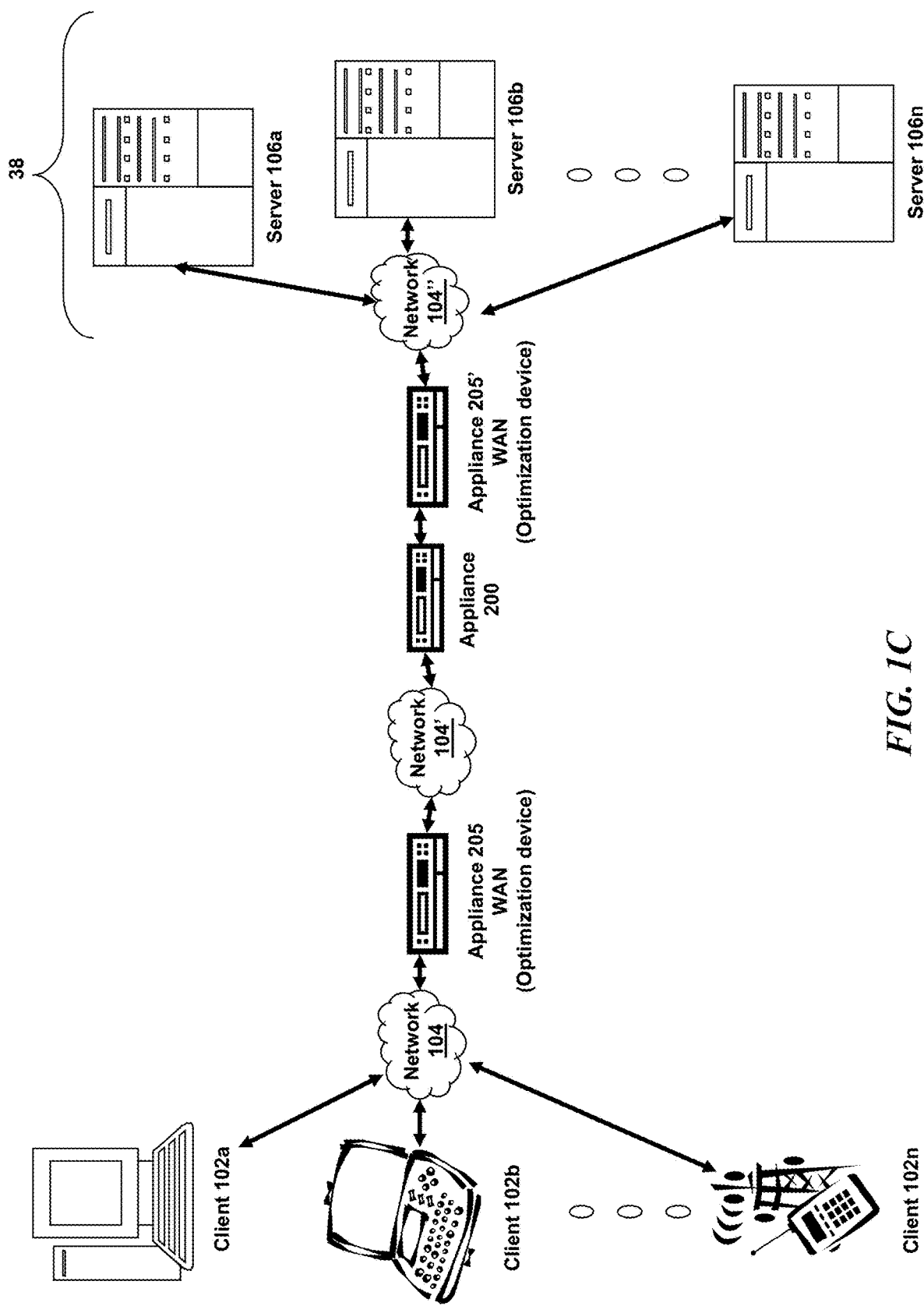
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
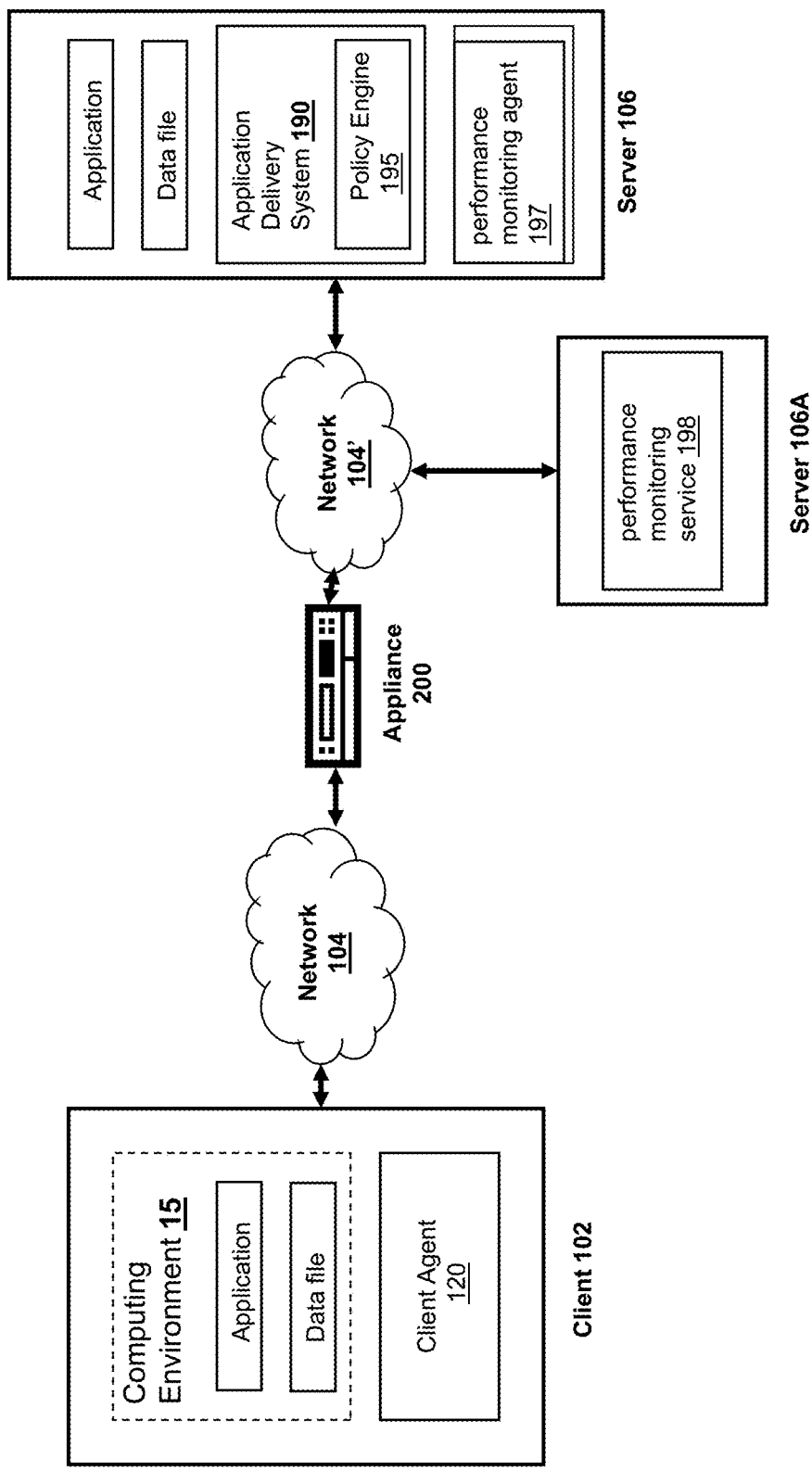
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/ or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
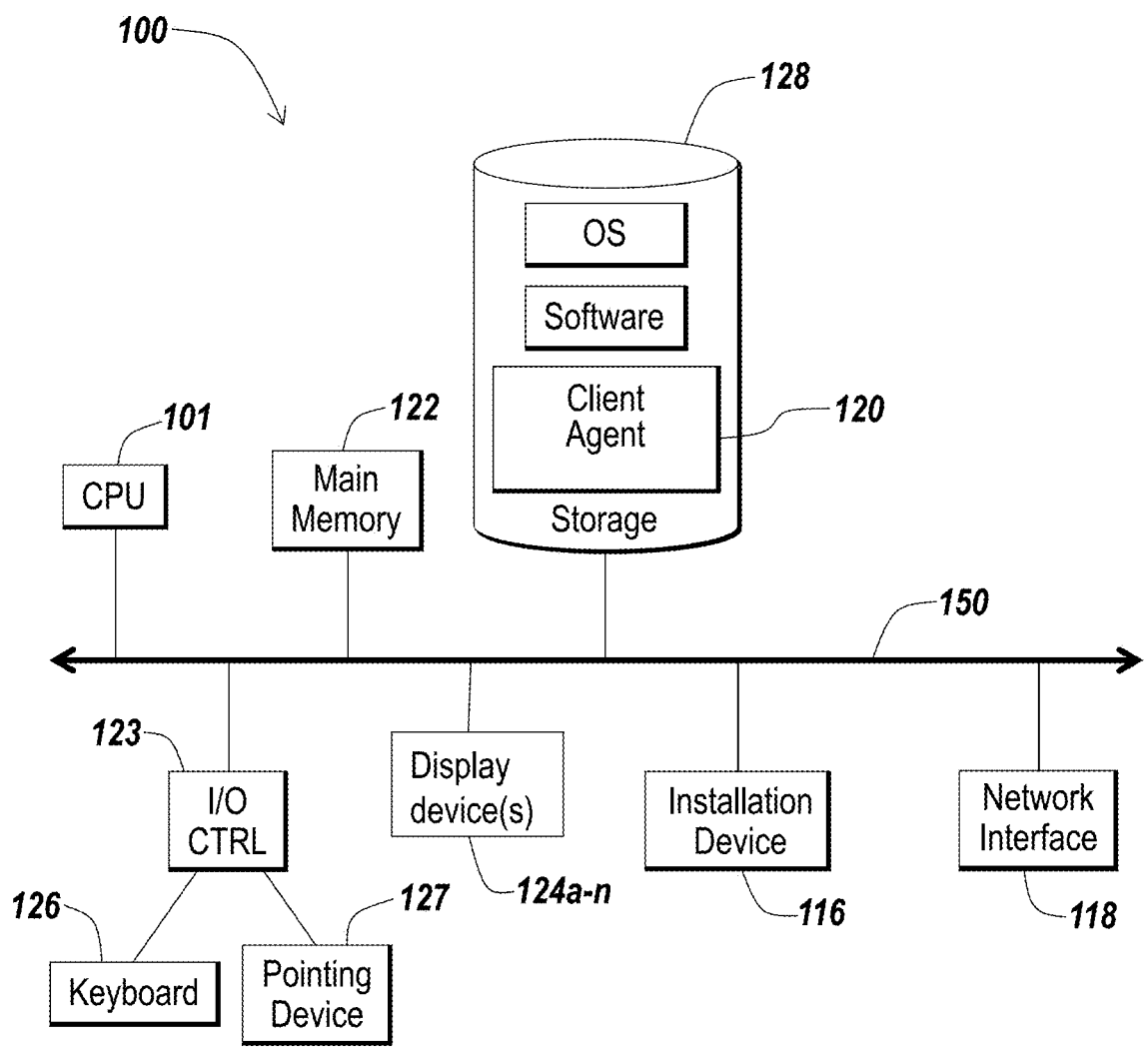
FIGS. 1E-1H are block diagrams of embodiments of a computing device.
Figure 1F:
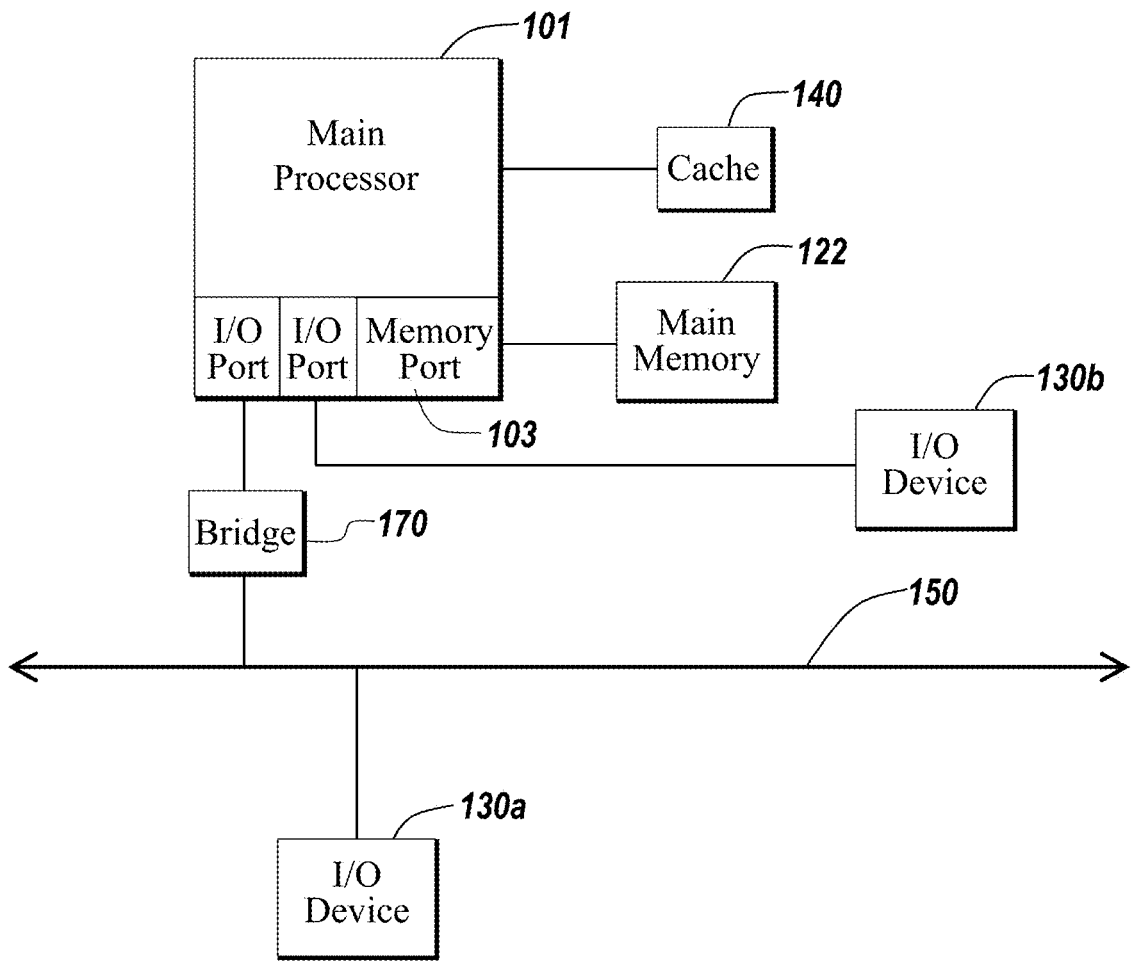

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
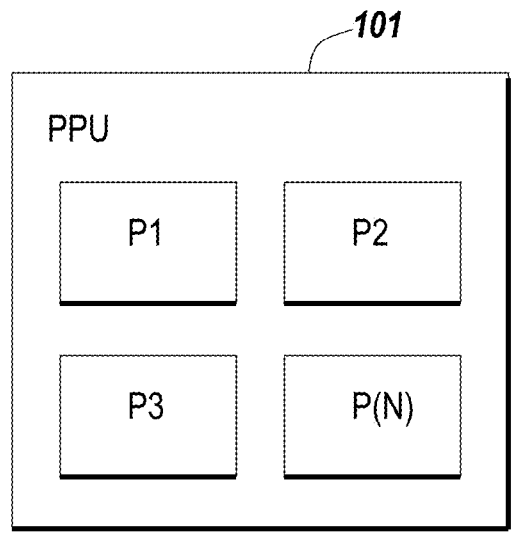

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
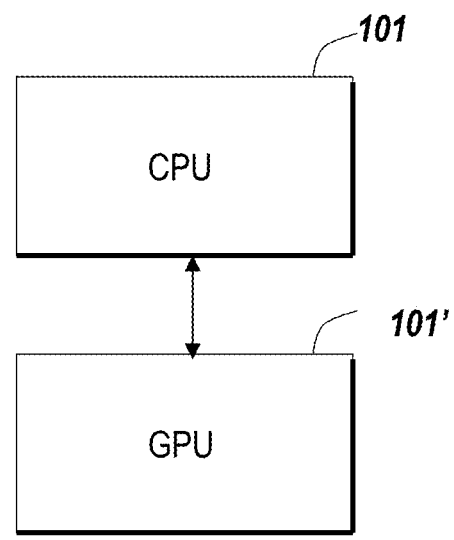

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
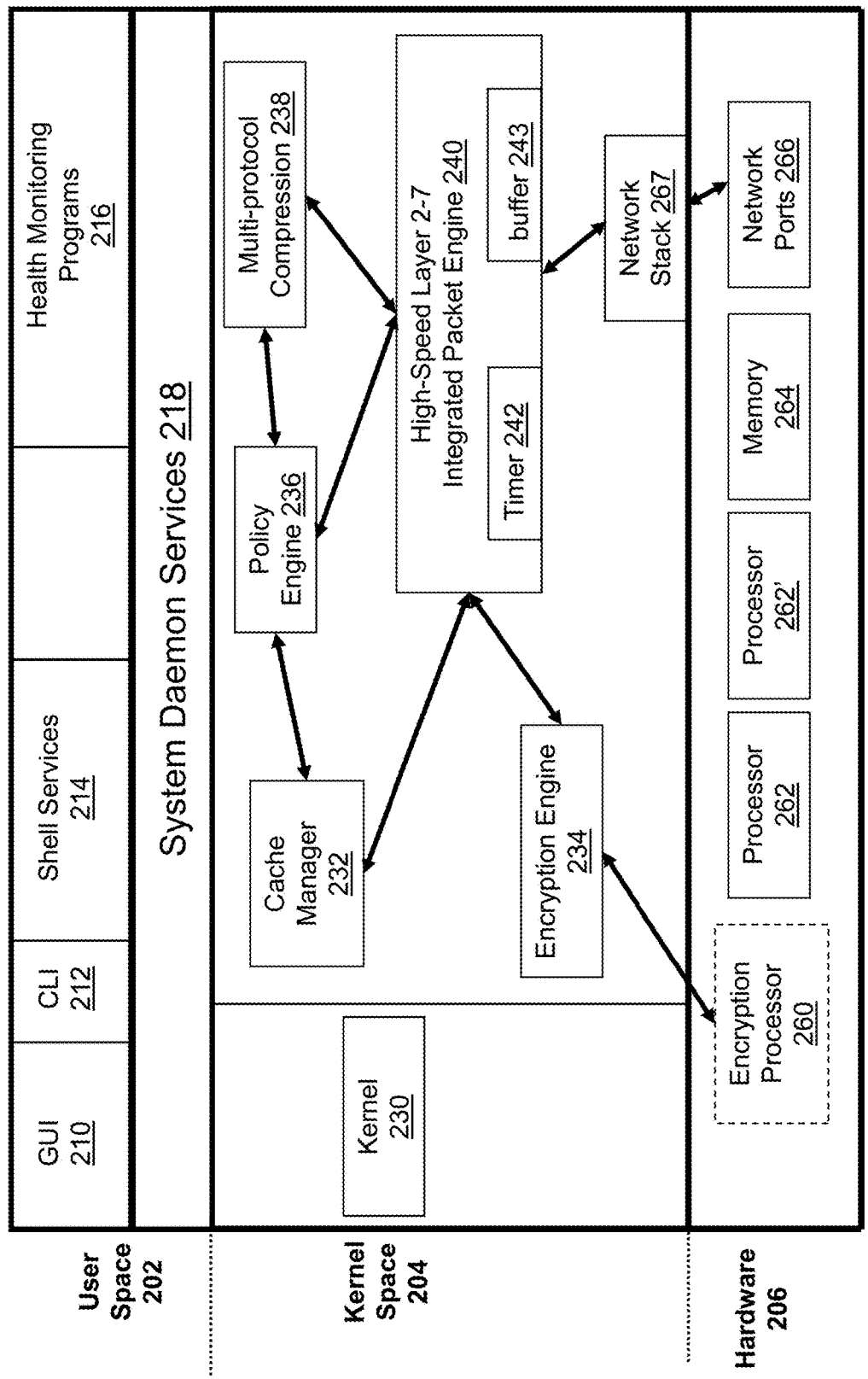
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
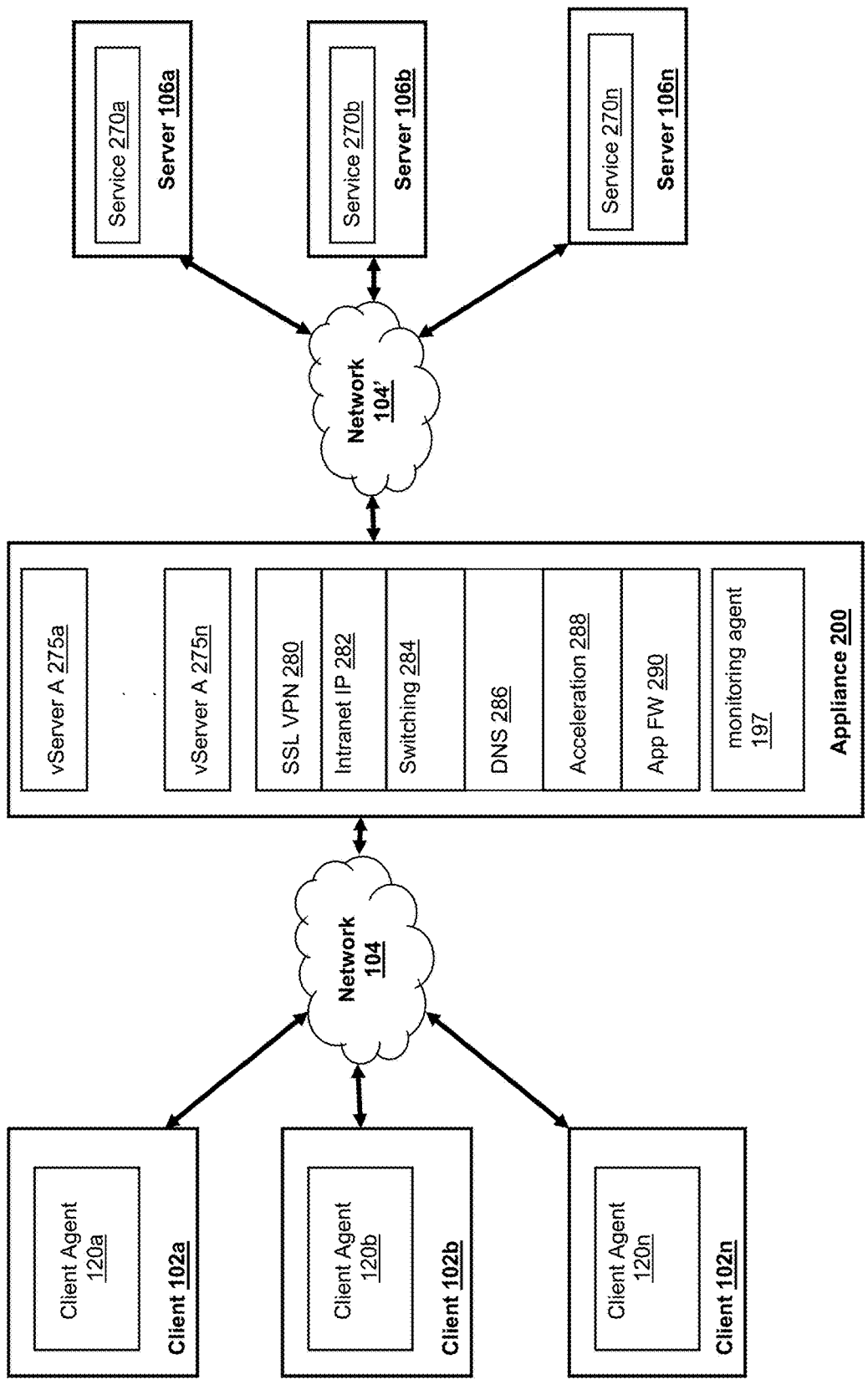
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
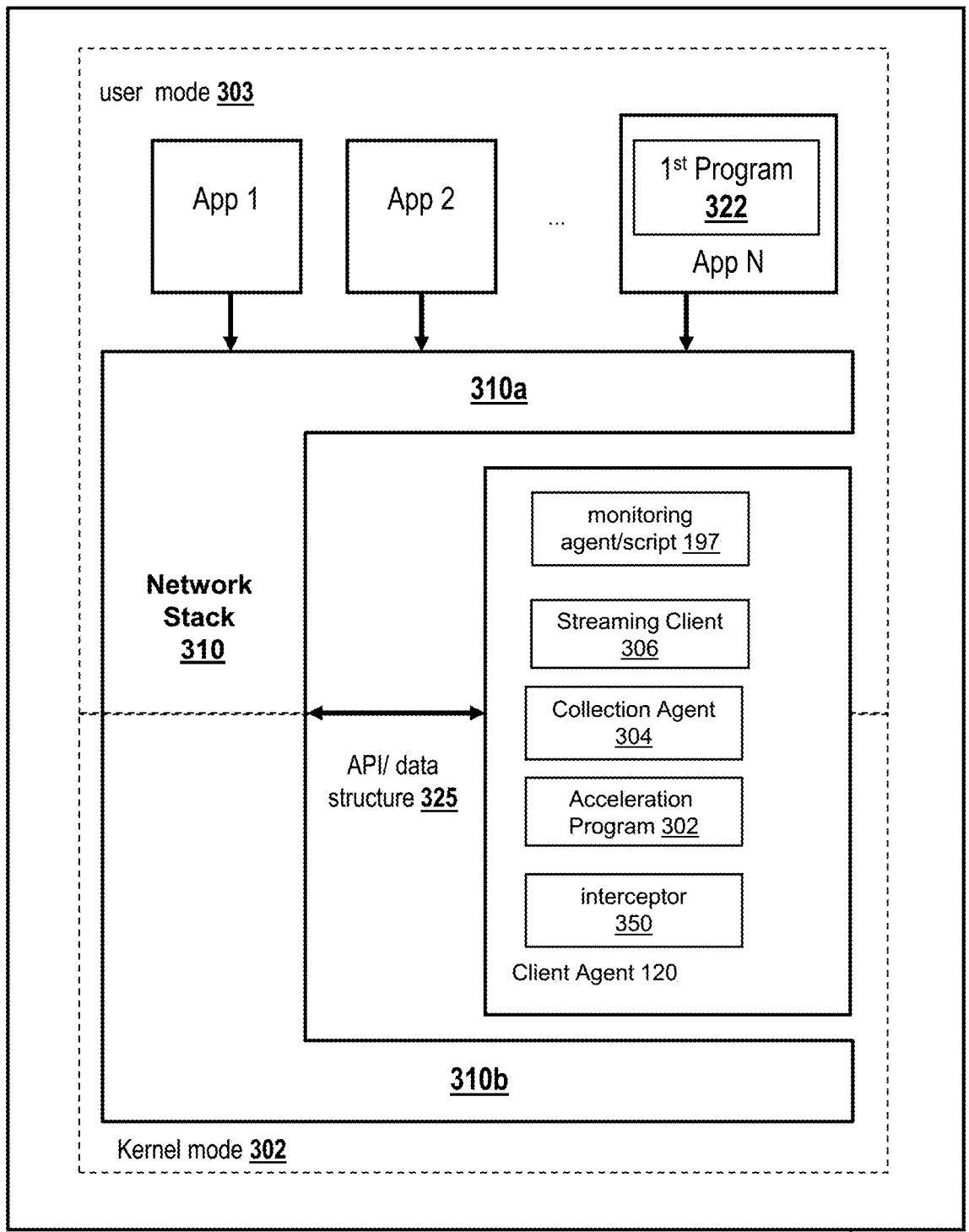
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
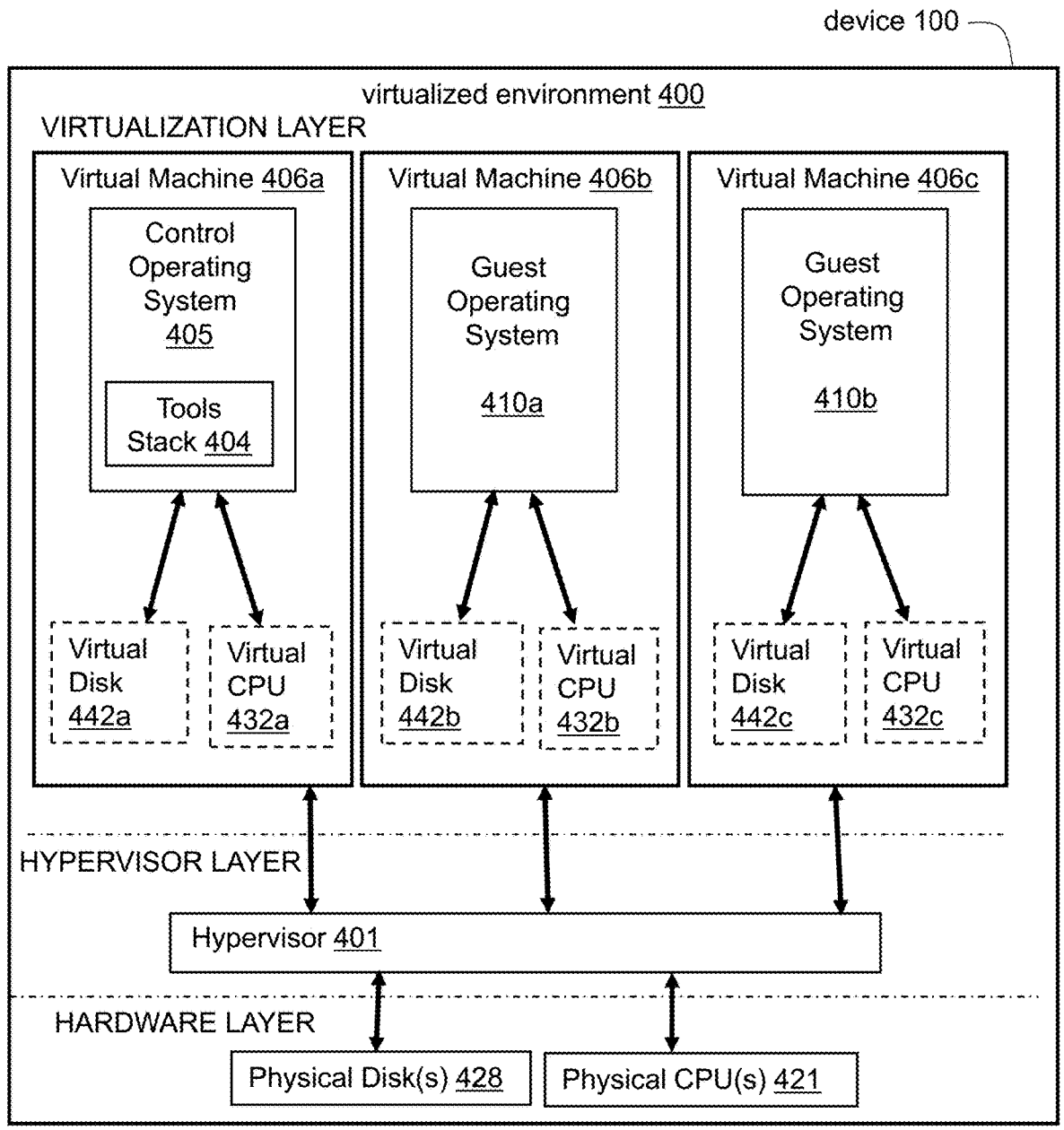
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432*a*, 432*b*, 432*c* (generally 432), and virtual disks 442*a*, 442*b*, 442*c* (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410*a*, 410*b* (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406*a-c* (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405*a* on a computing device 100*a* may exchange data with a control operating system 405*b* on a computing device 100*b*, via communications between a hypervisor 401*a* and a hypervisor 401*b*. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
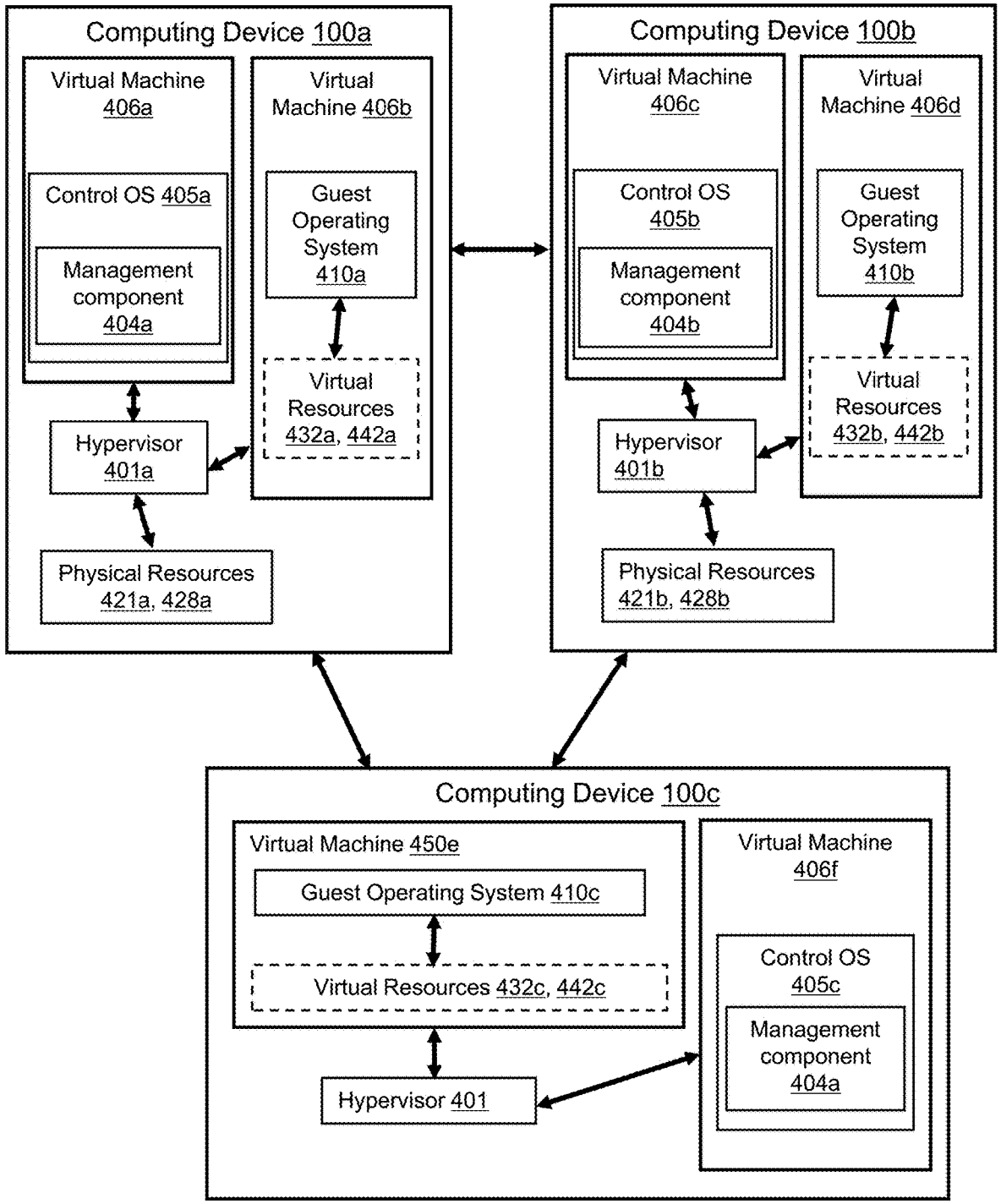
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
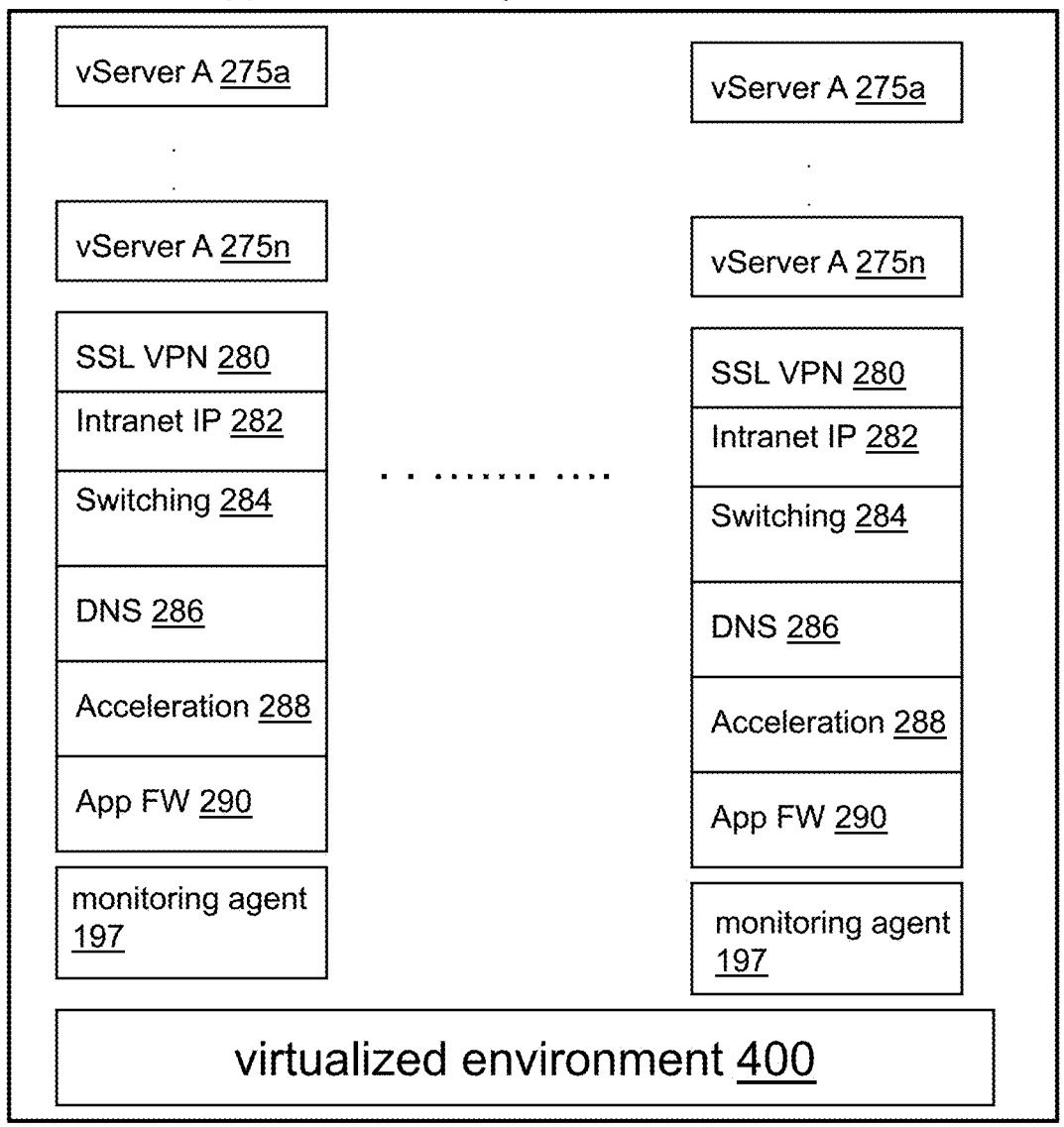
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
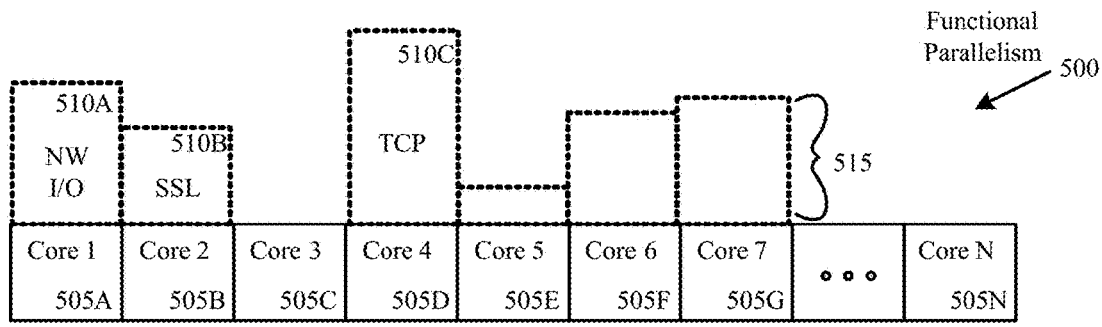
FIG. 5A are block diagrams of embodiments of approaches to implementing parallelism in a multi-core system.
Figure 5A:
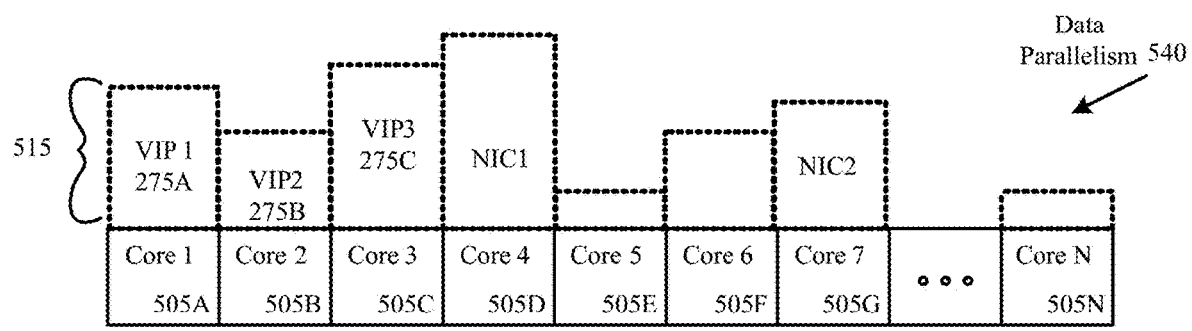
Figure 5A:
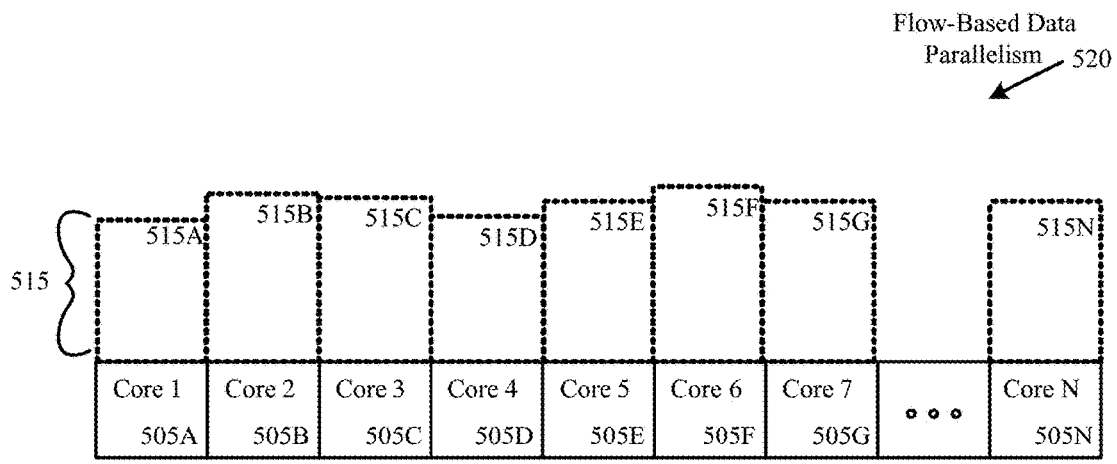

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of then cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
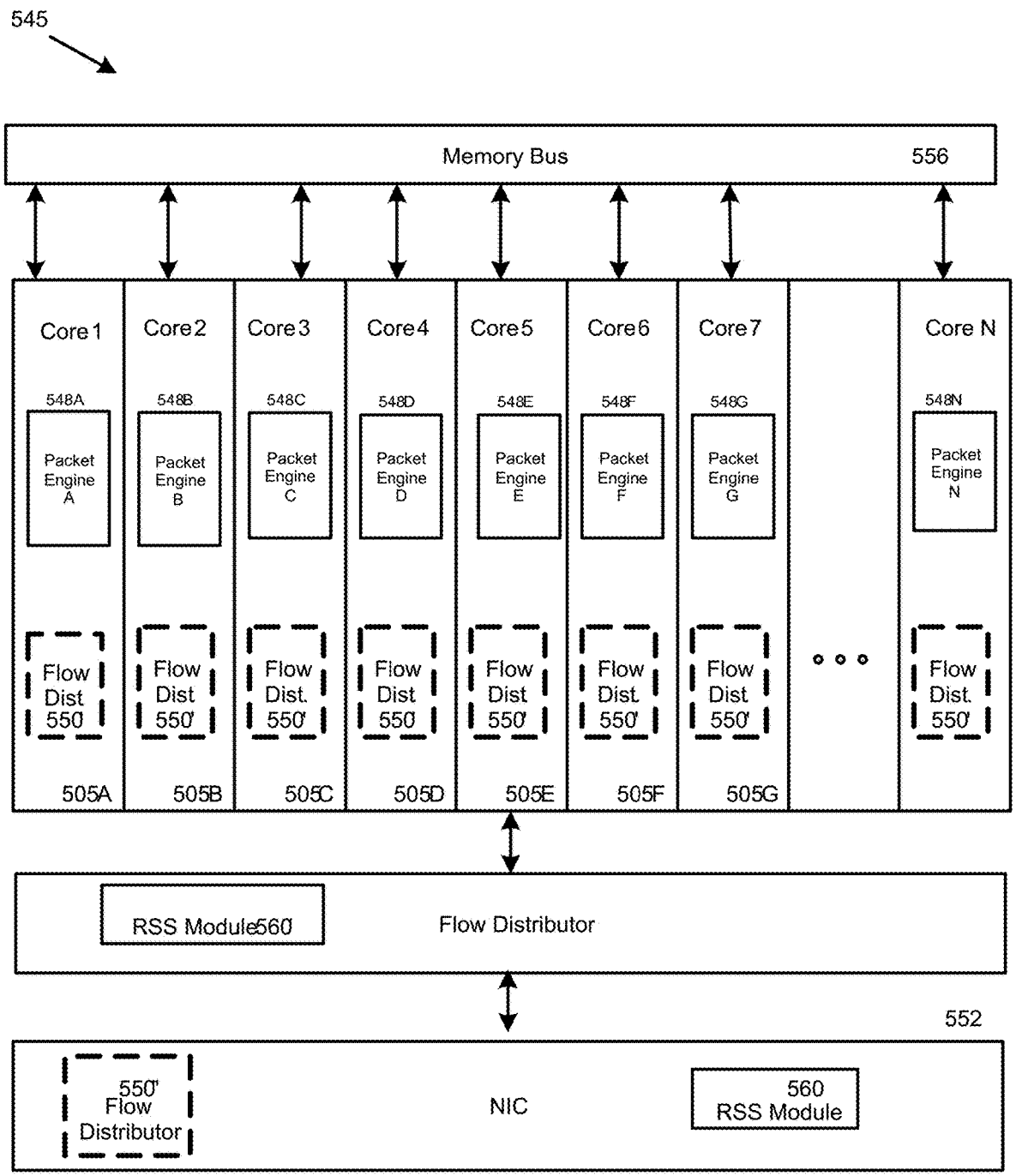
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505. The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:
- 4-tuple of source TCP Port, source IP version 4 (IPv4) address, destination TCP Port, and destination IPv4 address.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hash result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550'' can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
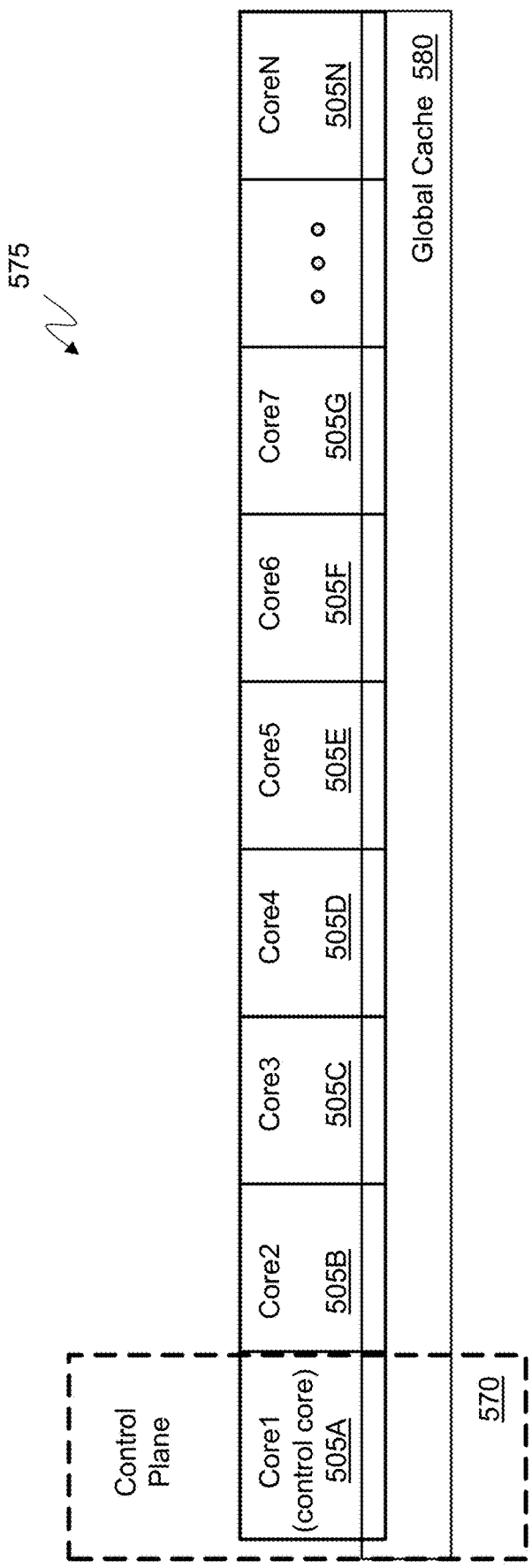
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505.

In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Monitor Distribution in Multi-Core Systems

The systems and methods described herein are directed towards monitor distribution in multi-core systems. In general overview, the systems and methods distribute ownership of monitors for services and ownership of monitoring of services, each of which may have one or more associated monitors, over a plurality of cores. If a core owns or is responsible for a monitor for a service, the core may be responsible for sending probes to the service according to the monitor and receiving the result of each probe. If a core owns or is responsible for monitoring of a service, the core may be responsible for tracking the state of the service by processing the results of probes sent to the service by itself or other cores. As a result, the workload for monitoring and tracking the state of services may be distributed across the plurality of cores.

Each core in the plurality of cores may be responsible for monitors for services, and each core may send probes to the services according to the monitors and receive the results. If a core is not responsible for the service, the core may send the results of its probes for the service to the owner core. If a core owns the service, and is thus responsible for tracking the state of the service, the core may determine the state of the service. The core may determine the state of the service by processing the results of probes for the service. The core may determine the state of the service by processing the results of probes sent by itself, probes sent by other cores, or both. The owner core may send messages to other cores regarding the state of the service or a change in the state. The owner core responsible for the service may be considered or referred to as the consolidator of the monitoring for the service.

A core may be generally described herein as being an owner of a service or owning monitoring of a service. If a core owns a service, the core or the packet processing engine on the core may take responsibility for establishing and/or maintaining a state of the service for the multi-core system. In another aspect, a core that owns a service may be a core or packet processing engine that is designated as the core or the packet processing engine of the plurality of cores and/or plurality of packet engines of the multi-core system to be responsible for monitoring the service.

Figure 6A:
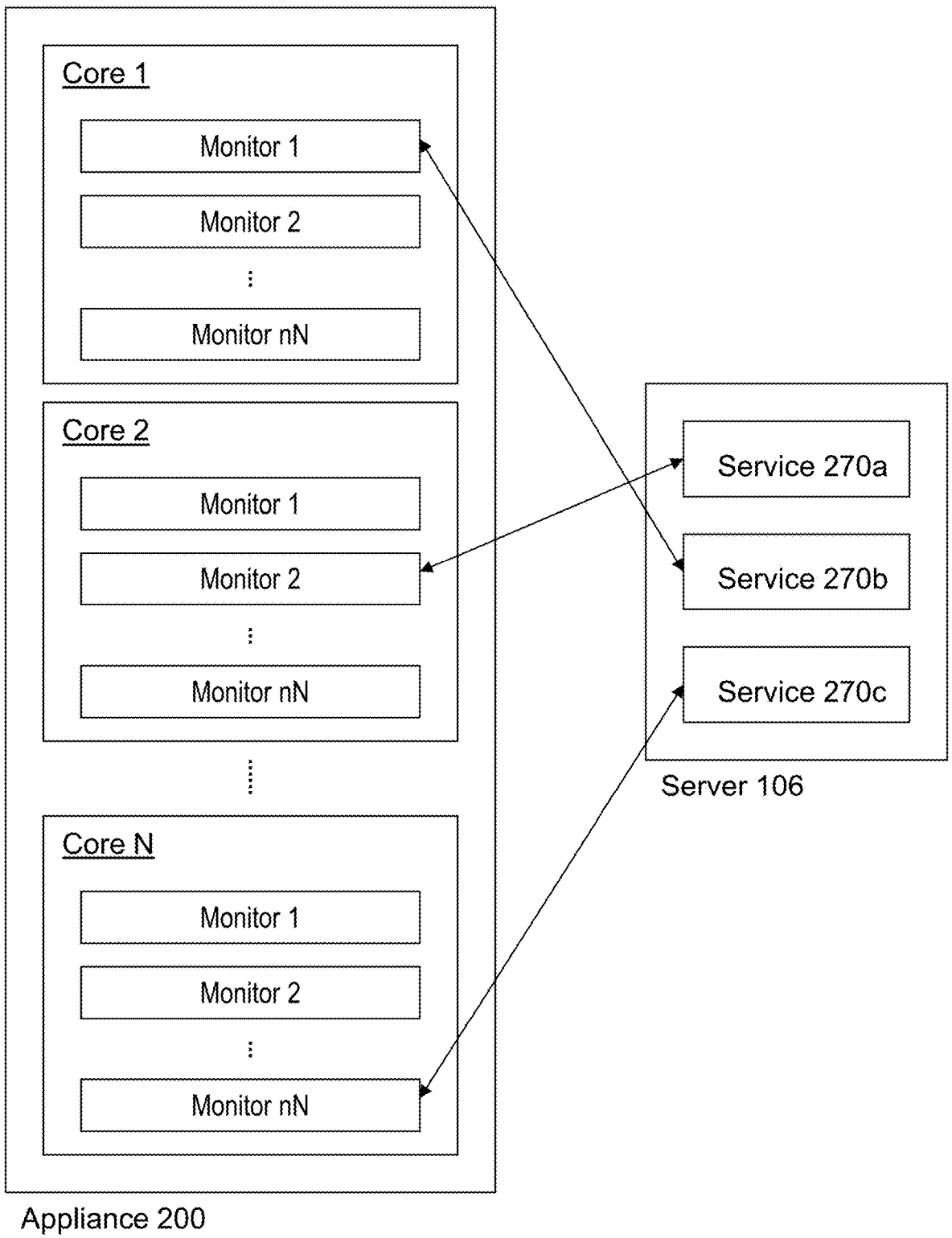
FIG. 6A is a block diagram of an appliance for using a plurality of monitoring agents to monitor network services.

Referring now to FIG. 6A, a block diagram of an appliance 200 using a plurality of monitoring agents on a plurality of cores to monitor a plurality of network services is shown. In brief overview, an appliance 200 comprises a plurality of monitoring agents arranged in a table. Each of the plurality of cores may include a copy of the table, which is described in fuller detail in FIG. 6B. Each of the plurality of monitoring agents is assigned to monitor a service. In one embodiment, each of the plurality of monitoring agents may be assigned a weight. Monitoring agents may also be referred to as probes.

Still referring to FIG. 6A, an appliance 200 comprises a plurality of monitoring agents or monitors. A monitoring agent may comprise any program, script, daemon, or other computing routine that reports a performance or operational characteristic of a network service 270 to the appliance 200. A monitoring agent may communicate with a network service 270 once, or on a predetermined frequency, such as every 1 msec or 1 sec. In some embodiments, a monitoring agent may use a request/reply messaging mechanism or protocol with the server. In other embodiments, a monitoring agent may have a custom or proprietary exchange protocol for communicating with the server. In some embodiments, a single monitoring agent may monitor a plurality of servers. In other embodiments, a plurality of agents may monitor a single server. In still other embodiments, a plurality of monitoring agents may each monitor a plurality of servers, wherein each of the plurality of servers is monitored by a plurality of monitoring agents.

In the embodiment shown, the one or more monitoring agents are associated with one or more network services 270. In other embodiments, the one or more monitoring agents may monitor an appliance 200, vServer, network service 270, client, database, database server or any other network resource. In one embodiment, a user specifies a type of network service to associate with the one or more monitoring agents. In another embodiment, a user customizes a monitoring agent. In still another embodiment, a generic monitoring agent is used. In yet another embodiment, the one or more monitoring agents determine the response time of the one or more network services 270 for responding to a request of one of the following types: ping, transport control protocol (tcp), tcp extended content verification, hypertext transfer protocol (http), http extended content verification, hypertext transfer protocol secure (https), https extended content verification, user datagram protocol, domain name service, and file transfer protocol.

In some embodiments, the one or more monitoring agents are protocol-specific agents (e.g., for SQL, TCP, HTTP, etc), each agent determining availability for a network service of a particular protocol-type. In some embodiments, a monitoring agent determines a response time of a server 106 or network service 270 to a TCP request. In one of these embodiments, the agent uses a "TCP/ICMP echo request" command to send a datagram to the network service 270, receive a datagram from the network service 270 in response, and determine a response time based on the roundtrip time of the datagram. In another of these embodiments, the monitoring agent verifies that the response from the network service 270 included expected content and did not contain errors.

In other embodiments, a monitoring agent determines availability of a network service 270 to a UDP request. In one of these embodiments, the agent uses a "UDP echo" command to send a datagram to the network service 270, receive a datagram from the network service 270 in response, and determine a response time based on the roundtrip time of the datagram. In another of these embodiments, the monitoring agent verifies that the response from the network service 270 included expected content and did not contain errors. In still other embodiments, the monitoring agent determines availability of a network service 270 to an FTP request. In one of these embodiments, the monitoring agent sends an FTP command, such as a "get" command or a "put" command, to the network service 270 and determines a time needed by the network service 270 to respond to the command. In another of these embodiments, the monitoring agent verifies that the response from the network service 270 included expected content, such as contents of a file requested by a "get" command, and did not contain errors.

In yet other embodiments, the monitoring agent determines availability of a network service 270 to an HTTP request. In one of these embodiments, the monitoring agent sends an HTTP command, such as a "get" request for a uniform resource locator (URL) or a file, to the network service 270 and determines a time needed by the network service 270 to respond to the request. In another of these embodiments, the monitoring agent verifies that the response from the network service 270 included expected content, such as the contents of a web page identified by the URL, and did not contain errors.

In further embodiments, the monitoring agent determines availability of a network service 270 to a DNS request. In one of these embodiments, the monitoring agent sends a DNS request, such as a dnsquery or nslookup for a known network address, to the server 106 or network service 270 and determines a time needed by the server 106 or network service 270 to respond to the request. In another of these embodiments, the monitoring agent verifies that the response from the network service 270 included expected content, such as the domain name of a computing device 100 associated with the known network address, and did not contain errors.

A monitoring agent may be assigned a weight by a network appliance 200. A weight may comprise an integer, decimal, or any other numeric indicator. In some embodiments, a user may configure the weight corresponding to a given monitoring agent. In some embodiments, all monitoring agents may be assigned equal weight. In other embodiments, a plurality of monitoring agents may each be assigned different weights. The weights may be assigned to the monitors based on any criteria indicating relative importance, including without limitation importance of the monitored service, reliability of the monitoring mechanism, and the frequency of monitoring.

In one embodiment, a monitoring agent may be assigned a weight based on the relative importance of the service the appliance monitors. For example, if most user requests in a given environment were HTTP requests, a monitoring agent monitoring HTTP availability of a server 106 might be assigned a weight of 10, while a monitoring agent monitoring FTP availability of a server 106 might be assigned a weight of 3. Or, for example, if an administrator placed a high priority on UDP applications, a monitoring agent monitoring UDP availability of a server may be assigned a weight of 20, while a DNS monitoring agent may be assigned a weight of 5.

In some embodiments, an appliance 200 may compute a sum of the weights of the monitoring agents currently reporting a network service 270 as operational. For example, if five monitoring agents, each assigned a weight of 30, are monitoring a network service 270, and three of the five monitoring agents report the network service 270 as available, the appliance may determine the sum of the monitoring agents currently reporting the network service 270 as operational to be 90. Or for example, if only two monitoring agents, one with a weight of 20 and the other with a weight of 40, are reporting a server 106 as available, the appliance may compute the sum of the monitoring agents currently reporting a server 106 as operational to be 60.

Referring now to FIG. 6B, a block diagram of an embodiment of a table 600 used for monitoring services in a multi-core system is depicted. The table 600 may be store on or in communication with a packet processing engine 548. Each packet processing engine 548 may be associated with a table 600. The entries of the tables 600 associated with the packet processing engines 548 may include copies of information regarding the monitors.

In brief overview, the table 600 may include entries corresponding to monitors for services. Each entry may correspond to a monitor. Each entry in the table 600 may include fields of information associated with the monitor. The fields of information may include the service name, the monitor name, the activity status of the monitor with respect to the core, and the next time the monitor is scheduled to send a probe to the service (also referred to herein as the "probe time"). In some embodiments, the fields of information may include the identity of the core that owns the service being monitored. In some embodiments, the fields of information may include the identity of the core that owns the monitor. In many embodiments, the fields of information may include the weight assigned to the monitor.

In various embodiments, a packet processing engine 548 may create an entry in the table 600 when the packet processing engine 548 receives an instruction from the multi-core device 545 to create a monitor for a service. In some embodiments, the multi-core device 545 may send the instruction to create a monitor to the packet processing engine 548 that will own the monitor. In other embodiments, the multi-core device 545 may send the instruction to create the monitor to all the packet processing engines 548. In some of these embodiments, each packet processing engine 548 may create an entry for the monitor in its respective tables 600 according to the instruction. In other of these embodiments, a packet processing engine 548 may disregard the instruction to create a monitor if the packet processing engine 548 will not own the monitor.

The packet processing engine 548 may process the instruction to create the entry in the table 600. In some embodiments, the packet processing engine 548 may process the instruction via parsing. In some embodiments, the packet processing engine 548 may parse the instruction into the service name, the monitor name, and the information for the monitoring schedule. In other embodiments, the packet processing engine 548 may parse the instruction into the service name, the number of monitors for the service, and information for the monitoring schedules. In many embodiments, the packet processing engine 548 may create a new entry in the table 600 and store the service name and the monitor name. In additional embodiments, the packet processing engine 548 may create multiple entries according to the number of monitors for the service, according to the instruction. In these embodiments, the packet processing engine 548 may store, for each entry, the service name and a monitor name chosen according to a predetermined method. In many embodiments, the packet processing engine 548 may store, for each entry, the information for the monitoring schedule. In additional embodiments, the packet processing engine 548 may store, for any entry, any information obtained by further parsing of the instruction.

The packet processing engine 548 may access the information for the monitoring schedule stored for an entry to calculate a next probe time for a monitor. The packet processing engine 548 may then store the next probe time for the monitor. In many embodiments, the information for the monitoring schedule may include a frequency of monitoring. In various embodiments, the information for the monitoring schedule may include a formula to calculate the next probe time. In some embodiments, upon sending a probe to a service, the packet processing engine 548 may calculate the next probe time and overwrite the obsolete probe time for the entry. In other embodiments, the packet processing engine 548 may delete the entry and create a new entry for the monitor with the next probe time.

The packet processing engine 548 may determine the owner of the monitor according to a predetermined algorithm, as described in further detail below. The packet processing engine 548 may configure the activity status of the monitor with respect to the core according to the determination. If the packet processing engine 548 determines the core owns the monitor, the activity status of the monitor may be set to "schedulable." As a result, the packet processing engine 548 schedules probes for the service according to the monitor's activity status. If the packet processing engine 548 determines the core does not own the monitor, the activity status of the monitor may be set to "non-schedulable." As a result, the packet processing engine 548 does not schedule probes for the service according to the monitor's activity status.

Figure 6C:
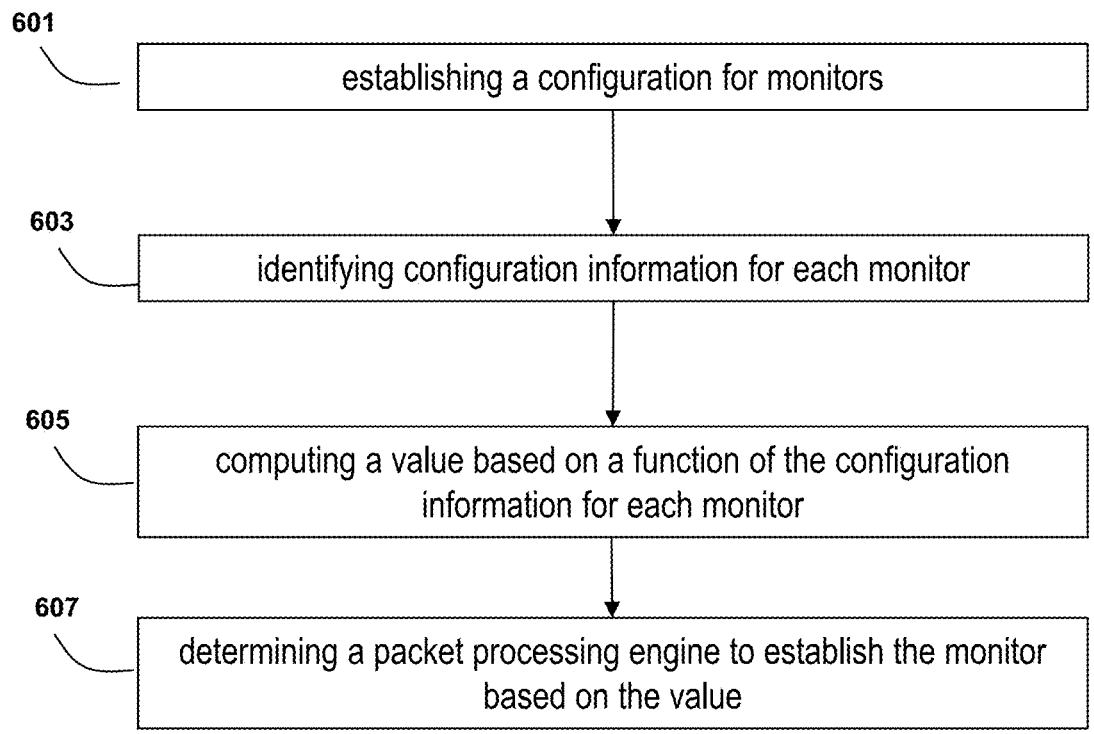
FIG. 6C is a flow diagram of an embodiment of a method for configuring a table used for monitoring in a multi-core system.

Referring now to FIG. 6C, a flow diagram depicting an embodiment of steps of a method for configuring a table used for monitoring services in a multi-core system is shown and described. In brief overview, the method includes establishing (step 601) a configuration for monitors. The configuration may identify a plurality of monitors to monitor one or more services managed by a plurality of packet processing engines operating on each of the plurality of cores. The method further includes identifying (step 603) for each of the plurality of packet processing engines, from the configuration, a monitor name and service name for each monitor of the plurality of monitors. The method further includes computing (step 605), by each of the plurality of packet processing engines, for each monitor of the plurality of monitors a value based on a function of the monitor name and the service name. The method further includes determining (step 607), by each of the plurality of packet processing engines, a packet processing engine from the plurality of packet processing engines to establish the monitor for the service based on the value corresponding to an identifier of the packet processing engine. Although the steps are described with respect to one packet processing engine operating on one core, methods for configuring tables by each of the packet processing engines would be apparent to one of ordinary skill in the art.

In further detail, at step 601, the packet processing engine 548 may establish the configuration for monitors by allocating memory and creating a table for the monitors. The packet processing engine 548 may create entries for the table in response to instructions from the multi-core device to create monitors for services. The packet processing engine 548 may process the instructions to obtain the fields for the entries. For example, the packet processing engine 548 may parse an instruction to obtain the service name and the monitor name.

The multi-core system may use any type and form of monitor configuration to establish one or more monitors. The configuration may be established via a set of one or more commands or instructions, such as a set of commands received via the graphical user interface (GUI) 210 or the command line interface (CLI) 212, as described in FIG. 2A. In some embodiments, the packet processing engine 548 may parse an instruction of a configuration to determine a type of monitor. In some embodiments, the packet processing engine 548 may parse an instruction to determine a type of monitor. For example, the packet processing engine 548 may determine that the monitor probes the state of a service, a least response time of a service, a dynamic response time of the service, or any other characteristic of the service. In additional embodiments, the packet processing engine 548 may parse the instruction to obtain the weight of the monitor. The packet processing engine 548 may parse an instruction to obtain information for a monitoring schedule. The packet processing engine 548 may use the information for the monitoring schedule to calculate the next probe time. In any of these embodiments, the packet processing engine 548 may store in an entry any of the information obtained by parsing an instruction to create monitor or any information derived from the parsing.

The packet processing engine 548 may establish the entries of the table 600 in any order. In some embodiments, the packet processing engine 548 establishes entries in the order that the packet processing engine 548 receives instructions to create the monitors. In other embodiments, the packet processing engine 548 establishes entries in order of the service and monitor names. In further embodiments, the packet processing engine 548 establishes entries in order of the probe times. In some embodiments, the packet processing engine 548 establishes entries according to ownership of the monitors. For example, the packet processing engine 548 may group monitors the packet processing engine 548 owns apart from the monitors that belong to other cores.

At step 603, the packet processing engine 548 may identify configuration information for each monitor. In some embodiments, the packet processing engine 548 may identify a monitor name and a service name for each monitor from fields in the entry for each monitor. The packet processing engine 548 may load copies of the monitor and service names into a buffer for additional processing. The packet processing engine may identify other configuration information for each monitor as identified in table 600. In various embodiments, the packet processing engine 548 may identify the type of monitor, the weight of the monitor, the identity of the core that owns the monitor, the identity of the core that owns the service associated with the monitor, or any other configuration information.

At step 605, for each monitor, the packet processing engine 548 may compute a value based on any configuration information for a monitor. In some embodiments, the packet processing engine 548 may compute a value using a function of the monitor name and service name. In various embodiments, the monitor name may be an identifier of a monitor. In many embodiments, the service name may be an identifier of a service. In numerous embodiments, the packet processing engine 548 may compute a value based on a function of any configuration information, such as the monitor name, service name, type of monitor, weight of the monitor, identity of the core that owns the monitor, identity of the core that owns the service associated with the monitor, or any combination thereof. The function or the result of the function may be used to identify the owner of the monitor. The result may be used as a lookup or index into a table that identifies cores. The function may be a hash function that identified an index into an indirection table to select the core. As a result, the value may correspond to an identifier of a packet processing engine. The packet processing engine 548 may compute the value using any function that results in a desired distribution of monitor ownership among the packet processing engines 548. The packet processing engine 548 may compute the value using copies of the monitor name, service name, or any other configuration information loaded into a buffer.

In some embodiments, the packet processing engine 548 computes the value according to the sums of the ASCII values of the monitor and service names. In these embodiments, the packet processing engine 548 may add the sum of ASCII values of the monitor name to the sum of ASCII values of the service name. In one of these embodiments, the packet processing engine 548 may divide this sum by the number of packet processing engines. In another of these embodiments, the packet processing engine 548 may perform a modulo operation upon the sum according to the number of packet processing engines. In further embodiments, the packet processing engine 548 may create a variable that stores the number of monitors that have been created. In these embodiments, the packet processing engine 548 may add the sum of the ASCII values of the service name to the number of created monitors. The packet processing engine 548 may then divide the sum by the number of packet processing engines or perform a modulo operation according to the number of packet processing engines. After the packet processing engine 548 computes the value, the packet processing engine 548 may increment the variable to account for the newly created monitor.

The packet processing engine 548 may determine the packet processing engine to establish the monitor for the service based on the computed value. In some embodiments, the packet processing engine 548 may compare the computed value to a value assigned to the packet processing engine 548 upon boot-up, wherein the value indicates the packet processing engine 548's order among the plurality of packet processing engines. In other embodiments, the packet processing engine 548 may compare the computed value to an identifier of the packet processing engine 548. If the comparison indicates the packet processing engine 548 owns the monitor, the packet processing engine 548 sets the activity status of the monitor to "schedulable." As a result, the packet processing engine 548 will schedule probes for the service according to the monitor. If the comparison indicates that the packet processing engine 548 does not own the monitor, the packet processing engine 548 sets the activity status of the monitor to "non-schedulable." As a result, the packet processing engine 548 does not schedule probes for the service, although the information for the monitor will remain in the table 600.

Figure 6D:
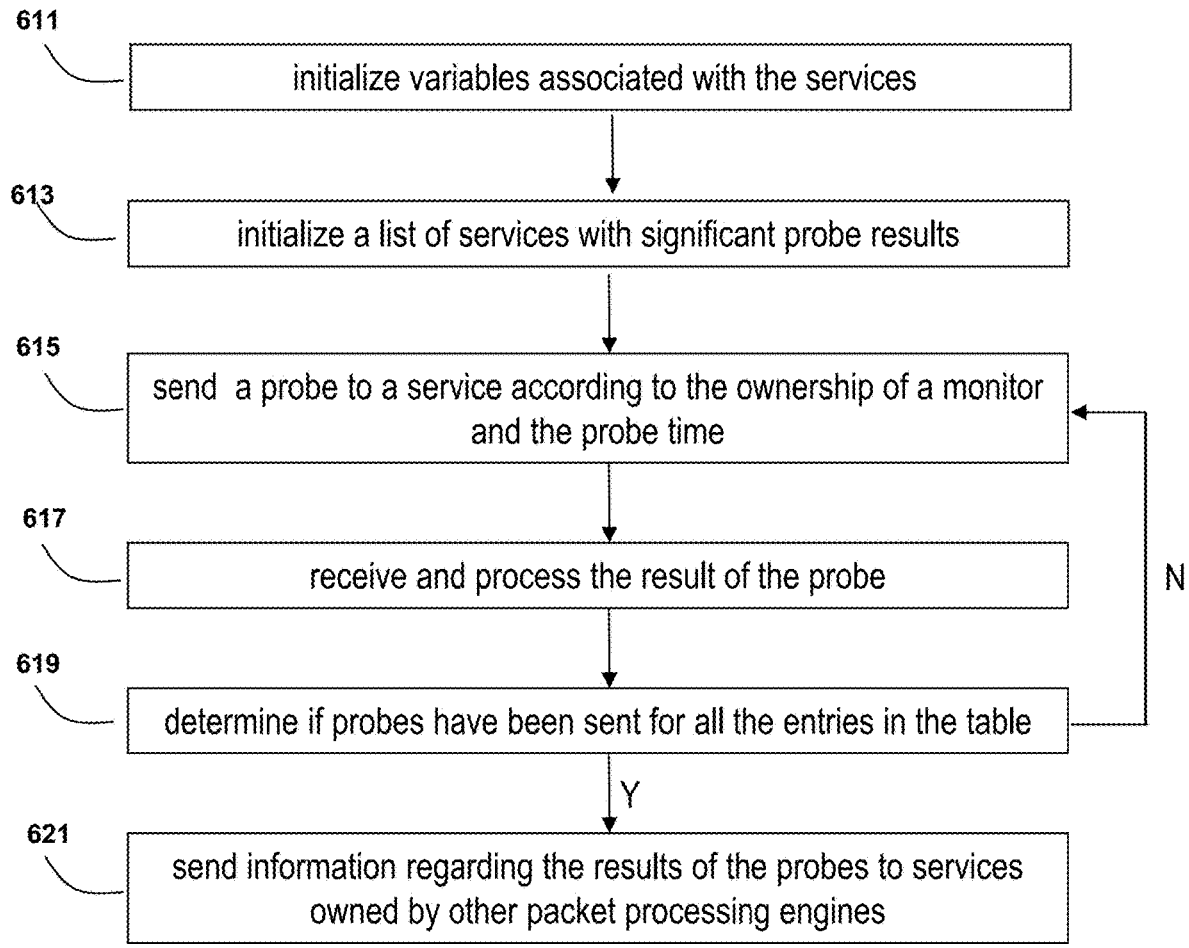
FIG. 6D is a flow diagram of an embodiment of a method for monitoring services in a multi-core system.

Referring now to FIG. 6D, a flow diagram depicting steps of an embodiment of a method for monitoring services in a multi-core system is shown and described. In brief overview, the method includes sending probes to monitor services according to iterations through the entries of the table 600. For one iteration through the table 600, the method includes initializing variables (step 611) associated with the services. The method further includes initializing (step 613) a list of services with significant probe results. The method further includes sending (step 615) a probe to a service according to the ownership of a monitor and the probe time. The method further includes receiving and processing (step 617) the result of the probe. The method further includes determining (step 619) if probes have been sent for all the entries in the table 600. The method further includes sending (step 621) information regarding the results of the probes to services owned by other packet processing engines.

For each iteration through the table 600, the packet processing engine 548 may initialize variables associated with the services. A variable may be related to the results of probes for a service. A variable may indicate a change in state for a service. The packet processing engine 548 may create and initialize the variables when the multi-core device 545 boots up. In this embodiment, the packet processing engine 548 may initialize the variables at the beginning of each iteration through the table 600. In other embodiments, the packet processing engine 548 may initialize the variables at the end of each iteration through the table 600.

The packet processing engine 548 may send a probe to a service according to the ownership of a monitor and the probe time. The packet processing engine 548 may examine activity status of the monitor to determine if the packet processing engine 548 owns the monitor. If the activity status is "non-schedulable," the packet processing engine 548 does not own the monitor. The packet processing engine 548 then examines the activity status for the next entry in the table 600. In this manner, the packet processing engine 548 continues examining the entries in the table 600 until the packet processing engine 548 encounters a monitor that the packet processing engine 548 owns. When the packet processing engine 548 encounters a monitor that the packet processing engine 548 owns, the packet processing engine 548 compares the scheduled probe time for the monitor with a signal from a clock. If the scheduled probe time is less than or equal to the signal from the clock, the packet processing engine 548 creates a probe according to the monitor and sends the probe to the service. The packet processing engine 548 may calculate the next probe time and overwrite the probe time field of the entry with the newly calculated probe time. The packet processing engine 548 may then continue examining the activity statuses and probe times of entries in the table 600 until the packet processing engine 548.

With the examining of activity statuses and probe times and sending of probes, the packet processing engine 548 may receive and process the result of a probe. The packet processing engine 548 may use the result of a probe to adjust a variable associated with a service. In some embodiments, the packet processing engine 548 may increment or decrement the variable according to the result of a probe. For example, if the probe indicates a service is "up," the packet processing engine 548 may increment the variable, but if the probe indicates a service is "down," the packet processing engine 548 may decrement the variable. In some embodiments, the magnitude of the increment or decrement is a predetermined value. In other embodiments, the magnitude of the increment or decrement depends on the result of the probe.

After adjusting the variable, the packet processing engine 548 may determine if the packet processing engine 548 owns the service being monitored. If the packet processing engine 548 owns the service, the packet processing engine 548 may use the variable to update the state of the service, as described in FIG. 6E. If the packet processing engine 548 does not own the service, the packet processing engine 548 evaluates the variable associated with the service to determine if the packet processing engine 548 needs to report the results of the probe to the owner packet processing engine 548. In some embodiments, the packet processing engine 548 may compare the variable with a predetermined threshold. If the variable is greater than the threshold, the packet processing engine 548 may determine if the service is already included in the list of services with probe results. If the service is not in the list, the packet processing engine 548 may add the service to the list. If the variable is less than the threshold, the packet processing engine 548 may remove the service from the list.

After the packet processing engine 548 finishes sending probes and processing the results for the entries in the table 600, the packet processing engine 548 may send information regarding the results of the probes to services owned by other packet processing engines. In many embodiments, the packet processing engine 548 may examine the list of services with probe results. For each service in the list, the packet processing engine 548 may prepare a message with the service name and the value of the variable associated with the service. The packet processing engine 548 may send the message to the packet processing engine that owns the service. The packet processing engine 548 may delete the service from the list. In some embodiments, the packet processing engine 548 deletes the service after sending the message to the packet processing engine that owns the service. In other embodiments, the packet processing engine 548 deletes all the services from the list after all the messages with variables for the services have been sent to the respective packet processing engines. The packet processing engine 548 returns to (step 611) to process another iteration through the table 600.

Figure 6E:
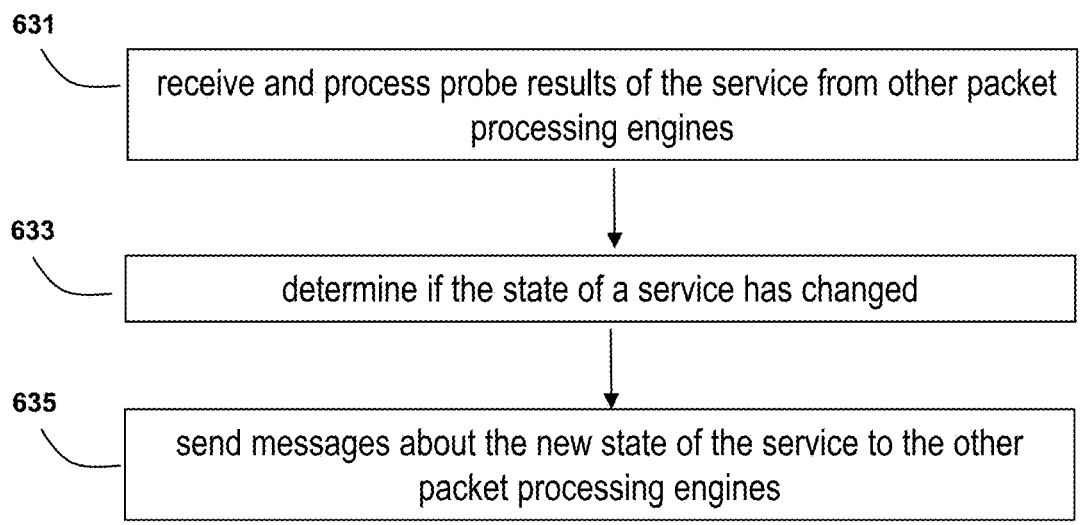
FIG. 6E is a flow diagram of an embodiment of a method for updating the state of a service according to the results of monitoring the services in a multi-core system.

Referring now to FIG. 6E, a flow diagram depicting steps of an embodiment of a method for updating the state of a service in a multi-core system is shown and described. The method includes receiving and processing (step 631) by a packet processing engine 548 that owns a service (also referred to herein as "owner packet processing engine") the probe results for the service from other packet processing engines. In some embodiments, the owner packet processing engine 548 receives a message from another packet processing engine. The message may include a service name and a value of a variable associated with the service. The value of the variable may reflect the results of probes sent to the service by the packet processing engine that sent the message. The owner packet processing engine may update a variable associated with the state of a service according to the value in the message. In some embodiments, the owner packet processing engine may add the value in the message to the variable associated with the state of the service, and in other embodiments, the owner packet processing engine may subtract the value.

The method also includes determining (step 633) if the state of a service has changed. In some embodiments, the owner packet processing engine determines if the state of a service has changed by comparing the variable associated with the state of the service to a predetermined threshold. In some embodiments, the owner packet processing engine detects if the variable was previously less than the threshold and the updated owner packet processing engine exceeds the threshold. In other embodiments, the owner packet processing engine detects if the variable previously exceeded the threshold and the updated variable is less than the threshold.

The method also includes sending (step 635) messages about the new state of the service to the other packet processing engines. In some embodiments, in response to the detection, the owner packet processing engine creates a message including the state of the service, according to the updated variable. The owner packet processing engine may send the message to all of the other packet processing engines. In other embodiments, in response to the detection, the owner packet processing engine places the service in a list of services whose statuses have changed. In these embodiments, the owner packet processing engine may create and send messages regarding the states of the services in the list on a predetermined basis. For example, the owner packet processing engine may create and send the messages according to a predetermined frequency, and then delete all the services from the list.

An example of monitor distribution in a multi-core system is herein described. In this example, the multi-core system has 8 cores and monitors 4 services. The multi-core system is configured to have 20 monitors that monitor the 4 services, and 5 monitors are dedicated to each service. The multi-core system establishes service names and monitor names for each of the 20 monitors. The multi-core system may compute a hash value for each monitor based on the service and monitor names. The hash value may determine which core owns a monitor and is responsible for sending probes to the service according to the monitor. In this example, a hash value may fall between 0 and 8000. If the hash value falls between 0 and 999, core 1 owns the monitor. If the hash value falls between 1000 and 1999, core 2 owns the monitor, and so on. In this example, core 1 owns the first service, and the hash values for the monitors determine that cores 1, 2, 5, 6, and 8 own the monitors for the first service. Core 3 owns the second service, and the hash values for the monitors determine that cores 2, 3, 4, 6, and 7 own the monitors for the second service. Core 5 owns the third service, and the hash values for the monitors determine that cores 1, 3, 4, 5, and 8 own the monitors for the third service. Core 7 owns the fourth service, and the hash values for the monitors determine that cores 2, 4, 5, 7, and 8 own the monitors for the fourth service.

Each core in the multi-core system includes a table that stores entries for all 20 monitors. Each core sets the activity statuses for entries to "schedulable" for the monitors it owns and "unschedulable" for the monitors it does not own. In one example, core 1 sets the activity statuses for its monitors for the first and third services to "schedulable," but sets activity statuses for all other monitors in its table to "unschedulable." In another example, core 2 sets the activity statuses for its monitors for the second and fourth services to "schedulable," but sets activity statuses for all other monitors in its table to "unschedulable." The remaining cores set the activity statuses for monitors in its table in the same manner.

If a monitor is set to "schedulable," a core may send probes according to the monitor to the service. The core may receive the results of the probes. If the core does not own the service, the core may send a message including the results of the probes to the owner core. For example, core 1 may send the results of its probes for the third service to core 5. In another example, core 4 may send the results of its probes for the second service to core 3, the results of its probes for the third service to core 5, and the results of its probes for the fourth service to core 7.

If a core does own a service, the core may determine the state of the service according to results of the probes for the service. The core may determine the state by processing the results of its own probes or results sent from other cores. For example, core 1 may process the results of its probes for the first service to update the state. Core 1 may also process the results of probes sent from cores 2, 5, 6, and 8 to update the state of the first service. In another example, core 5 may process the results of its probes for the third service to update the state. Core 5 may also process the results of probes sent from cores 1, 3, 4, and 8 to update the state of the third service. In any of these examples, once a core has updated the state of a service it owns, the core may send a message to the other cores regarding the state of the service.

G. Systems and Methods for Configuring and Using Object-Oriented Policy Expressions Referring now to FIG. 7A, an example of a portion of an object model used to facilitate processing of HTTP data is shown. Various embodiments of object models incorporating one or more features described herein may be modified or adapted to support SQL and other protocols. In brief overview, object classes are defined for a number of elements in the HTTP protocol. Defined classes include a request 746, response 741, hostname 744, url 720, query 742, cookie 743, and text 735. Each class is defined to include a number of fields and/or methods, which may include or return objects corresponding to other classes or may include or return other data types, such as integers.

Figure 7A:
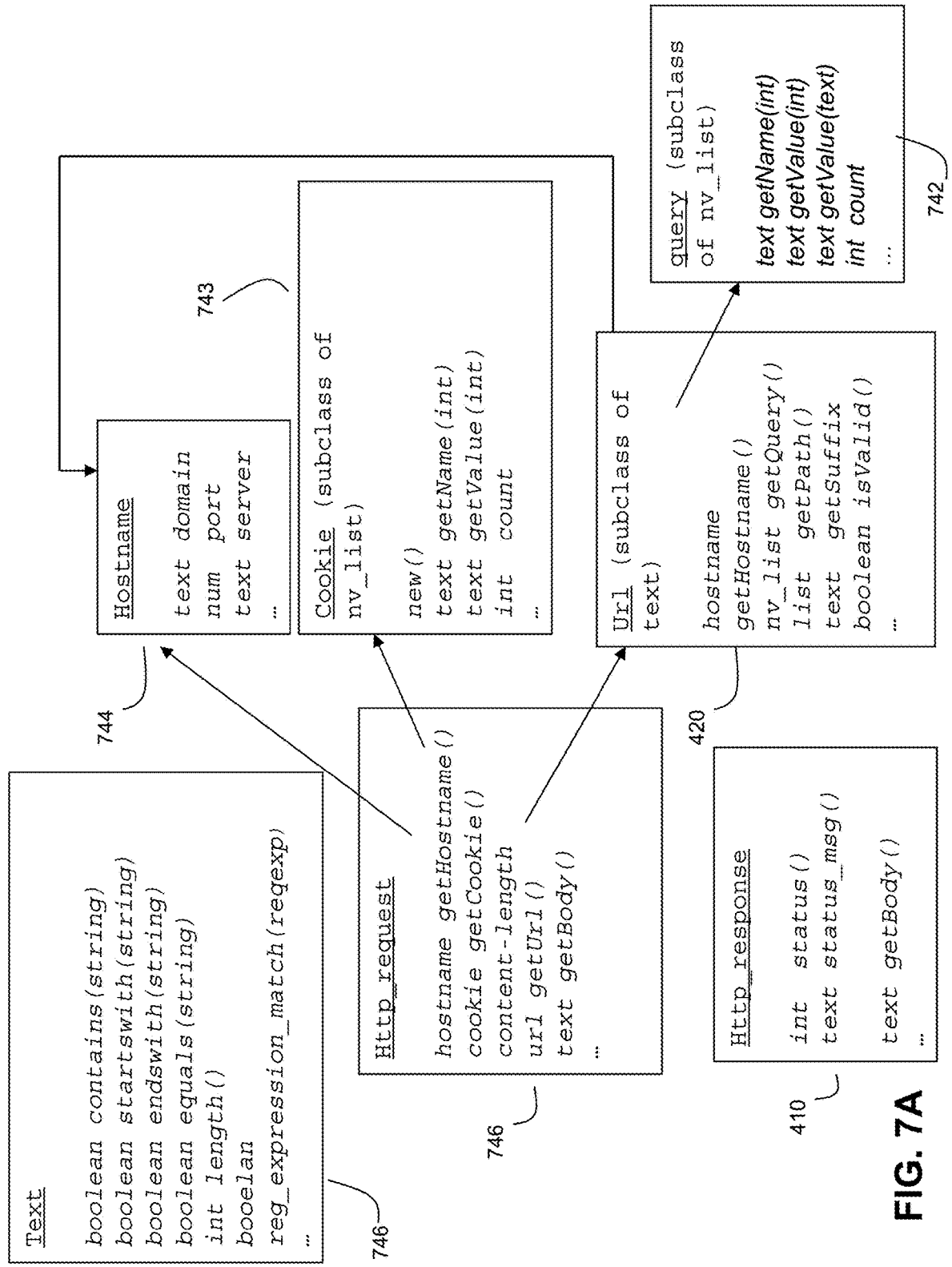
FIG. 7A is a diagram of an example object model that may be used to structure HTTP communications.

Still referring to FIG. 7A, now in greater detail, an object model may comprise a set of defined object classes which allows a computing device to specify and manipulate data, and/or a set of defined object classes which allows a user of a computing device to direct the operations of the computing device. An object model may have any properties associated with object-oriented design or programming including, without limitation, inheritance, abstraction, encapsulation, and polymorphism. Examples of object models that may be used in conjunction with the object-oriented expressions described herein include, without limitation, the Java object model, the Component Object Model (COM), and the HTML Document Object Model (DOM), and any portion or combinations of portions of those models. In some embodiments, an object model or a portion of an object model may correspond to a protocol. For example, an object model may be created to represent HTTP communications, with the object model providing classes and methods for accessing and manipulating HTTP communications. Or an object model may be created to represent TCP, IP, UDP, ICA, or SSL communications. Or an object model may be created to represent an appliance, with the object model providing classes and methods for accessing and manipulating state information relating to an network appliance 200.

An object class may comprise an abstract description of an object and any methods associated with the object. An object, a particular instance of a class, may represent any type or form of data, process, or protocol. Example objects may include, without limitation, strings, text, numbers, lists, protocols, data streams, connections, devices, data structures, systems, and network packets.

An object class may have a number of members. A member of an object class may comprise any field, method, constructor, property, or variable specified by the object class. In some embodiments, a member of an object class may comprise an object of a second object class. For example, in the embodiment shown, the object class "http_request" 746 contains a method "getUrl" which returns a url object. In other embodiments, a member of an object class may be a primitive data type of an underlying architecture, such as an integer, floating point number, byte, array, or boolean variable. For example, the class "cookie" contains a field "count" which is an integer identifying the number of name-value pairs in the list. In still other embodiments, a member of an object class may comprise a constant. In still other embodiments, a member of an object class may comprise a method.

In some cases, a member of an object class may be defined in the object class definition. In other cases, a member of an object class may be defined in a parent class of the object class. In still other cases, a member of an object class may be defined in a parent of the object class and modified in the class definition for the object. For example, both the "cookie" 743 and "query" 742 classes inherit the methods "getName" and "getValue" from their parent class "list_nv" which is a class representing lists of name-value pairs.

In the embodiment shown, the http_request class 746 contains a number of methods which may be used to process an HTTP request. Fields and methods me be provided to identify and manipulate any portion or portions of an HTTP request including, without limitation, the URL, cookie, body, content-type, date, version, and hostname. In one embodiment, a method or methods may be provided to determine whether a given data stream is a validly formatted HTTP request. A similar class and/or methods may also be provided for an HTTP response.

The url class 720 shown may comprise any number of fields and methods for operating and identifying a url. In one embodiment, the url may contain methods for parsing one or more of a hostname, port, server, domain, file suffix, path, and query. In one embodiment, the url may be a subclass of a general text object, which may allow the url to be treated as unformatted text. For example, the url class 720 may be a subclass of the text class 735. In one embodiment, the url class may comprise methods for rewriting all or a portion of the url. In some embodiments, the url class may be applied to any portion of text. For example, the url class may comprise a constructor which accepts a string of text and creates a url object by parsing the string. In these and other embodiments, the url class may comprise a method for indicating whether a URL is a properly formatted URL. In some embodiments, a URL class may comprise a method for identifying one or more URLs in a text string. For example, a static method "findURL" might be provided which returns a list of validly formatted URLs in a given text sequence. This method could be used, for example, to find a number of URLs contained in the body of an HTTP response. The url class may then provide methods for modifying one or more of the found URLs.

The cookie class 743 may comprise any number of fields and methods for identifying and processing a cookie. In one embodiment, the cookie may be an HTTP cookie. In the embodiment shown, the cookie class represents a cookie as a list of name value pairs. The "getValue" method, in response to receiving a number n, may return a text object of the nth value in the list. The getName method, in response to receiving a number n, may return a text object of the nth value in the name. In other embodiments, a cookie may be represented using any other syntax or data type including, without limitation, a string, or linked list. In some embodiments, the cookie class may provide a method for inserting and/or altering a cookie. In other embodiments, a HTTP response or request object class may provide a method for inserting or modifying a cookie contained in a request or response.

The "text" class 735 shown may comprise any number of fields and/or methods for operating on a text sequence. A text sequence may comprise any sequence of bytes capable of being treated as characters. In some embodiments, a text object may comprise a discrete sequence of bytes. In other embodiments, a text object may comprise one or more bytes of a byte stream. In these embodiments, a text object may be used to operate on portions of the byte stream even if the entire stream has not been received. Methods that may be used in conjunction with text objects may include, without limitation, comparisons, truncations, searches, sorts, and regular expression matching and searching. For example, a method may be provided to determine whether a given substring is found within a text object. Or for example, a method may be provided to determine a portion of a text object preceding a special character. Or, for example, a method may be provided for identifying a sequence of text following a given regular expression.

In some embodiments, methods may also be provided for formatting or confirming formatting of text so that it can be processed by other classes and/or methods. For example, a method may be provided that ensures a text object may be treated as XML. This method might check that the text object conforms to proper XML formatting and does not contain any malicious or inadvertent errors. Or, for example, a similar method may be provided to determine whether a text sequence can be treated as a URL. This method may, for example, find and replace any characters which need to be replaced by escape sequences so that the text object conforms to proper URL formatting conventions.

An object model may be implemented using any physical data structures or other underlying physical implementations. In some embodiments, a number of objects may access the same object in physical memory to perform the methods associated with each object. In one embodiment, the object model shown may be implemented so that a plurality of object instances operate on a underlying data stream, without needing to produce separate copies of the data stream for each object instance. To give a detailed example, with respect to the object model shown, an appliance may receive an HTTP communication from a client and store it in memory. The appliance may then execute identify a http_request object, and then call functions in the http_request object class 305 to obtain a url and/or a cookie object. The appliance may then call addition functions or reference fields in the url and cookie objects. Some or all of these methods may operate by parsing some or all of the underlying data stream, and then returning references to portions of the stream. For example, a url object may store the beginning and ending memory locations of the url in the underlying data stream. Each method of the url class may then parse and/or modify portions of data within the identified memory locations. In this manner, the appliance may be able to process a data stream using an object model without having to maintain additional copies of data in the data stream.

In other implementations, one or more additional copies of some or all of a data stream may be made with respect to some objects. These object may perform operations on a copy of a portion of data stream, and, as may be appropriate, update the data stream with any changes made to the copy.

The object model shown and others may specify object classes and data structures that can be applied to any input stream. For example, the object model shown may be used to treat any input stream as an http_request object, and then utilize any of the functionality provided by the http_request object class. Further, although the object model shown relates to HTTP data, other object models may be used to provide functionality with respect to TCP, SSL, or ICA streams. In some embodiments, an object model and implementation may be provided such that an appliance may select from a number of object models to process a given data stream. For example, upon receiving a given data stream, an appliance may determine that the data stream is an ICA stream, and apply an appropriate object model for processing the ICA stream. However, if HTTP data is transmitted within the ICA stream, the appliance may also apply an HTTP object model, such as the one shown, for processing the HTTP data. In this way, an appliance may specify any structure or structures to apply to a received byte stream.

Figure 7B:
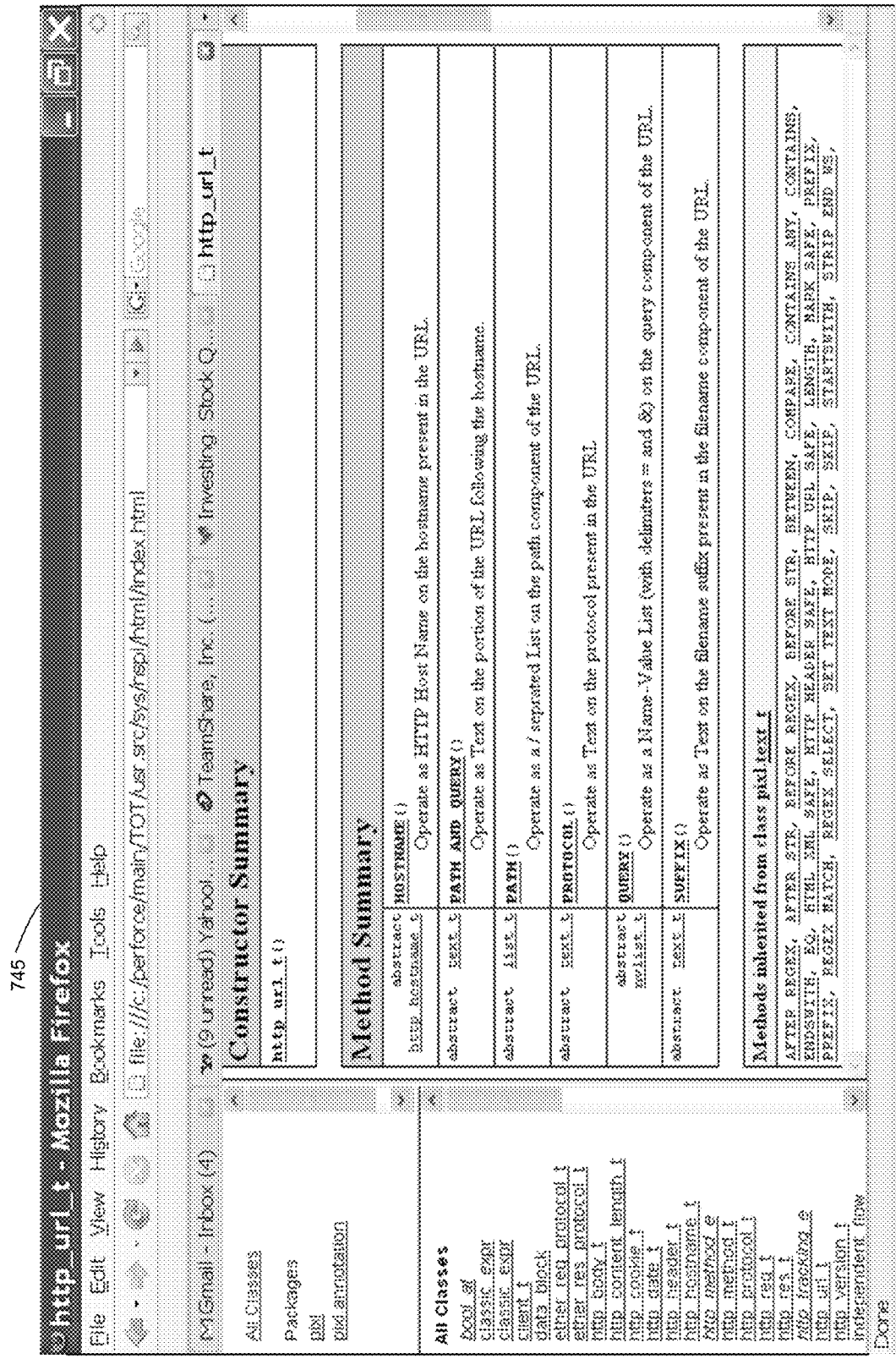
FIG. 7B is an example screen of documentation for an object model that may be used to structure HTTP communications.

Referring now to FIG. 7B, an example documentation screen for an object class representing a URL is shown. In brief overview, the documentation screen comprises a partial list of a number of methods and a constructor for the "http_url_t" class, which represents a URL. The documentation screen indicates a number of methods are implemented in the "http_url_t" class, and a number of methods implemented in the parent class "text_t." These classes may correspond to the "url" and "text" classes described with respect to FIG. 7A.

Figure 7C:
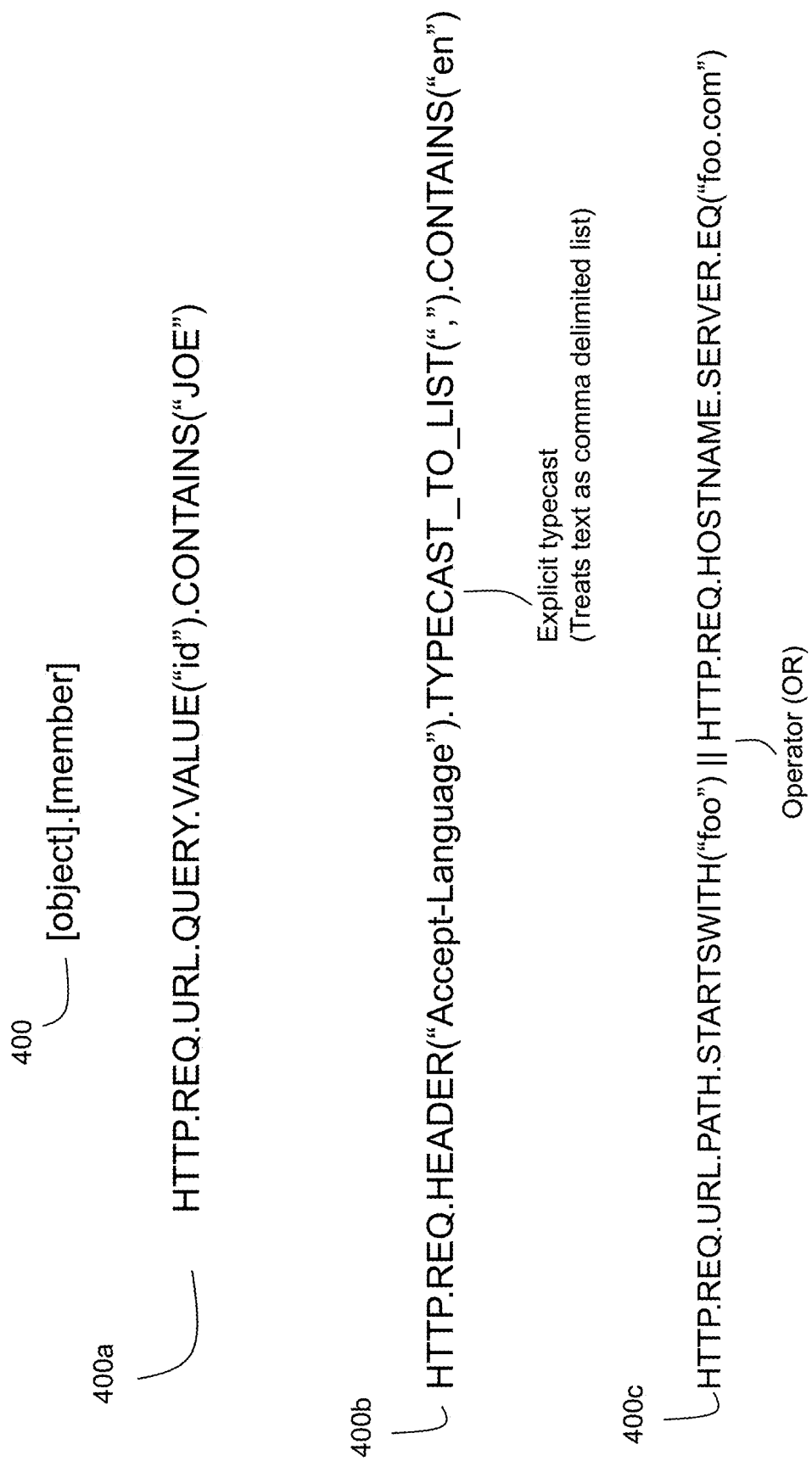
FIG. 7C illustrates a number of example object-oriented expressions relating to HTTP communications.

Referring now to FIG. 7C, a number of example object-oriented expressions for use in a policy engine are shown. In brief overview, an object oriented expression 740 contains a number of object classes, which may correspond to protocols, protocol objects, data structures, and data types. An object-oriented expression may specify a member of an identified object, which may comprise methods, data types, or other object classes. A number of example object-oriented expressions 740a, 740b, 740c are shown. These object oriented expressions may be used by a network device in performing any function including, without limitation, analyzing traffic flows, identifying system properties, load balancing, content switching, and application security.

Still referring to FIG. 7C, now in greater detail, object-oriented expressions may comprise any expression which allows the specification of data and functions with respect to an object model. A first example object oriented expression 740 identifies an object class and a member of the object class. In the syntax of the object-oriented expressions shown, a member of an object is designated by a period following the object and then a string naming the member of the object. For example, HTTP.REQ identifies the member method named "REQ" for the HTTP object. In this example, method names may be denoted with all uppercase. In other embodiments, any other syntax may be used to specify object-oriented expressions. Examples of syntaxes that may be used include, without limitation, the syntax or a combination of syntaxes of ActionScript, Java, JavaScript, C #, Visual FoxPro, VB.Net, C++, Python, Perl, PHP, Ruby and/or Objective-C.

In the example object-oriented expression 740a, the expression identifies the protocol HTTP. In one embodiment, HTTP may correspond to an object class, an abstract object class, a static object class, or any other component of an object model. In some embodiments, HTTP may be a parent class of a number of object classes used to represent and process HTTP communications. In other embodiments, "HTTP" may be a static class or method comprising one or more objects and/or methods relating to the representation and processing of HTTP communications. For example, the expression "HTTP.REQ" may return an object corresponding to an HTTP request within a data stream. In one embodiment, this object may be an instance of an object class such as the "http_request" class discussed in FIG. 7A. In the embodiment shown, the expression 740a may return a boolean value indicating whether "joe" is contained in a value named "id" in the query portion of a URL of an HTTP request.

The example object-oriented expression 740b provides an example of explicit typecasting, which may be used to specify structure with respect to arbitrary portions of a data stream. In the example, the string returned from a HTTP request header item corresponding to eh Accept-Language is explicitly typecast into a list. The TYPECAST_TO_LIST method accepts as an argument the list delimiter, and returns a list based on the delimiter. The expression then identifies a CONTAINS method to determine whether one of the list elements is "en". This example 740*b* may be used to configure a device to detect whether an HTTP request indicates the requestor accepts English as a language. In some embodiments, an object model and expression syntax may allow a data stream to be explicitly typecast into any object class. This may allow a user configuring a device to specify arbitrary structures to be applied with respect to a data stream. This may in turn allow a user to leverage knowledge of a protocol or convention to format input streams in a manner convenient for processing.

As another example of an explicit typecasting, the expression HTTP.RES.HEADER("Location").TYPECAST_TO_URL.QUERY may be used to typecase an element of the HTTP header so that it is treated as a URL. By typecasting text elements to a URL, the URL processing methods may be made available to analyze content in any portion of a network traffic stream.

In some embodiments, two or more object-oriented expressions may be used in conjunction with an operator, such as AND, OR, NOT, GREATER THAN, or LESS THAN, to produce a value. For example, in expression 740*c* two expressions which may return boolean values are joined with an OR operator. The result of the combined expression will be the OR of the values returned by the two expressions. In other embodiments, operators may work with respect to any objects or data types including, without limitation, integers, floating point numbers, and strings.

Though the specific examples shown reflect object-oriented statement in the context of an HTTP object model, object-oriented statements and models may be used to access any portions or portion of network traffic passing through a device. In addition, object-oriented statements and models may be used to access system properties of a device, or properties of a given connection or connected device.

In one embodiment, an object-oriented expression may be used to base network device behavior on any properties of the device. For example, the expression SYS.TIME.WITHIN(time1, time2) might be used to base behavior based on a time of day, or day of year. Or, for example, the expression SYS.CONNECTIONS.SSL_OPEN.COUNT might be used to return a count of the total number of SSL connection are currently open with a system. In both of these examples, the SYS object represents the system executing the policy, and a number of methods and/or fields are provided within the SYS object to access information about system status.

In another embodiment, an object-oriented expression may be used to base network device behavior on any properties of a client connected to the device. In one embodiment a "CLIENT" object might be provided to represent the properties of a client sending or receiving a currently processed data stream. For example, the expression: CLIENT.IP.SRC.IN_SUBNET(10.100.202.0/24), might be used to return a true/false value based on whether a client corresponding to a data stream is in a given subnet. Or, for example, the expression CLIENT.AGENT.VERSION_NUM might be used to retrieve the version number of a client agent executing on the client. Or, for example, the expression CLIENT.VLAN.VIRTUAL_IP might be used to access the virtual IP address of a client.

In still another embodiment, an object-oriented expression may be used to base network device behavior on any property of a server connected to the device. For example, SERVER.METRICS.HTTP.AVG_RESP_TIME might be used to access the average response time of a server for generating HTTP requests. Or, for example, SERVER.ICA.MAX_CONNECTIONS. might be used to identify a maximum number of ICA connections specified for a given server. Or, for example, SERVER.ETHER.HEADER might be used to identify the ethernet packet headers of a given connection to a server.

In some embodiments, an object-oriented expression may be used to buffer a certain amount of a communication before or during processing. For example, an appliance serving as a proxy for HTTP communications may wish to base some behavior on an initial part of the response. In this case, it may be desirable to only buffer a portion of the response, so that end-to-end response time does not unduly suffer. In one embodiment, an expression may specify a number of bytes to receive before an expression is evaluated. For example, the expression HTTP.REQ.getBody(5000).TYPECAST_TO_NV_LIST('=', '&').getValue("id") may be used to buffer the first 5000 bytes of an HTTP request body, and then treat those bytes as a name-value pair list. The expression then specifies to get the value corresponding to the name "id."

Figure 7D:
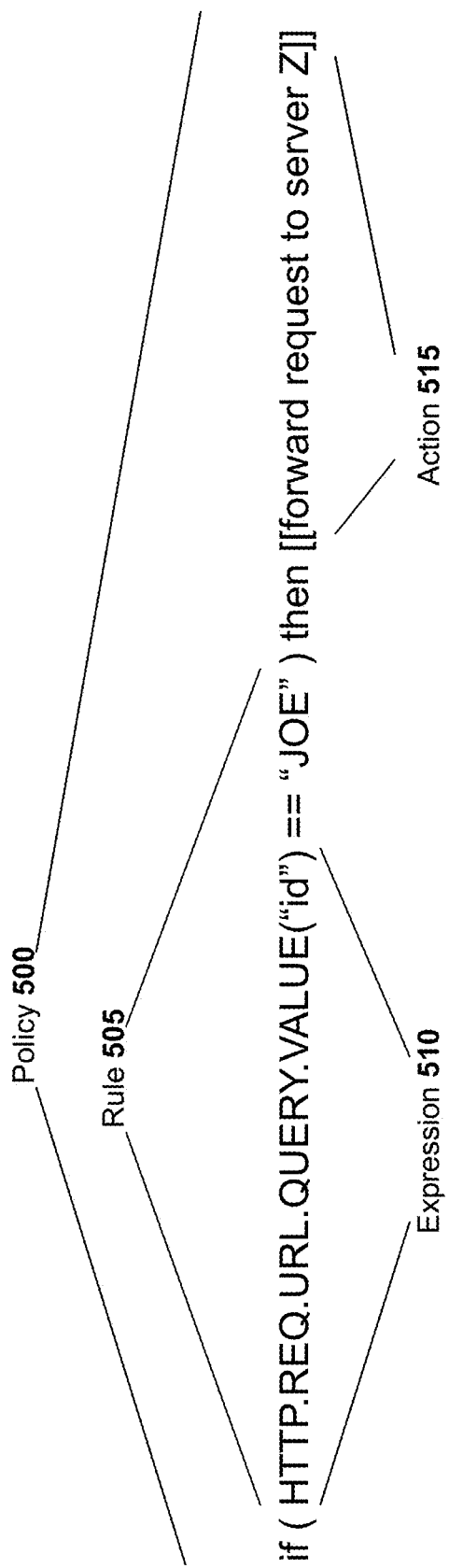
FIG. 7D illustrates an example of a policy.

Referring now to FIG. 7D, an example of a policy which may be used in configuring a device is shown. In brief overview, a policy 750 comprises an expression 751 which may be evaluated in the context of a rule 755. A policy 750 may also comprise an action 515*a* which specifies an action to be taken if the rule is satisfied.

Still referring to FIG. 7D, now in greater detail a policy may be used to configure a device. In some embodiments, a policy may be used to configure any device including, without limitation, a WAN optimization appliance 200, an SSL/VPN appliance 200, an acceleration appliance 200, a caching appliance 200, a load balancing appliance, and/or a device providing any combination of features of those devices. In other embodiments, a policy may be used to configure a client agent or server agent.

In some embodiments, a policy engine executing on a device may interpret, evaluate, and/or execute policies with respect to functions of the device. For example, a policy engine 236 may execute on an appliance 200 and interpret and execute a number of policies directing other actions and modules of the appliance including, without limitation, an SSL/VPN module 280, an Intranet IP module 282, a switching module 284, a DNS module 286, an acceleration module 288, an application firewall module 290, and/or a monitoring agent 197. In some embodiments a single set of policies may be provided for directing a plurality of appliance functions. In other embodiments, a separate set of policies may be used to configure each of a number of appliance functions. Policies may be stored in any manner within a device. In some embodiments, a policy may be compiled before it is executed on a device. In other embodiments, a policy may be interpreted at runtime.

A policy 750 may comprise one or more expressions 751. An expression in a policy may be evaluated by a device at runtime with respect to the objects specified in the expression to produce a value. An expression 751 may be any type of expression. In one embodiment, an expression 751 may be an object-oriented expression. An expression may be used anywhere within a policy. In some embodiments an expression may be specified in a rule of a policy. In other embodiments, an expression may be specified in an action of a policy.

A policy 750 may also comprise a rule 755. The rule may be evaluated at runtime with respect to objects, methods, and operators identified in the rule to produce a result. Depending on the result, the appliance may then execute one or more actions specified in the policy. For example, if a rule evaluates to "true" an appliance may execute the action associated with the rule. Or if a rule evaluates to "false" and appliance may not execute the action associated with the rule. In some embodiments, a rule may comprise a single expression. In other embodiments, a rule may comprise a plurality of expressions connected by operators.

A policy 750 may also comprise an action 515*a*. An action may specify any action to be taken. Examples of actions may include, without limitation, blocking or allowing a data stream, forwarding a data stream or object to a given server or device, storing an object in memory, altering a portion of a data stream, altering one or more system properties, performing an acceleration technique, and performing a compression technique. In the policy 750 shown, upon determining that an HTTP request URL contains a user identifier of "JOE", the policy dictates an action of forwarding the request to a specified server. In some embodiments, an action may comprise an expression to be evaluated at runtime Referring now to FIG. 7E, an example of an expression input screen 760 for a user to input an object-oriented expression is shown. In brief overview, an expression input screen 760 comprises a number of pull-down menus 762 which allow a user to specify members of classes to include in a created expression. The screen 761 may also comprise a display where a user may be able to see and/or edit a text version of the expression. The screen may further comprise a display 763 which displays to the user information corresponding to one or more objects.

Figure 7E:
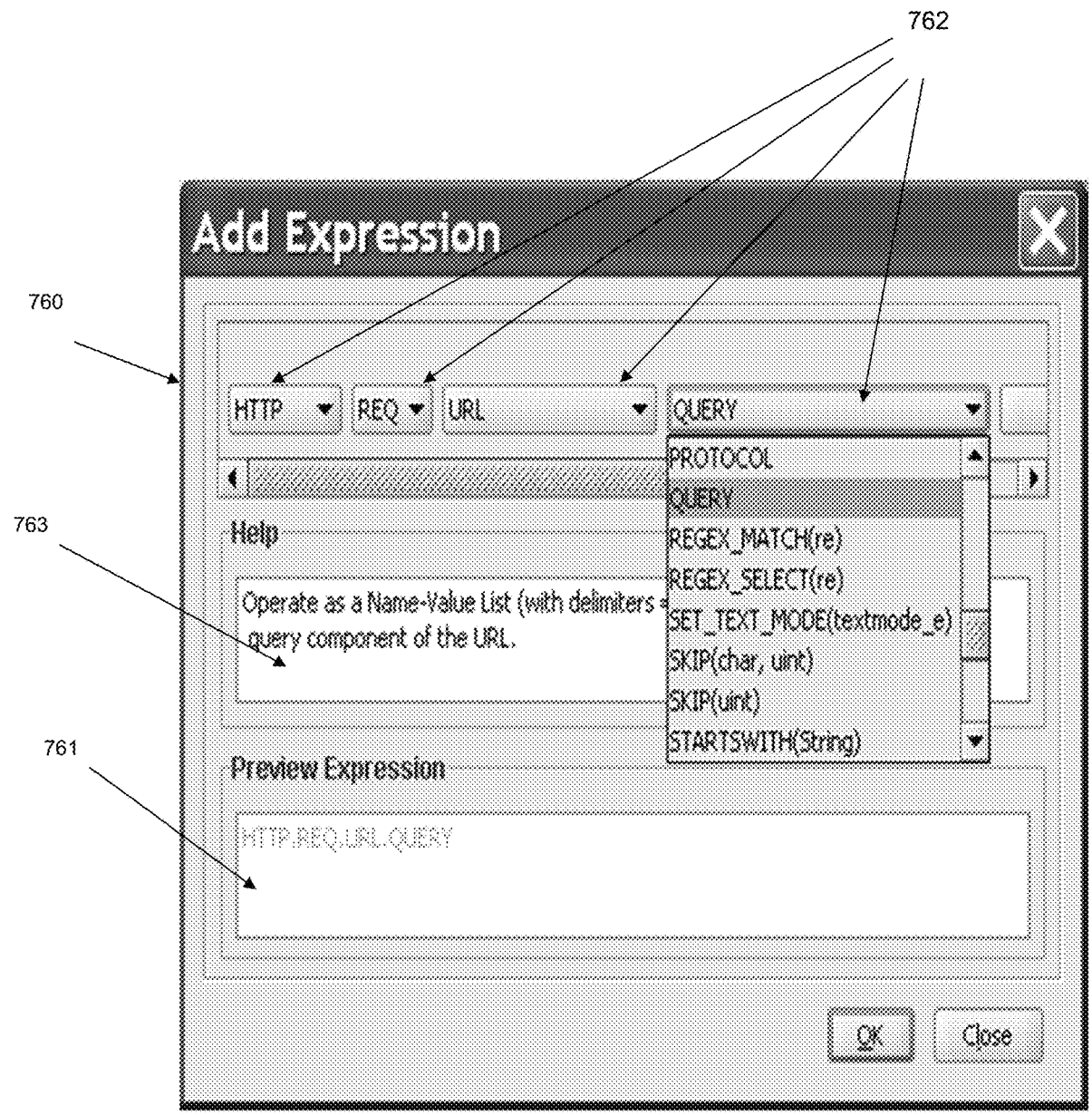
FIG. 7E is an example screen that may be used to configure one or more expressions.

Still referring to FIG. 7E, now in greater detail, an expression input screen allows input of object oriented expressions by a user in any manner. In the embodiment shown, pull-down menus 762 may be used to select objects. In other embodiments, any other input elements may be used to accept an object oriented expression including, without limitation, text fields, menus, buttons, checkboxes, and toolbars. In some embodiments, input elements of a screen 760 may provide functionality for a user to create and verify valid expressions. In some embodiments, the pull-down menus 762 may be automatically populated with members of the previous specified class. For example, upon a user selecting "URL" in the menu shown, the next pull down menu may be populated with the members of the URL object class. In this way a user may be able to efficiently navigate class hierarchies and object models to generate an expression. In other embodiments, syntax highlighting, auto-completion, and/or auto-recommendation may be used to enable a user to easily create and verify expressions. For example, a user may be provided with a text field 761 to compose an expression, wherein the text field highlights in red any unrecognized objects or syntax. Or for example, a user may be provided with a text field 761 which, upon a user typing an object class, the text field displays a list of members of the object class.

In some embodiments, an expression input screen 760 may display to the user information about any objects or expressions. In some embodiments, the screen 760 may display the properties and/or recommended uses of a given class. In one embodiment, the screen 760 may be integrated with or used alongside one or more class documentation screens such as depicted in FIG. 7B.

Figure 7G:
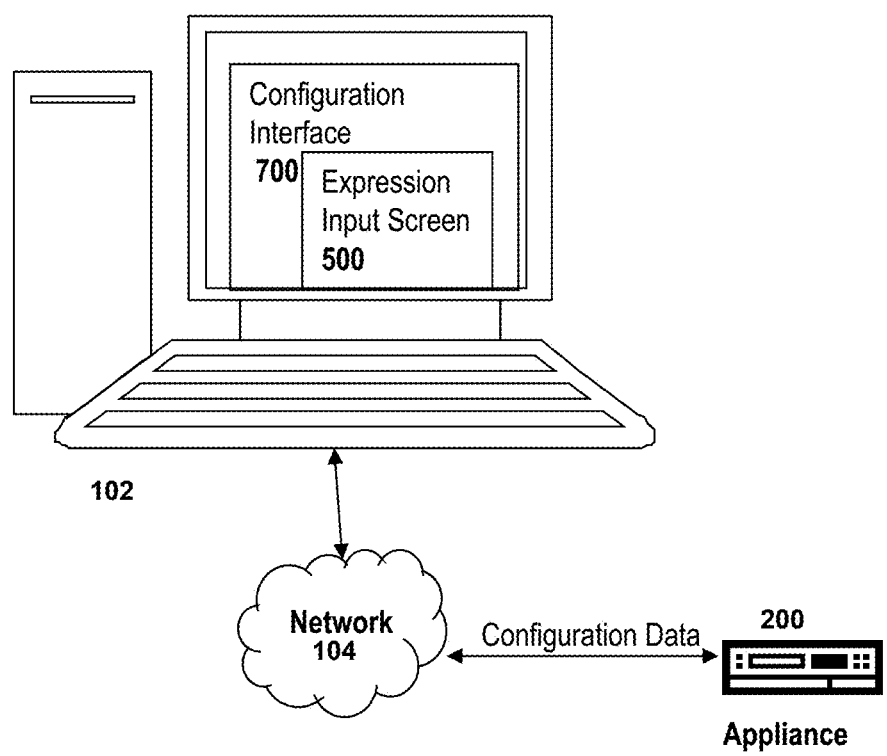
FIG. 7G is a block diagram of one embodiment of a configuration interface executing on a client.
Figure 7F:
FIG. 7F is an example screen of a configuration interface that may be used to configure policies for a network device.

Referring now to FIG. 7F, an example of a configuration interface screen which may be used to configure a plurality of policies corresponding to one or more network devices is shown. In brief overview, a screen displays a list of network device functions 710 with folders containing one or more policies, policy groups, or settings related to the functions. In the example shown, the screen displays folders for system policies, network policies, DNS policies, SSL policies, SSL offload policies, compression policies, integrated caching policies, protection features, load balancing policies, content switching policies, cache redirection policies, global load balancing policies, SSL VPN policies, and application security policies. In some embodiments, a number of policies, policy groups, and/or settings corresponding to a function may be referred to as a profile.

Still referring to FIG. 7F, now in greater detail, a configuration interface may allow a user to specify policies or settings related to one or more network devices. In some embodiments, a configuration interface may be used to configure an appliance 200 including, without limitation, a VPN appliance, acceleration appliance, or WAN optimization device. In some embodiments, a single configuration interface may allow a user to configure a plurality of appliances. For example, a user may be able to specify one or more appliances to apply a given policy, policy group, or setting to. In one embodiment, a user may be able to specify that a number of appliances share a configuration profile. For example, a user may configure a cluster of appliances 200 such that each appliance has the same policy settings. In other embodiments, a configuration interface 700 may be used to configure one or more client agents 120.

A configuration interface 700 may comprise any means of collecting input including, without limitation, GUIs, and command-line interfaces. A configuration interface may comprise one or more expression input screens 760. In one embodiment, a configuration interface may read configuration information from a file. In another embodiment, a configuration interface may receive configuration information over a network. For example, a configuration interface 700 may comprise means for a user to download one or more policies, settings, policy groups, or profiles. These may comprise commonly used policies or settings for a number of applications.

A configuration interface may obscure any aspects of a policy, policy group or configuration from a user. For example, a configuration interface may fill in any portions of a policy or policy group automatically or by default such that the user does not need to actively configure those portions. For example, a configuration interface may provide a default list of actions, where the user only needs to specify a list of rules under which the actions should be taken. The syntax and implementation of the actions may be completely or partially hidden from the user.

Referring now to FIG. 7G, an example of using a computer to configure an appliance using a configuration interface is shown. In brief overview, a configuration interface 700 comprising an expression input screen 750 is displayed on a client 102. The client 102 transmits the configuration data received via the configuration interface to the appliance 200.

Still referring to FIG. 7G, now in greater detail, a configuration interface 700 may be displayed on a client 102 in any manner. In some embodiments, a configuration interface 700 may comprise an application executing on the client. In other embodiments, a configuration interface 700 may comprise a web page displayed by the appliance. In still other embodiments, a configuration interface 700 may comprise a web page displayed by a third device.

A configuration interface 700 may comprise any means for a user to input configuration data including, without limitation, text fields, menus, buttons, windows, checkboxes, and drag-and-drop functions. In some embodiments, a configuration interface 700 may comprise an expression input screen 750. In other embodiments, a configuration interface may also provide screens for a user to input one or more policies. In some embodiments these screen may be integrated with one or more expression input screens.

A configuration interface may transmit configuration information to an appliance 200 by any means. The configuration information may be transmitted via any protocol or protocols. In one embodiment, user-inputted configuration information may be saved to a file on the client 102, and then the file may be transmitted to the appliance. In other embodiments, a user may input information into a web page or a web application which may then transfer the configuration information to the appliance. In some embodiments, the configuration information may be compiled, formatted, or otherwise processed before it is transmitted to the appliance 200. In still other embodiments, the configuration information may be compiled, formatted, or otherwise processed after it has been received by the appliance.

Figure 8A:
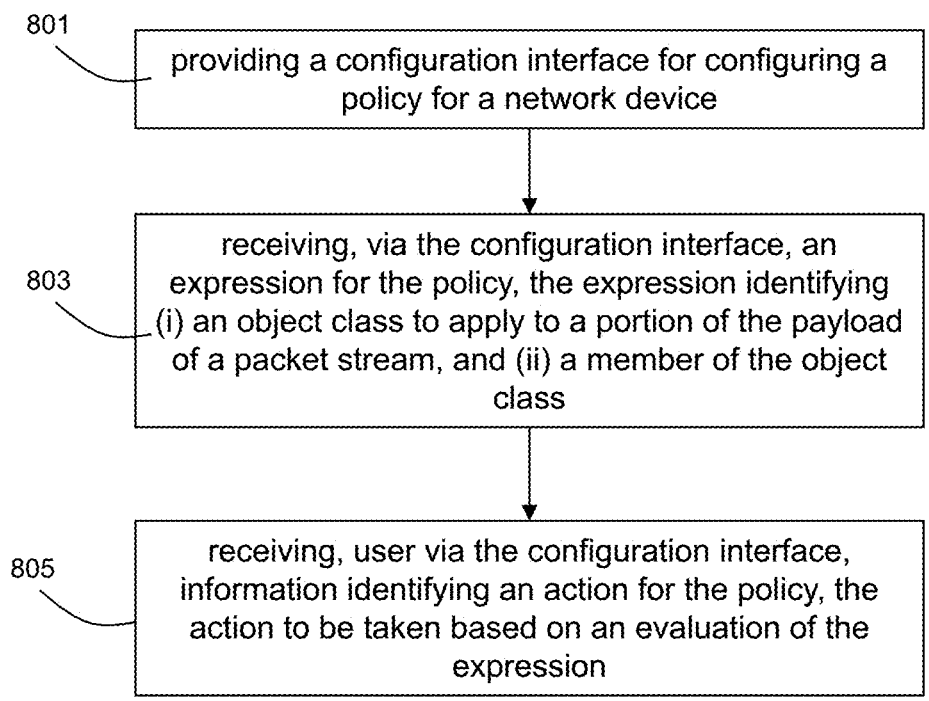
FIG. 8A is a flow diagram of one embodiment of a method for configuring a policy expression.

Referring now to FIG. 8A, an embodiment of a method of configuring an object-oriented policy of a network device with an object-oriented expression to specify structure in a payload of a packet stream received by a network device is depicted. In brief overview, a configuration interface 700 is provided by a device in order to configure a policy 760 for a network device 200 (step 801). The device receives, via the configuration interface 700, an expression 761 for the policy 760 (step 803). The device receives, via the configuration interface 700 user information identifying an action to be taken based on an evaluation of the expression (step 805).

Still referring to FIG. 8A, now in further detail, a configuration interface may be provided for configuring a policy 760 for a network device 200 in any manner (step 801). In some embodiments the configuration interface 700 may comprise a command line interface. In other embodiments, the configuration interface 700 may comprise a graphical user interface. The configuration interface 700 may comprise one or more of a drag-and-drop interface, a list-selection interface, or a syntax-highlighting interface. In some embodiments, the configuration interface 700 resides on a client device 102. In other embodiments, the configuration interface 700 executes on the network device 200. In some embodiments, a device providing the configuration interface 700 is connected to an appliance 200 by a network 104. In some embodiments, the configuration interface 700 is a webpage. In some other embodiments, the configuration interface 700 is a webpage that resides on the network device 200. In other embodiments, the configuration interface 700 is a webpage that resides on a separate server 106.

A device receives, via the configuration interface 700, an expression 761 for the policy 760 specifying an object class to apply to a portion of the payload of a packet stream and a member of the object class (step 803). In some embodiments, the expression may be received via an expression input screen 750. In one embodiment, the expression 761 identifies a portion of text within a packet stream. In certain embodiments, the expression 761 specifies a protocol, and may also specify one or more methods and fields related to the protocol. For example, the expression may specify a protocol of HTTP, HTML, FTP, SMTP, ICA, and/or SSL. The specified protocol may then be applied to parse a data stream according to the protocol.

The received expression may specify any object class. For example, the received expression may specify any of the object classes described in the object model of FIG. 7A. An object class may be specified in any manner. In one embodiment, specifying an object class may comprise specifying an instance of the object class. For example, the expression "HTTP.REQ" may specify an instance of the "http_request" object from FIG. 7A. In some embodiments, the received expression may comprise an object-oriented expression.

The received expression may also specify any member of an identified object class. The member may comprise any object, data type, or method. In some embodiments, the member comprises a field. In other embodiments, the member may comprise a field corresponding to a second object class. In some embodiments, the member of the object class comprises a method. In some embodiments, the member of the object class is inherited from a parent class of the object class. The member of the object class may correspond to an HTTP request or response. In other cases, a member of the class may be a uniform resource locator ("URL") or a cookie.

In other embodiments, the expression 761 comprises an explicit typecasting. The explicit typecasting may be used to specify an object class to use with respect to a field or returned object. For example, a field containing a number may be explicitly typecast to an alphanumeric string in order to execute a string comparison. Or for example, a stream of bytes may be typecast to a list with a given delimiter. Or for example, a data stream may be typecast as corresponding a particular protocol or protocol object.

A device may receive, via the configuration interface 700, information that identifies an action 615a for the policy 760, the action 615a to be taken based on an evaluation of the expression 761 (step 805). In some embodiments, the action 615a may comprise an object-oriented expression. In certain embodiments, the method performs the action 615a in order to provide load-balancing, content switching, application security, application delivery, network acceleration, or application acceleration. For example, in order to accelerate network activity, the method may evaluate an expression 761 to determine the location of the user and, based on the user's location, route the user's traffic to the geographically closest server or servers 106. In some embodiments, a policy may perform security, acceleration, load-balancing or content switching functions by rewriting a URL in either the HTTP request or response. For example, an action 615a may specify to modify the HTTP request so that the URL refers to a specific server or server farm 106. In some cases, the action 615a received from the configuration interface 700 may be an expression for "no action" or for a default action.

Figure 8B:
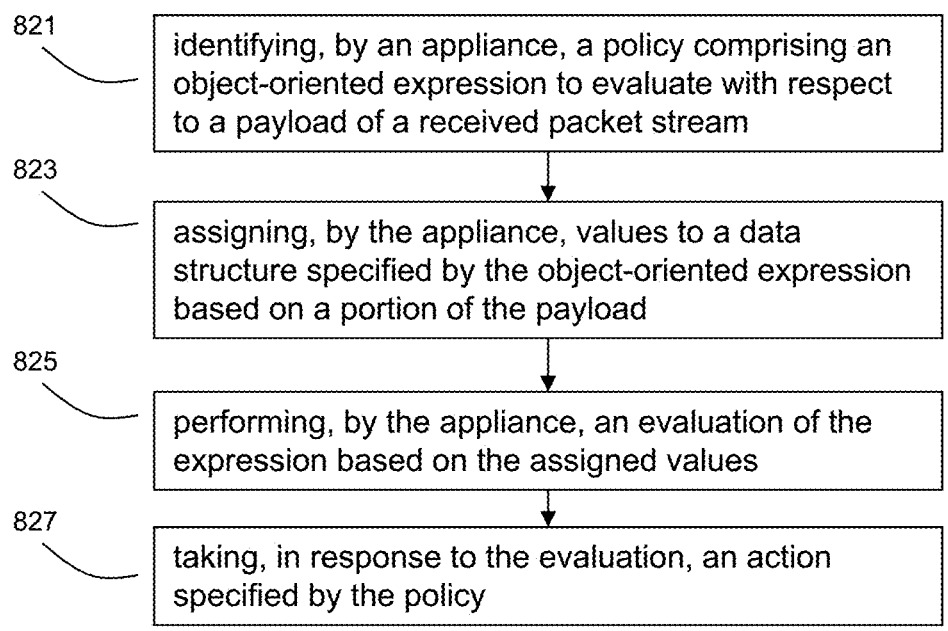
FIG. 8B is a flow diagram of one embodiment of a method for processing an object-oriented expression in a network appliance.

Referring now to FIG. 8B, an embodiment of a method of applying, by a device, object-oriented expressions 761 in a policy 760 to specify a structure in a payload of a packet stream received by an appliance 200 is depicted. In brief overview, an appliance 200 identifies a policy 760 comprising an object-oriented expression 761 to evaluate with respect to a payload of a received packet stream (step 821). The appliance 200 assigns values to a data structure specified by the object-oriented expression 761 based on a portion of the payload (step 823). The appliance 200 performs an evaluation of the expression 761 based on the assigned values (step 825) and takes, in response to the evaluation, an action 615a specified by the policy 760 (step 827).

Still referring to FIG. 8B, now in further detail, an appliance may identify a policy to apply to a data stream any manner (step 821). In some embodiments, an appliance may read a policy from one or more configuration files. In other embodiments, a policy engine 236 in an appliance may store a number of policies in memory. In still other embodiments, an appliance may identify a policy in response to a type or protocol of the data stream. For example, an appliance may have a set of policies applied to all incoming TCP streams. Or for example, an appliance may identify one or more policies that are applied to SSL streams. In one embodiment, an appliance may identify a policy based on a sender or a recipient of a data stream. For example, a VPN appliance may have a set of policies which are applied to incoming connection requests from clients. Or an acceleration device may identify one or more polices to apply to a HTTP stream from a server 106. In some embodiments, the policy may comprise a policy received via a configuration interface 700.

The packet stream may be received in any manner, and from any source. In some embodiments, the packet stream may be transparently intercepted by the appliance. In other embodiments, the appliance may receive the packet stream in the process of proxying one or more transport layer connections. The packet stream may comprise any type of packets including, without limitation, IP packets, TCP packets, UDP packets, and ICMP packets. The packet stream may comprise any other protocol or protocols.

The identified policy may comprise an object-oriented expression to evaluate with respect to the payload of a packet stream. The object-oriented expression may comprise any type of object-oriented expression, and may specify one or more object classes, fields, and methods. In some embodiments, the object-oriented expression may comprise part of a rule. In some embodiments, the expression may specify one or more objects corresponding to a client, server, HTTP protocol, or the appliance.

The object-oriented expression may be evaluated with respect to any payload of a packet stream. In one embodiment, the expression may be evaluated with respect to the payload of a TCP or UDP stream. In another embodiment, the expression may be evaluated with respect to an SSL stream. In still another embodiment, the expression may be evaluated with respect to the payload of an ICA stream. The packet stream may be received from any source including, without limitation, a client, server, client agent, server agent, or a second appliance.

The appliance assigns values to a data structure as specified by the object-oriented expression 761 (step 823). A data structure may comprise the physical representation of an object instance. In some embodiments, the appliance may parse some or all of the received payload to assign the values. In other embodiments, the appliance may perform any methods specified by the expression or included in an object model to assign values. For example, with respect to the expression:

"HTTP.REQ.HEADER("Accept-Language").TYPE-CAST_TO_LIST(",")" the appliance may assign values to an object corresponding each of the request, header, and comma-delimited list specified. In some embodiments, the assigning of values may comprise determining a portion or portions of the data stream corresponding to an object. In some embodiments, the step 823 includes applying, by the appliance 200, a class specified by the object-oriented expression 761 to a byte stream of the payload. For example, if an expression specifies a URL class, the appliance may assign a value to an underlying URL data structure by determining the starting and ending points of a URL within the received payload. These starting and ending points may then be stored in a URL data structure and used to perform any of the methods in the URL class. In some embodiments, the appliance may assign values to a plurality of data structures specified by the object-oriented expression. In one embodiment, a policy engine 236 may perform any functions related to the evaluation of a policy.

The appliance may perform an evaluation of the expression 761 based on the assigned values in any manner (step 825). In some embodiments, the appliance may use one or more methods of an object class specified by the expression to perform the evaluation. In some embodiments, the evaluation may produce a boolean value. In other embodiments, the evaluation may produce an integer, string, or other object. The appliance may use the assigned values in any manner. In the URL example above, the appliance, after determining a starting and ending point for the URL, may then use those values to perform any operations with respect to the URL. In some embodiments, the appliance may then perform the getSuffix( ) method referenced in FIG. 7A, which identifies a file type suffix of the requested URL. This method may also comprise determining a starting and ending point of the suffix in relation to the starting and ending point of the URL. The appliance may then use the starting and ending points of the suffix to perform any evaluations of the file suffix, such as comparing it to the string ".jsp" to determine if the requested URL corresponds to a Java Server Page.

In some embodiments, the appliance may evaluate a rule comprising the expression. In other embodiments, the appliance may evaluate a rule comprising a plurality of expressions.

The appliance may then, in response to the evaluation, take an action 615*a* specified by the policy 760 (step 827). In one embodiment, the appliance takes an action if the result of the evaluation is a value corresponding to true. In another embodiment, the appliance may take an action if the result of the evaluation is non-zero. The action taken may be any action including, without limitation, any action relating to load-balancing, content switching, application security, application delivery, network acceleration, or application acceleration. In some embodiments, the action 615*a* may comprise a "no action."

In some embodiments, the appliance may perform the action immediately following the evaluation. In other embodiments, the appliance may perform the action subsequent to evaluating at least one other policy. In still other embodiments, the appliance may perform the action after waiting a predetermined amount of time or waiting until a resource becomes available. In one embodiment, the appliance may perform the action after receiving additional portions of the packet stream.

In some embodiments, the appliance may then forward the received packet stream to one or more appliances, servers, clients, or client agents. The appliance may perform any other network appliance functions with respect to the packet stream including, without limitation, acceleration, compression, and load balancing.

Figure 8C:
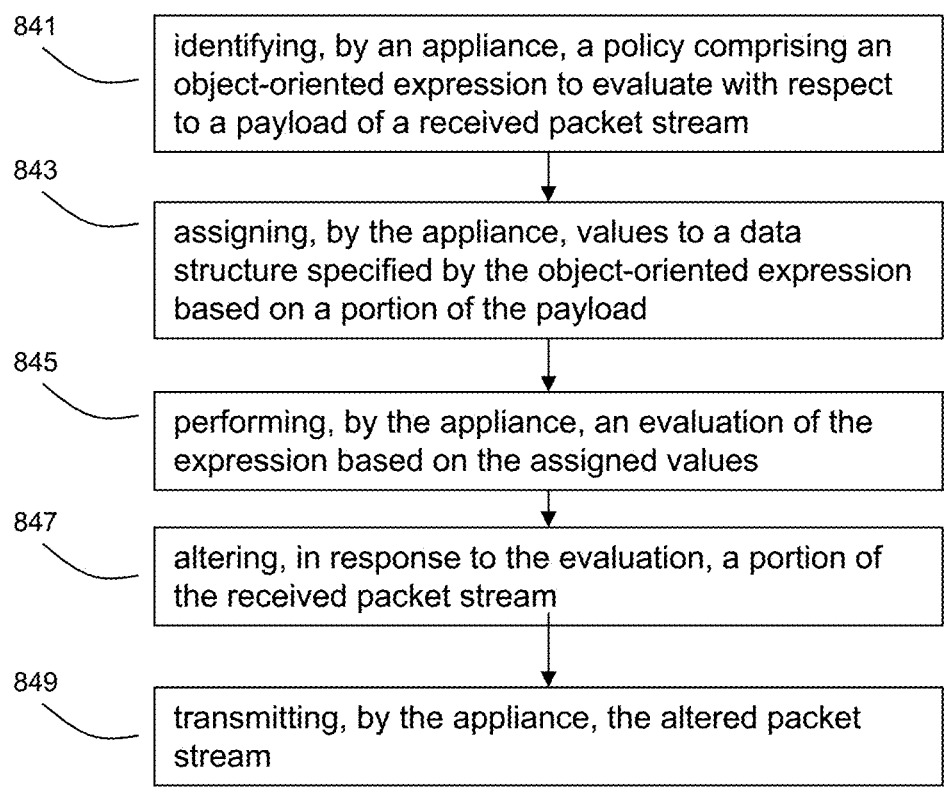
FIG. 8C is a flow diagram of one embodiment of a method for using object-oriented expressions to rewrite portions of a received packet stream.

Now referring to FIG. 8C, a method, in an appliance 200, for applying object-oriented expressions 761 in a policy 760 to specify structure in a payload of a packet stream received by the appliance 200 is shown. In brief overview, the appliance identifies a policy 760 including an object-oriented expression 761 to evaluate with respect to a payload of a received packet stream (step 841). The appliance assigns values to a data structure specified by the object-oriented expression 761 based on a portion of the payload (step 843). The appliance also performs an evaluation of the expression 761 based on the assigned values (step 845). In response to the evaluation, the appliance alters a portion of the received packet stream (step 847) and transmits the altered packet stream (step 849).

Still referring to FIG. 8C, now in greater detail, the appliance may identify a policy 760 that specifies an object-oriented expression 761 to evaluate with respect to a payload of a received packet stream (step 821). This step may be performed in any manner described herein.

The appliance may assign values to a data structure specified by the object-oriented expression 761 based on a portion of the payload in any manner (step 823). This step may be performed in any manner described herein.

The appliance performs an evaluation of the expression based on the assigned values (step 845). This step may be performed in any manner described herein.

In response to the evaluation, the appliance may alter a portion of the received packet stream (step 847). In some embodiments, altering a portion of the received packet stream may comprise taking an action in response to the evaluation (step 827). In some embodiments, the portion of the packet stream that is altered is specified by a data structure identified by the object-oriented expression. In other embodiments, the portion of the packet stream that is altered is specified by a second object-oriented expression. In some embodiments, the portion of the packet stream to be altered may be specified by an object-oriented expression in an action of the policy. In some embodiments, the appliance may rewrite a URL in the body of an HTTP response or request. In other embodiments, the appliance may rewrite a form field value in the packet stream. The form field that is altered may be a field in an HTTP request, an HTTP response or any other field in an object that is part of the packet stream. In still another embodiment, the appliance may alter one or more name-value pairs contained in the packet stream. In some embodiments, the appliance may rewrite a portion of the received packet stream to obscure or remove confidential data including, without limitation, personal identification numbers, checking account routing numbers, personal contact information, social security numbers, passwords and other confidential information.

To give a detailed example, upon receiving an HTTP stream from a client destined to a server, an appliance providing application security functions for the server may determine to apply a policy:

if (HTTP.Request.getCookie( ).getValue("username"). length>20) then
HTTP.Request.getCookie( ).setValue("username", "void")

In this example the appliance may parse some or all of the HTTP stream to identify the portion of the stream containing the request, and then the cookie within the request. The appliance may do this in any manner, including maintaining one or more internal data structures with references pointers pointing to the areas of the stream corresponding to the request and cookie. The appliance may then identify the value of a "username" name-value pair within the cookie and determine the whether the length of the value is greater than 20 characters. A length of over 20 characters may indicate an application error or a malicious attack, such as an attempted buffer overflow attack. Upon determining the length is greater than 20 characters, the appliance may then alter the value to "void" or any other signal which may notify the server receiving the stream that an inappropriate value was sent by the client. The appliance may use and/or modify any internal data structures in order to alter the stream. The appliance may then forward the altered stream to the server. In other embodiments, the appliance may simply block the stream from reaching the server upon detecting the potential overflow. In these embodiments, the appliance may return an error message to the client.

In another embodiment, the appliance may replace an entire HTTP response with a new response. For example, if the appliance determines that a response contains confidential data in a form, the appliance may replace the response with a response indicating an error or with a response comprising neutral content. In yet another embodiment, an appliance may replace or rewrite an entire HTTP request or response header.

The appliance may then transmit the altered packet stream in any manner (step 849). In some embodiments, the appliance may forward the altered packet stream to a server or client designated as the recipient of the stream. In other embodiments, the appliance may redirect the stream to an appliance, server or client other than the intended recipient of the stream. The appliance may transmit the altered packet stream using any protocol or protocols including, without limitation, TCP, IP, UDP, SSL, and ICA.

H. Systems and Methods for Handling Undefined Policy Expressions

Figure 9:
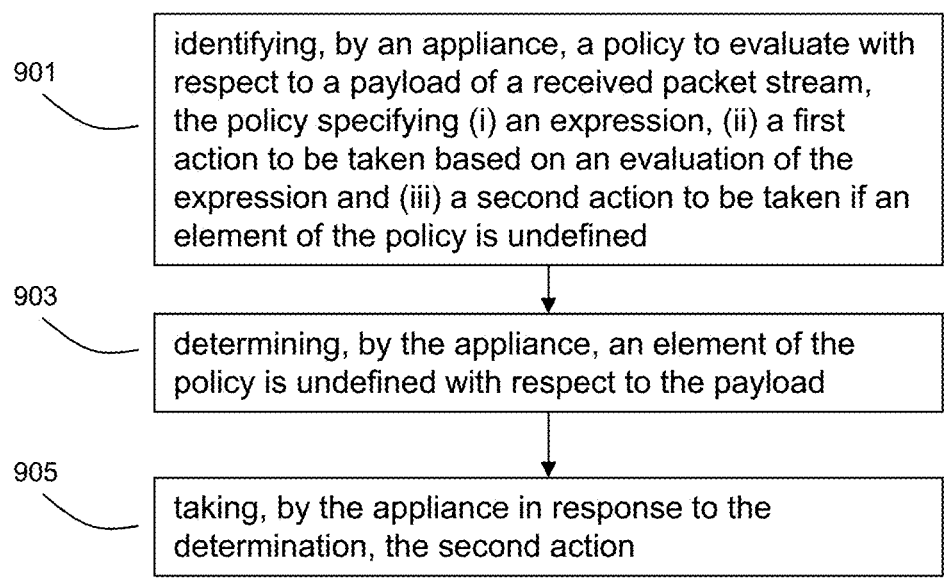
FIG. 9 is a flow diagram of one embodiment of a method for handling undefined policy elements.

Referring now to FIG. 9, an embodiment of a method, in an appliance 200, for applying a policy 760 specifying an action 615*a* to be taken in the event an element of the policy 760 is undefined is shown. In brief overview, an appliance identifies a policy 760 to evaluate with respect to a payload of a received packet stream, where the policy 760 specifies (i) an expression 761, (ii) a first action 615*a* to take based on the expression 761 and (iii) a second action 761 to take if an element is undefined (step 901). The appliance determines that an element of the policy 760 is undefined with respect to the payload (step 903). In response to its determination that an element is undefined, the appliance takes the second action (step 905). Broadly speaking, the method allows a policy to specify an action to be taken if an error or exception is encountered when the appliance attempts to evaluate the policy. In this manner, the second action may be a fallback or error-handling method.

Still referring to FIG. 9, now in greater detail, an appliance identifies a policy 760 to evaluate with respect to a payload of a received packet stream, where the policy 760 specifies an expression 761, a first action 615*a* to take based on the expression 761 and a second action 761 to take if an element of the policy is undefined (step 901). The appliance may identify the policy in any manner. In one embodiment, the expression may be an object-oriented expression. In another embodiment, the expression 761 may identify an object class to apply to a portion of the payload of a packet stream and a member of the object class. In another embodiment, the expression 761 specifies a protocol, and may also specify one or more related methods and fields. The expression may identify any type of object and/or object class. In some embodiments, the expression may comprise one or more methods of an object class.

The packet stream may be received in any manner and from any source. In some embodiments, the packet stream may be transparently intercepted by the appliance. In other embodiments, the appliance may receive the packet stream in the process of proxying one or more transport layer connections. The packet stream may comprise any type of packets including, without limitation, IP packets, TCP packets, UDP packets, and ICMP packets. The packet stream may comprise any other protocol or protocols.

The first action specified by the policy may comprise any action. In some embodiments, the first action may comprise an action to be performed if the expression or a rule containing the expression evaluates to true. In some embodiments, the action 615*a* may relate to load-balancing, content switching, application security, application delivery, network acceleration, or application acceleration. In other embodiments, either action 615*a* may comprise to a "no action" or a default action.

The second action specifies an action to be taken if an element of the policy is undefined. An element of the policy may comprise any portion of the policy including, without limitation, one or more expressions, rules, or operators. An element may be undefined in any circumstance where an appliance cannot successfully assign a value to the element. In one embodiment, an element may be undefined if the element results in a comparison of incompatible types such as, for example, determining whether an integer is greater than a list, or a boolean value is equal to a string. In other embodiments, an element may be undefined if the element results in one or more null values. For example, if an expression attempts to access a "username" value within a URL object and the expression is applied to a data stream with a URL with no username value specified, an operation with respect to the username may be undefined. In other embodiments, an element may be undefined as a result of one or more improper typecasts.

In some embodiments, the second action may have been specified by a user via a configuration interface. For example, upon entering or viewing a policy in the configuration interface, a user may be prompted to enter an action to be taken if the policy is undefined at runtime. In other embodiments, the second action may comprise a preconfigured default second action. For example, a group of policies may have a default action to take in the event of an undefined element. For example, a group of policies enabling URL rewriting may have a default second action of not rewriting any URLs. Or a group of policies for performing load balancing may have a default second action of forwarding the packet stream to a designated backup server.

The appliance 200 may determine if an element of the policy 760 is undefined with respect to the payload in any manner (step 903). In some embodiments, the appliance may determine that the policy is undefined in the process of evaluating the policy. In other embodiments, the appliance may determine that the policy is undefined in the process of precompiling, compiling or interpreting the policy. In some embodiments, the appliance may determine the policy is undefined by detecting one or more exceptions generated during the evaluation of the policy. For example, the appliance may detect a null pointer, overflow, or arithmetic processing exception during the evaluation of the policy.

In response to the determination that an element is undefined, the appliance may take the second action (step 905). The second action may comprise any action described herein. In some embodiments, the second action may comprise terminating the receipt and or transmission of the packet stream. In other embodiments, the second action may comprise no action.

I. Systems and Methods for Configuring and Using Policy Groups

Figure 10A:
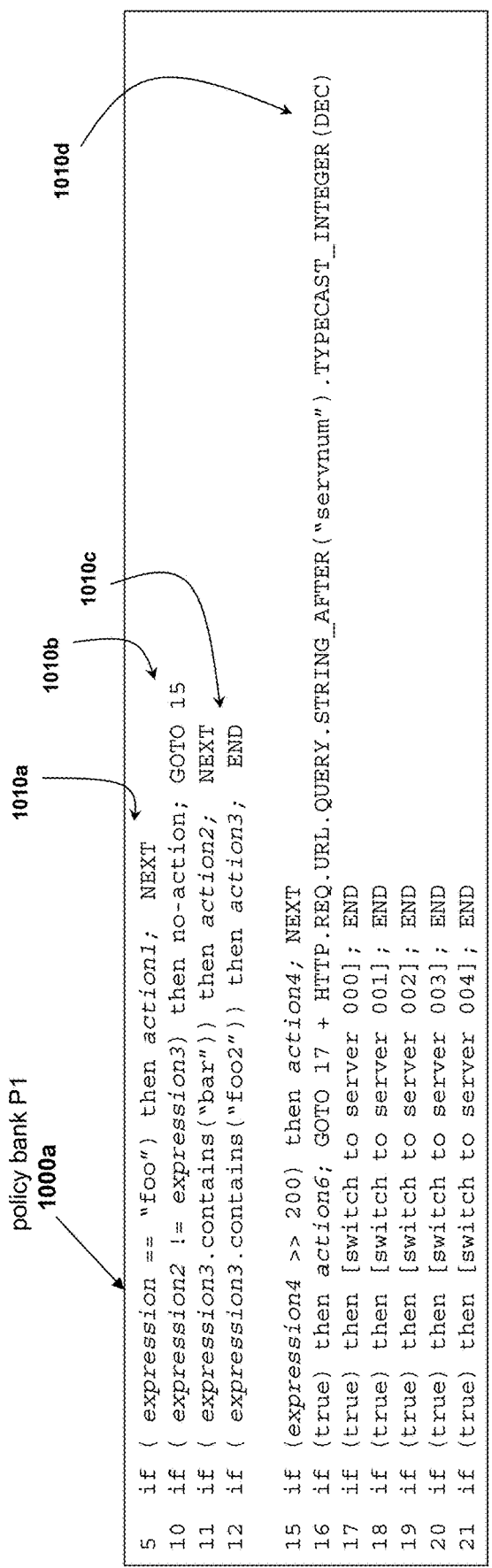
FIG. 10A is a diagram of an example of one embodiment of a policy bank.

Referring now to FIG. 10A, an example of a policy bank is shown. In brief overview, a policy bank 1000a comprises a group of one or more policies with a specified order for evaluation. In the example shown, the order is specified by line numbers for each of the policies. Each policy may also have a flow instruction 1010a, 1010b, 1010c, 1010d (generally 1010) indicating a policy to be evaluated after evaluation of the current policy.

Still referring to FIG. 10A, now in greater detail, a policy bank 1000 may comprise any number of policies including, without limitation, 1, 2, 3, 4, 5, 6, 10, 20, 50, and 100 policies. The policies of a policy bank may comprise any policies described herein. In some embodiments, a policy bank may comprise a group of policies performing a common function. For example, a policy bank may comprise a group of policies providing load balancing functions. Or for example, a policy bank may comprise a group of all the policies for providing caching.

A policy bank may be configured in any manner. In some embodiments, a configuration interface 700 may be provided which allows a user to create and group one or more polices. In some embodiments, a configuration interface may be provided which allows a user to name a given policy bank. In other embodiments, a configuration interface may be provided which allows a user to specify one or more attributes of a policy bank. For example, a policy bank may have a default action to perform in the event of an exception or undefined policy. Or, for example, a policy bank may have a set of circumstances in which the policy bank is applied. For example, a user may specify that a policy bank is to be used with respect to all incoming HTTP traffic. Or, for example, a user may specify a policy bank to be used upon receiving any connection requests from new devices. In other embodiments, a policy bank may comprise a set of attributes which are used to enforce certain characteristics in the policies of the policy bank. For example, a policy bank may require that no policies in the policy bank access a certain object. The attributes of a policy bank may be enforced at configuration time or at runtime.

A policy bank may be stored in any manner. In some embodiments, a policy bank may be stored on a file in an appliance. In other embodiments, a policy bank may be stored in a policy engine 236 of an appliance.

A policy bank may comprise any means of ordering policies for evaluation. In one embodiment, a policy bank may comprise an ordered list of policies. In other embodiments, a policy bank may comprise a set of policies with one or more flow instructions 1010 indicating an evaluation order. In still other embodiments, a policy bank may comprise a numbered list of policies to be executed in order of increasing numbers.

Each expression in a policy bank may specify a flow instruction 1010. A flow instruction 1010 may comprise any information or expression indicating a policy to be executed in the event the policy containing the flow instruction evaluates to true. In one embodiment, a flow instruction may comprise a "NEXT" statement 1010a, which indicates that the next policy in the bank should be evaluated. In another embodiment, a flow instruction may comprise a "GOTO" statement 1010b which identifies another policy in the policy bank to be evaluated next. In some embodiments, a GOTO statement may identify a policy by a line number. In other embodiments, a GOTO statement may identify a policy by a policy name or other identifier. In still another embodiment, a flow instruction may comprise an "END" statement, which indicates that no more policies of the policy bank should be evaluated.

In some embodiments, a flow instruction 1010d may comprise an expression or expression to be evaluated to determine the policy to be executed next. A flow instruction may comprise any expression including, without limitation, any object-oriented expression. For example, the flow instruction 1010d specifies that an integer following a "servnum" portion of a query should be added to 17 to determine the line of the policy to be executed next. In the example policy bank, the flow instruction 1010d may be used to distribute HTTP requests among a number of servers based on a parameter in the requests.

In some embodiments, a configuration interface 700 may be provided with means for a user to order policies within a policy bank. The configuration interface may allow a user to specify line numbers, priorities, list ordering, or any other means of specifying evaluation order. In some embodiments, a configuration interface 700 may allow a user to specify one or more flow instructions with respect to a policy or a policy bank. In other embodiments, the configuration interface may also provide any input means for entering one or more flow instructions corresponding to policies in the policy bank.

Figure 10B:
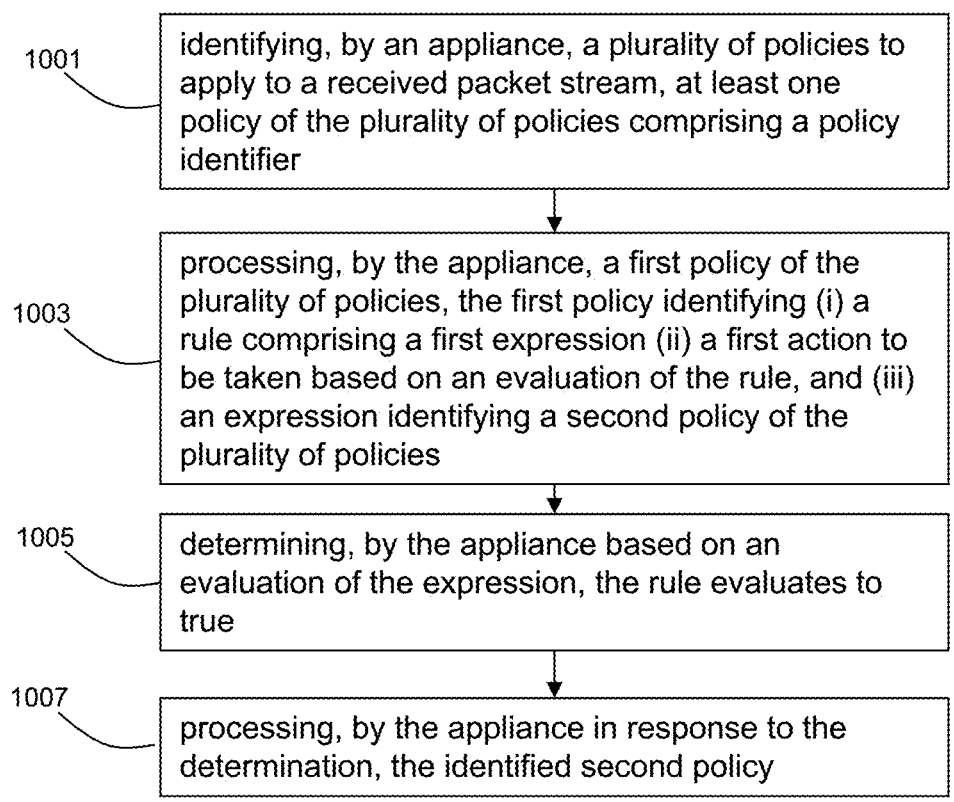
FIG. 10B is a flow diagram of one embodiment for controlling processing order in a group of policies.

Referring now to FIG. 10B, an embodiment of a method of flow control among policies 760 used in a network device 200 processing a packet stream is shown. In brief overview, the method includes identifying, by an appliance 200, a plurality of policies 760 to apply to a received packet stream, where at least one of the policies 760 includes a policy identifier (step 1001). The appliance processes a first policy 760 of a plurality of policies 760, the first policy 760 identifying (i) a rule 605a that includes a first expression 761 (ii) a first action 615a to be taken based on an evaluation of the rule 605a, and (iii) a second policy 760 from among multiple policies (step 1003). Based on an evaluation of the expression 761, the appliance determines that the rule 605a evaluates to true (step 1005). In response to the determination, the appliance 200 processes the identified second policy 760 (step 1007).

Still referring to FIG. 10B, now in further detail, the appliance identifies a plurality of policies 760 to apply to a received packet stream where at least one of the plurality policies specifies a policy identifier (step 1001). The appliance may identify the plurality of policies in any manner. In some embodiments, the appliance may identify that the plurality of policies corresponds to policies for a given data stream, data stream source, or data stream recipient. In one embodiment, the plurality of policies may comprise a policy bank.

The packet stream may be received in any manner and from any source. In some embodiments, the packet stream may be transparently intercepted by the appliance. In other embodiments, the appliance may receive the packet stream in the process of proxying one or more transport layer connections. The packet stream may comprise any type of packets including, without limitation, IP packets, TCP packets, UDP packets, and ICMP packets. The packet stream may comprise any other protocol or protocols.

The at least one policy identifier may comprise any means of identifying a policy, including, without limitation, a line number, policy name, or priority number. In some embodiments, each policy 760 of the multiple policies 760 specifies a ranking indicating a default order in which the policies 760 should be processed.

The appliance 200 processes a first policy 760 of the plurality of policies 760 in which the first policy 760 identifies a rule 605a that specifies a first expression 761, a first action 615a to be taken based on the evaluation of the rule 605a, and an expression 761 identifying a second policy 760 of the plurality of policies 760 (step 1003). The first policy may be processed in accordance with any method for evaluating and processing a policy. In some embodiments, the first policy may comprise an object-oriented expression. In other embodiments, the first policy may comprise a rule comprising an object-oriented expression.

The first policy may contain any expression identifying a second policy. In some embodiments, the first policy may comprise a name of a second policy. In other embodiments, the first policy 760 includes an integer that specifies the ranking of a second policy 760 to be processed next if the first action 615a applies.

In some embodiments, the first policy may comprise a flow instruction 1010. The first policy may comprise any flow instruction, including "next," "goto," or "end." The first policy may comprise any other elements including, without limitation, an action to be performed if an element of the first policy is undefined. In one embodiment, each policy of the plurality of policies may comprise a flow instruction.

Based on the evaluation of the expression 761 by the appliance 200, the appliance determines the rule 605a evaluates to true (step 1005). In some embodiments, this step includes evaluating an object-oriented expression 761.

In response to the determination that the rule evaluates to true, the appliance 200 may process the identified second policy 760 (step 1007). In one embodiment, step 1007 may comprise executing a flow instruction specified by the first policy. In some embodiments, the appliance 200 may evaluate an expression 761 to determine a ranking of a second policy 760 from among the multiple policies 760 to be processed next. In some other embodiments, the appliance 200 may evaluate an object-oriented expression 761 to determine a ranking of a second policy 760 among the multiple policies 760 to be processed next. For example, the appliance may evaluate an expression to determine a line number to be used in conjunction with a GOTO flow instruction. After determining the line number, the appliance may then process the policy at the given line number.

In some embodiments, the appliance may also take the action specified by the first policy upon determining the rule is true. In other embodiments, upon determining the rule is true, the appliance may store the action specified by the first policy in a list. This list may be used to store a number of actions to be taken. In one embodiment, as an appliance processes a number of policies in a policy bank, the appliance may store a list of actions for each policy that contained a rule that evaluated to true. After processing the number of policies, the appliance may then take all of the actions stored in the list. In another embodiment, as an appliance processes a plurality of policy banks, the appliance may store a list of actions for each policy that contained a rule that evaluated to true. After processing the number of policy banks, the appliance may then take all of the actions stored in the list.

Figure 11A:
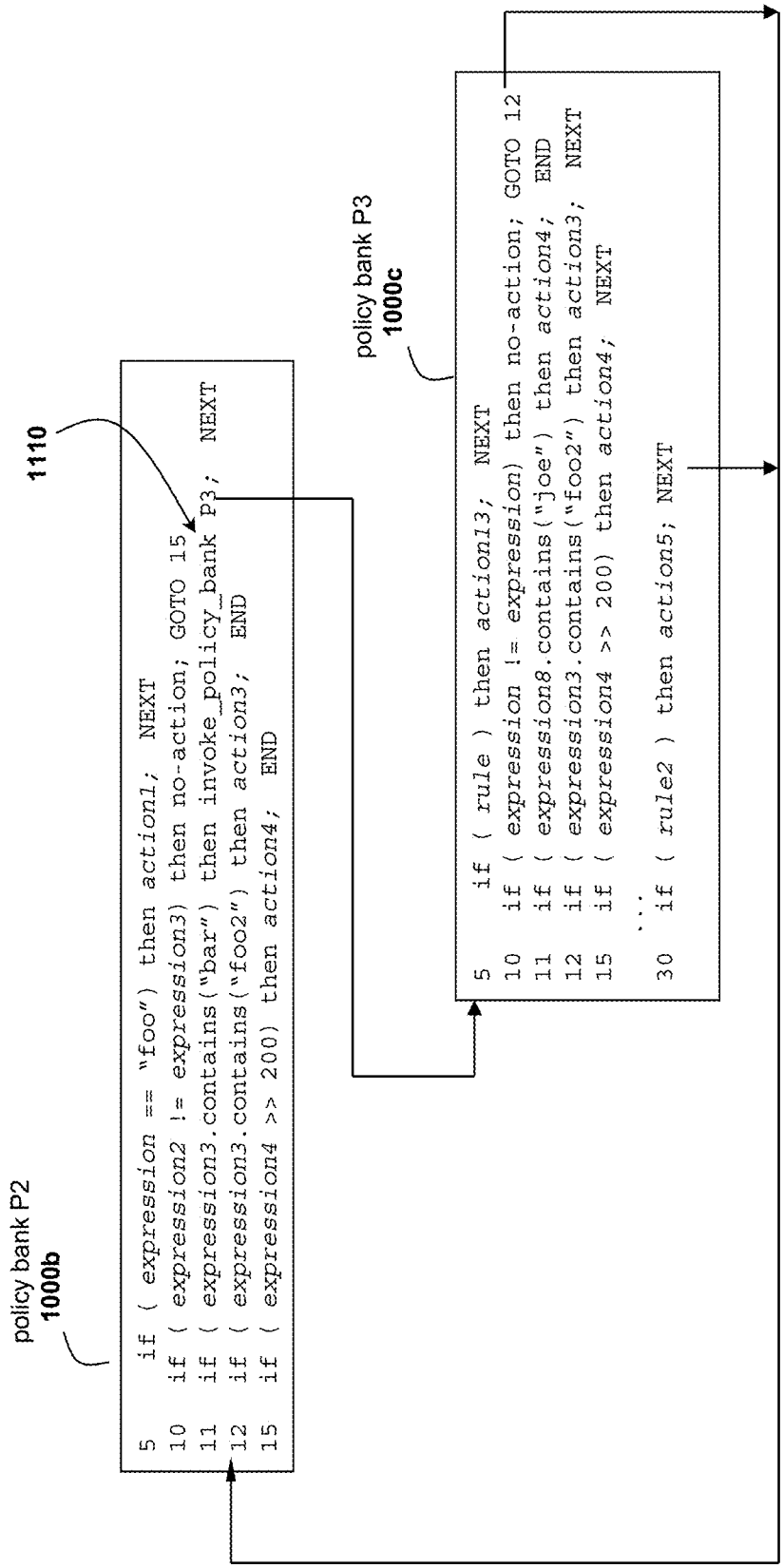
FIG. 11A is a block diagram of one embodiment of controlling processing order among a plurality of policy groups.

Referring now to FIG. 11A, a block diagram illustrating flow control among a plurality of policy groups is shown. In brief overview, a policy bank 1000b comprises a number of policies. One of the policies comprises an invocation action 1110 which invokes a second policy bank 1000c. The invocation action 1110 indicates a policy bank 1000c to be processed if the rule of the policy containing the action evaluates to true. After processing the invoked policy bank, an appliance may then resume processing the first policy bank 1000b. This processing will be further described with respect to FIG. 11B.

Still referring to FIG. 11A, a configuration interface 700 may be provided which allows a user to specify an order of execution among policy groups by including one or more invocation actions 1110. An invocation action may identify a policy group in any manner including, without limitation, by name, by memory location, or by any other identifier. In some embodiments, the policy groups may comprise policy banks. In still other embodiments, an invocation action 1110 may specify a specific policy within a second policy bank.

In some embodiments, an invocation action 1110 may include one or more directives indicating how the second policy group is to be processed. In one embodiment, an invocation action 1110 contained in a first policy bank may specify whether or not processing of the first policy bank should be resumed after processing the invoked policy bank. In another embodiment, an invocation action 1110 may specify whether or not processing of the first policy bank should be resumed if a hard stop or exception is encountered in the invoked policy bank. For example, an invocation action may specify that if an "END" flow instruction is encountered in the second policy bank, that processing should resume with the first policy bank. Or an invocation action may specify that if an exception or "END" flow instruction is encountered in the second policy bank, that no more policies of the first policy bank should be processed.

In this manner, a user may configure a number of policy banks to ensure that certain policies are processed, even where the results of one or more policy banks are uncertain. For example, a policy bank providing policies for denying access to restricted URLs may invoke a policy bank for providing SQL security upon detecting that a URL indicates that a request contains SQL queries. The invocation may specify that regardless of the outcome of the SQL security policy bank processing, processing should resume at the URL module after the processing of the SQL policy bank. In this manner, the user may be assured that all of the restricted URL enforcement policy bank are executed, which may ensure that all restricted URLs are blocked.

A user may also use policy bank invocation actions 1110 to ensure that policies are not evaluated in the event a given policy bank encounters an exception or hard stop. For example, a policy bank providing content switching policies may, after determining an application corresponding to a request, may invoke a policy bank containing application security policies for the application. The invocation may indicate that if the application security policy bank encounters an "END" instruction, no more policies are to be evaluated in the content switching policy bank. This may be used in cases where an "END" instruction in the application security policy bank indicates that a security requirement has not been met, and thus no more processing of the request should be done.

In some embodiments, an appliance may be configured with one or more default execution orders for policy groups. For example, an appliance might have one or more global policy groups which are always applied first, followed by one or more appliance or vServer specific policy groups which are processed following the global policy groups. In some embodiments, policy banks may have a default ordering responsive to the functions the policy banks perform. For example, a policy bank of SSL policies may be applied first to incoming traffic, and then a set of security policies may be to the decrypted traffic, followed by a bank of content switching policies.

Figure 11B:
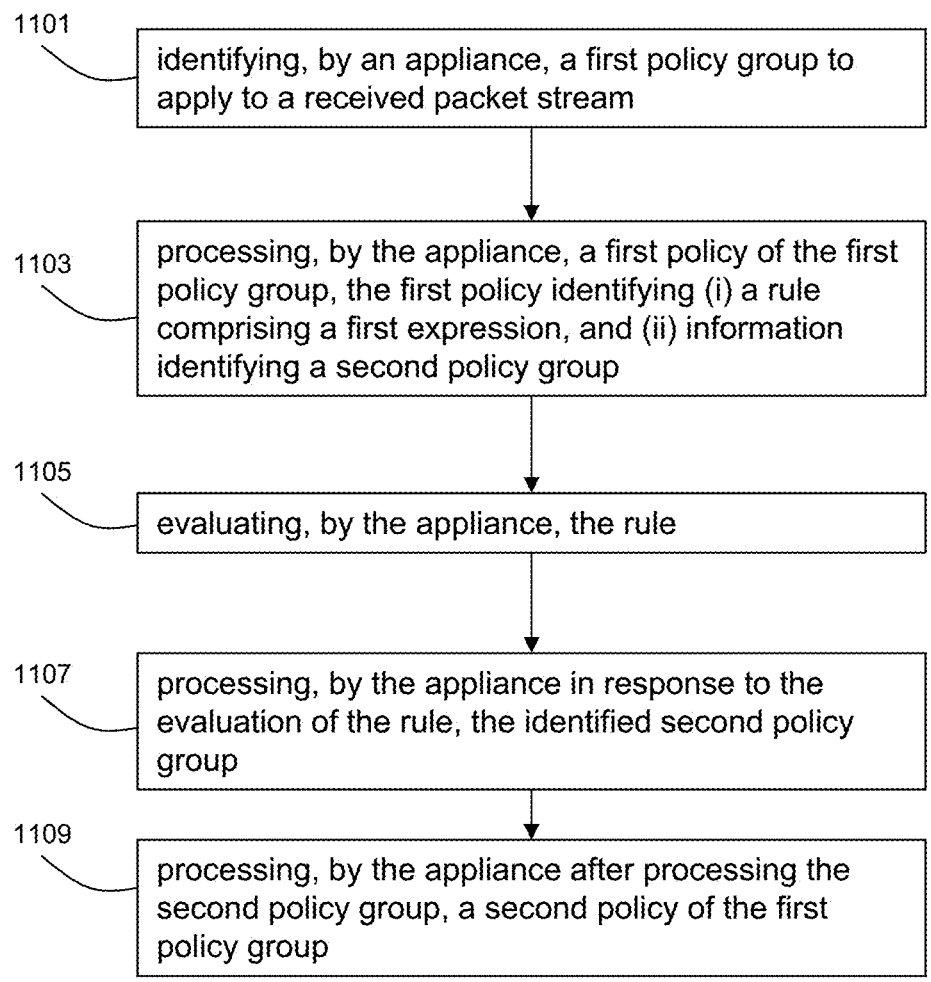
FIG. 11B is a block diagram of one embodiment of a method of controlling processing order among a plurality of policy groups.

Referring now to FIG. 11B, an embodiment of a method of flow control among policy groups used in a network device 200 processing a packet stream is shown. In brief overview, an appliance identifies a first policy group to apply to a received packet stream (step 1101). The appliance processes a first policy of the first policy group, where the first policy identifies (i) a rule 605a specifying a first expression 761, and (ii) information identifying a second policy group (step 1103). The appliance evaluates the rule 605a (step 1105). In response to the evaluation of the rule 605a, the appliance processes the identified second policy group (step 1107). After processing the second policy group, the appliance processes a second policy 760 of the first policy group (step 1109).

Still referring to FIG. 11B, now in greater detail, an appliance may identify a first policy group to apply to a received packet stream in any manner (step 1101). The packet stream may be received from any source and may comprise any protocol or protocols.

In some embodiments, the first policy may comprise an object-oriented expression. In other embodiments, the first policy may comprise a rule including at least one expression and/or object-oriented expression. In some embodiments, the first policy 760 specifies an action 615a to be taken based on an evaluation of the rule 605a.

The information identifying a second policy group may comprise any form of identifying information. In one embodiment, the second policy group may comprise a policy bank, and the identifying information may comprise a name of the policy bank. In some embodiments, the information identifying the second policy bank may comprise an invocation action 1110.

The appliance may process the first policy 760 in any manner (step 1103). The appliance may evaluate one or more object oriented expressions in processing the policy.

The appliance 200 may evaluate the rule 605a in any manner (step 1105). In some embodiments, the appliance may evaluate an object-oriented expression 761. In some embodiments, the appliance may determine a boolean value corresponding to the rule.

In response to the evaluation of the rule 605a, the appliance processes the identified second policy group (step 1107). In some embodiments, the appliance may only process the second policy group if the rule evaluates to true. In other embodiments, the appliance may only process the second policy group if the rule evaluates to a non-zero value. The appliance may process the second group in any manner. In some embodiments, the appliance may process the second policy bank beginning with a specific policy identified by an invocation action 1110.

In some embodiments, after processing the second policy group, the appliance may process a second policy of the first policy group. For example, in FIG. 11A, an appliance may evaluate the policy of line 11 in the policy bank 1000b. If the rule is true, the appliance may take the invocation action 1110, and the appliance may process policy bank 1000c. After completing the processing of policy bank P3, the appliance may return to the policy bank 1000b and process the next instruction, which is line 12. In some embodiments, the appliance may only resume processing the first policy bank if the second policy bank results in a soft stop, such as where the last instruction of a policy bank points a NEXT instruction, as in line 30 of policy bank 1000c. In other embodiments, the appliance may resume processing of the first policy bank even where a hard stop is indicated, such as line 11 of policy bank 1000c.

In some embodiments, the second policy group may also contain one or more invocation actions. In these embodiments, policy bank evaluations may be chained in any manner. In some embodiments, an appliance 200 may process a third policy group, where the third policy group is identified by a policy 760 in the second policy group. In other embodiments, the first policy bank may have a plurality of invocation actions 1110. In these embodiments, the appliance may process a third policy group, where the third policy group is identified by a second policy 760 of the first policy group. In still other embodiments, the first policy 760 specifies a second policy 760 of the first policy group to be processed after the second policy group is processed. For example, a policy comprising an invocation action 1110 may also comprise a flow instruction which specifies a policy of the first policy group to be processed after processing returns from the second policy group.

J. Systems and Methods for Database Proxy Request Switching

Referring now to FIG. 11A, a system for providing database proxy services between one or more database servers and one or more application servers is depicted. An intermediary device of the system, such as an appliance, may select a database from a plurality of databases to forward a structured query language (SQL) query request based on a property of the SQL request. In brief summary, the appliance 200 may provide a plurality of services for facilitating and processing communications with databases or database servers 806, including but not limited to load balancing 890, health monitoring 889, authorization, authentication and auditing (AAA) 897, database caching 877, SQL firewall 876, content switching and policy-based transactions. In some embodiments, specialized network services available to web servers and application servers may be adapted to support a plurality of databases or database servers. For example, the packet switching system of an appliance may be configured or adapted to support database protocols, such as SQL, so as to provide some or all of these services.

The load balancer and/or content switching module may include any embodiments of the switching features 284 described in embodiments of FIGS. 2B and 4C. The load balancer may include any embodiments of a vServer 175 to provide switching and/or load balancing functionality. In any of these embodiments, the switching 284 and/or vServer 275 may be designed and/or constructed to perform any of the database proxying, switching and load balancing functionality described herein. In some embodiments, the load balancer manages switching between databases based on application one or more policies and policy expressions on a database request or query. Similarly, the appliance may provide content switching between databases, database servers and/or connections based on application of one or more policies and policy expressions. For example and in one embodiment, a policy engine of the appliance may apply one or more policies on a received database message, such as a SQL query. A policy expression may, for example, parse or identify properties or parameters, such as user information, from the query and direct the query to a connection previously established (e.g., for the user) to a database. Thus, by using policy expressions, the appliance may be able to support user persistence for database communications with respect to a database connection, database, database server, and/or core of the multi-core system. The appliance can similarly use policy expressions to maintain persistence with respect to a database, database server, database connection, etc.

The health monitoring module 889 may include any embodiment of the monitors described in conjunction with FIGS. 6A-6E. The monitors may be designed and configured to support, provide and implement health monitoring of database services, database servers and/or databases by the appliance 200 as described herein. The health monitors, in communication with one or more database services, database servers and/or databases, may transmit and/or receive messages using SQL or other database-based communications. The appliance may perform health monitoring based on policies and/or policy expressions. For example, policy expressions may identify a database protocol, user, or other information for monitoring related to a particular query, set of queries, user, connection, database, protocol, and/or database server. The appliance may provide health monitoring for various aspects of database communication and transaction by executing one or more vservers on the appliance. The appliance may associate one or more health monitoring policies to each of these vservers.

The SQL firewall may be part of or include any embodiment of the AppFW described herein, such as any embodiment of the AppFw 290 of FIGS. 2B and 4C. The SQL firewall may be designed and constructed to perform checking and protection of database communications traversing the appliance 200, such as checking SQL queries and responses. The SQL firewall may allow, deny, filter, redirect or otherwise process database communications responsive to applying one or more firewall policies. The firewall policies may include one or more features, such as embodiments of policy expressions substantially similar to policy expressions described above in connection with FIGS. 8A through 11B.

The database caching may include any embodiments of caching described herein, including but not limited to the cache management 232 functionality described in conjunction with FIG. 2A. The cache management of the appliance may be designed and constructed to cache database-related objects, SQL queries and responses as described herein. The database caching may cache selected content based on one or more policies applied to a database query or data transfer. The one or more policies may include one or more features, such as embodiments of policy expressions substantially similar to policy expressions described above in connection with FIGS. 8A through 11B.

A database server may be a server or program that provides database services to other computer programs or hardware devices. A database server may include and/or provide access to one or more databases. In some embodiments, a database server may be referred as a database. Database servers are sometimes referred to as database management systems (DBMS). Examples of database servers include Oracle, DB2, Informix, Ingres and Structured Query Language (SQL) servers. Although each server may use its own query logic and/or structure, the SQL query language may be more or less the same across most database servers. Each database server may support one or more databases. A database server may include one or more features of a server 106 and/or client 102, for example, embodiments of servers and clients described above in connection with FIGS. 1A-1F, 2B, 3 and 4A-4C.

A database may include one or more storage devices that supports particular data structures for holding information. In some embodiments, a database or database server may include a storage area network (SAN). By way of illustration, some of the commonly-deployed databases include MYSQL (e.g., open source), MICROSOFT SQL Server (e.g., popular with small to medium enterprises), Oracle (e.g., common in mission-critical deployments), PostgreSQL and DB2.

One or more servers or application servers 106 may be in communication with a database server 806 over one or more networks 104, 104'. An application server may request data from a database server, or may send data to a database for storage. An application server may include one or more features of various embodiments of a server 106 or client 102, for example, embodiments of servers 106 and clients described above in connection with FIGS. 1A-1F, 2B, 3 and 4A-4C.

An intermediary device 200 or appliance 200 may support or facilitate communications between a server 106 and a database server 806, e.g., by providing one or more specialized services. These specialized services may be directed to supporting particular database protocols and/or data transfer or access characteristics. In brief overview, the appliance may support one or more of the following features or services, though not limited to: (1) Connection Multiplexing, which can allow requests from multiple client connections to share one or many server-side connections, and may further support load balancing, content switching and connection pooling features; (2) Load balancing, which may use request tracking to provide least-connection-based load balancing to equally load database servers, or use other load balancing mechanisms including custom-load-balancing; Content Switching may be deployed in a master/slave configuration to scale databases, e.g., parsing the SQL queries, and sending write queries (e.g., INSERT/UPDATE/DELETE) to the master and read queries to the slaves; properties of the SQL query may be exposed through application of one or more policies or policy expressions; (3) Monitors, which can be SNMP based and/or SQL query based, which may include TCP monitors and monitors which describe the health of each database and/or database server; (4) AAA, for example to provide a single audit point and/or provide authentication for funneling requests from a single client side connection to different server-side connections; (5) Caching which can optimize web applications, for example using memcached, which may or may not involve modifying the application; (6) SQL Firewall for providing features such as SQL injection prevention; and (7) other features such as Rewrite, Responder, Compression and SSL offload.

In various embodiments, a server 106 or client 102 accessing a database may use a protocol of the database to communicate with the database server 806. Each database may have its own protocol, although in certain cases, the SQL language is common between a plurality of databases. Some of these protocols may be built on top of TCP and may be connection-based. The protocol structure, features, parameters and characteristics may parallel HTTP to a certain extent. For example, SQL is also request-response based. SQL protocol communications may involve an initial handshake for exchanging capabilities and/or compatibilities in a client-server relationship. The handshake may also involve authentication of the "client". To support SQL protocol, the appliance may be configured to support properties associated with a client-server connection. Properties may be defined and/or configured for an authenticated user. One or more properties may be parsed from a query (e.g., SQL query) and/or identified based on the query. In some embodiments, an authenticated user is a user who has established a connection (e.g., client-server connection). Different permissions may be granted to different users. Accordingly, each connection may be associated with an authenticated user to prevent multiplexing of requests between different users. In a web application deployment, however, multiple clients (e.g., application servers) may have the same user. In using and supporting protocols like MYSQL, the appliance may be configured to change the user associated with a connection. The appliance may operate in a number of modes. In one mode, the client-side connection may be authenticated with respect to a user. In another mode, the appliance may operate and/or reside transparently between the client and the server.

Properties may be defined and/or configured for each database. Each database server may have the ability to host multiple databases. Each connection may be associated with a database. However, it may be undesirable or not possible for requests from different databases to be multiplexed on the same connection. The appliance may be configured to support creation of a connection without a database association. Such connections may be used to run commands which query the health of a server, for example. The appliance may be able to change the database associated with a connection.

Properties may be defined and/or configured with respect to client-server capabilities. Each connection may have or support one or more associated client-server capabilities or properties, for example server version, protocol version, compression, ssl, transactions, character set, etc. Each of these capabilities or properties may be associated with, or define a connection. The appliance may be configured to prevent multiplexing of requests of connections with different capabilities.

Properties may be defined and/or configured for compression and/or SSL. Various database protocols may support compression and/or SSL. For properties that do not support compression and/or SSL, the appliance may be configured to provide graceful degradation. In some embodiments, one or more properties may be used to identify a connection for directing a query to an appropriate database or database server. The intermediary may determine, based on the one or more properties, a connection, database and/or database server that is available and/or suitable handling the query. For example, a particular existing connection may be able to support SSL or compression associated with one or more identified properties.

Properties may be defined and/or configured for transactions. One aspect of a database connection is the presence of a transaction. Transactions can ensure that multiple SQL queries are treated as a single atomic query. If a connection to the database occurs in the middle of a transaction, queries from another client-side connection may be unable to multiplex onto the transaction and/or connection. Transactions may be started by using the query "BEGIN" and terminated by using the query "COMMIT". In MYSQL, a connection can be made transactional during handshake by unsetting the autocommit bit, or by issuing the query "SET AUTOCOMMIT=0". The appliance may support any version of MYSQL, including but not limited to, for example, version 4.1.

In some embodiments, the appliance may process or handle MYSQL packets. Every mysql packet may include a 4-byte header. This header may contain the size of the trailing body. The appliance may use this data structure to parse, extract and interpret the 4-byte header, e.g., to determine a packet type. The appliance can then parse the body of a MYSQL packet based on the packet type.

The appliance may determine the type and/or characteristic of a MYSQL transaction. For example, the appliance may determine the value of the connection level AUTOCOMMIT parameter or the presence of BEGIN:COMMIT queries. The AUTOCOMMIT parameter may be set during the initial handshake. This parameter can also be set after connection establishment, e.g., using the query SET AUTOCOMMIT. In some embodiments, the appliance is configured to parse every query to determine the beginning and end of a transaction. The appliance may be configured, e.g., by a nsapimgr knob or control, to be transaction aware or not. The appliance may be configured by another knob or control, on whether to apply explicit parsing. This control may an option to avoid the processing overhead for parsing of every query.

In MYSQL protocol, a response may include flags to indicate whether a connection is in a transaction or not. If the connection is a transaction, the TRANSACTION flag is generally set. If the Autocommit mode is OFF, then the AUTOCOMMIT flag is not set. The appliance may parse the response for one or more of these flags. If the TRANSACTION flag is set or AUTOCOMMIT flag is not set, the appliance may not activate connection multiplexing. In some embodiments, connection multiplexing is activated by default if the above condition is not met.

A Mysql database server may support a plurality of character sets. The appliance may support a different number of character sets from that of the database server. The appliance may be configured to support a matching dataset with respect to the server during connection establishment. In some embodiments, the appliance may be configured or reconfigured to support a particular character set at any time by sending and/or processing a query. In some embodiments, a character set is associated with a connection. The appliance may process requests on connections such that a request with one character set is not multiplexed onto a connection with a different character set.

The appliance may be built and/or configured to parse queries sent by the client and results sent by the server. The appliance may make portions of each request and/or response available to an administrator through policy expressions (e.g., Policy Infrastructure, PI expressions). In some embodiments, the appliance is built and/or configured to support most or at least some character sets. The appliance may support some of the more commonly used data sets, e.g., UTF-18, ASCII and LATIN-x series. The character set associated with a connection can change after the initial handshake. This may be implemented by the appliance using one or more queries, such as:

```
SET NAMES <charset> COLLATION <collation>
SET CHARACTER SET <charset>
```

In some embodiments, the appliance includes an algorithm for character set handling. Character set handling may involve a first or initial character set which is identified during authentication. This character set may be used to parse messages, e.g., the uname/db sent in the message. This character set may be used to parse messages, e.g., the uname/db sent in the message. The server may assume that received queries are expressed using this character set. After authentication, the client can change the character set using one of a plurality of ways, for example, using the following commands or queries transmitted to the appliance:

SET NAMES 'C2'—The appliance may parse a query, extract the value of C2 and then associate it with the corresponding connection. The appliance may identify if a client connection is associated with a "SET NAME", and issue the same command on the server.

SET CHARACTER SET 'C2'—The appliance may handle this in a similar way to "SET NAMES".

SET @@character_set_client='utf8'

If two or more queries are received on the same connection, e.g., SET NAMES and SET CHARACTER SET, the appliance may handle the potential conflict. By way of illustration and in one embodiment, a client may create a TCP connection to the appliance. The appliance may send a server hello message with a first character set (e.g., to vsvr→charset, with default value: LATIN1). The client may send an authentication packet (e.g., AuthPkt) with charset C1. If, for example, the appliance determines that C1 is not an ASCII compatible encoding like LATIN1/2/5/7 and C1 is not UTF8 (only supported types), the appliance may return an ERROR message. The appliance may set its supported character set to C1 (e.g., CPCB→udb→cset=C1). The appliance may then parse for parameters and/or properties (such as uname/db) using C1. The appliance may further handle certain queries that modify the state of the connection (such as SET/PREPARE) so that these do not break request switching.

In some embodiments, responsive to receiving the latter queries, the appliance may respond back to the client with an OK response, but store the request onto the connection for separate or special processing.

By way of illustration, and not intended to be limiting in any way, the following pseudo code is one embodiment of a method for handling some of the above situations:

```
if request from client is a Query
    the query may be parsed using CPCB->udb->n_cset
    if command == "SET"
        if query == "SET NAMES 'C2'" && C2 is supported
            CPCB->udb->n_cset = C2
            Cpcb->udb->query_list << query
            Respond with OK
        else if query == "SET CHARACTER SET 'C2'" && C2 is supported
            CPCB->udb->n_cset = C2
            Cpcb->udb->query_list << query
            Respond with OK
        else if query is valid
            cpcb->udb->query_list << query
            Respond with OK
        else
            move to ABORT_CONN_TRACK
        end
    else if command == "PREPARE" || "USE"
        cpcb->udb->query_list << query
        Respond with OK
    end
end
...
Content Switch/Load Balance
...
Find Server connection(SPCB) with same UDB as the client
if no SPCB found
    send AuthPkt on a new SPCB
    for each stored_query in UDB->query_list
        response = Send stored_query on SPCB
        if response is ERROR
            Close SPCB
        end
    end
    response = forward query to server
    return response to client
else
    response = forward query to server
    return response to client
end
```

In the above, UDB may represent a data structure that stores client properties such as username, database, charset, etc. When a connection is created to the backend server, a connection with the same UDB may be picked up from a connection re-use pool. A query list may also be checked when matching to a UDB. While parsing the query, CSET may be used as a default character set. The initial CSET may be set in the authentication packet. Following authentication, the appliance may change the value of CSET when commands like SET NAMES or SET CHARSET are received. In some embodiments, the appliance may store a plurality of queries for each connection. Beyond a predetermined number of queries, the appliance may trigger a special mode for handling, e.g., Abort Conn Tracking Mode.

In some embodiments, the appliance may handle some SQL commands in a modified or different manner, e.g., SET, USE <db>, INIT_DB, PREPARE and COM_PREPARE commands. SET SQL queries may be used to define variables and/or properties which are associated with the connection. SET commands may be used to define global variables too. The appliance may apply a "WTM off" mode, e.g., to differentiate between global and local variable, or to handle conflicts. An user can change a database associated with a connection using the INIT_DB command or the USE query. In these cases, the appliance can parse the database value sent. Based on the determined database, the appliance can either (1) send a request to a corresponding server, (2) wait for an OK message and then set the database associated with the connection to the determined database, or (3) generate the OK message itself. If the appliance is in the middle of a transaction, the appliance may in some embodiments send the query directly to the server. The above behavior may be controlled via an API knob. The PREPARE or COM_PREPARE queries or commands may be used to create prepared statements associated with a connection. For the PREPARE or COM_PREPARE queries, the appliance may operate in a WTM off mode.

In some embodiments, the appliance may support connection multiplexing. The appliance may track the beginning and end of each SQL request and response, e.g., similar to that in HTTP requests and responses. The appliance may track this by accumulating and/or parsing incoming request data until the appliance determines the server for sending the request to. In some embodiments, at least the request header is accumulated in this process. Once the server is selected or identified, the appliance may identify or select a back-end connection from the server-side pool. The appliance may link the back-end connection to the client connection. The server-side connection may be selected based on corresponding or matching properties or parameters (e.g., user/db/capabilities). In situations where there is lack of a matching connection, a new back-end connection may be established. In some embodiments, the new connection is established if the appliance is in authentication mode.

In some embodiments, the appliance forwards the request to the identified server. The appliance may forward the response from the server to the client. When the complete request/response has been transmitted, the appliance may process the connections (e.g., client and/or server side connections) for reuse (e.g., using an init(Client/Server) ForReuse process). The appliance may delink or decouple the client-server connections. The delinked or decoupled connections may be placed in queues (e.g., serverinfor queues). These connections may be further segregated based on parameters such as user, db, capabilities, etc.

The appliance may provide authentication services to database protocol connections. The appliance may operate in a Transparent Mode. In the transparent mode, the appliance may create a connection between the client and the server that is end-to-end. In this case, when a client connects to the appliance, a connection to the server is created concurrently. The appliance may serve as a bridge for the authentication process, while the authentication occurs on the server. When the authentication is complete, the appliance can decouple the two connections and place them in the reuse pool. In some embodiments, a user may not need to configure any credentials on the appliance, possibly reducing friction involved in deployment. Monitors may be limited to TCP/SNMP-based monitors in the absence of available credentials.

In some embodiments, the appliance may operate in Authentication Mode (e.g., instead of Transparent Mode). An administrator may configure database users on the appliance as SQL users. The appliance may authenticate the client side connection. The appliance may provide credentials for server-side connections. In this mode, the appliance may define or add SQL user as a new type of user, e.g., to distinguish from AAA-type user. This may avoid the situation where a user tries to login via AAA/VPN using the credentials of a database user (i.e., SQL user) and vice versa.

In some embodiments, the appliance may provide load balancing features. Some of these features may be adapted from pre-existing features described above. By way of illustration, load balancing in the Transparent Mode may involve selection of a server with a matching server-side connection that is available. The appliance may select from one of a plurality of servers providing access to a requested content, file or type of data. The appliance may select from one of a plurality of servers that is consistent with, or supports the properties identified based on the received query. The appliance may select from one of a plurality of connections that is consistent with, or supports the properties (e.g., character set) identified based on the received query. The appliance may select one of the plurality of servers and/or connections for handling the query based on application of a policy on one or more properties identified. In certain embodiments, the appliance may select one of a plurality of servers and/or connection that supports a transaction type identified based on one or more received queries.

The appliance may select one of the plurality of servers and/or connections that is presently not handling any queries, or handling fewer queries than another server and/or connection. By way of illustration, the appliance may determine that one or more queries have been buffered/stored for a first connection or database server, and may select another connection or database server for handling a new query. The appliance may reconfigure a selected connection based on the query and/or one or more properties identified. In some embodiments, the appliance may establish a new connection for sending the query to the selected database server.

In some embodiments, the appliance may provide content switching features. The appliance may provide one or more database-related content switching policies adapted from available content switching policies. The content switching policies may use various rules or conditions to select a server, e.g., via connection characteristic, command parameters, properties or information based on an SQL query. These types of information may be parsed, tested or exposed using policy expressions.

The appliance may be configured to support various policy expressions for supporting database queries and transactions. Various types of information or properties may be exposed through policy or PI expressions, e.g., via a policy engine of the appliance. The policy expressions may include one or more features of policy expressions described above in connection with FIGS. 7A through 11B. Policy expressions configured for HTTP or other protocols may be adapted for SQL.

One classification of properties or information that an appliance may expose through policy expressions is connection characteristics. Connection characteristics may include data associated with a database connection. Since each of the connection characteristic data point may be dependent on the respective database protocol, each data point may be name-spaced in connection with the respective protocol. Examples of policy expressions for connection characteristics include:

MYSQL.USER—String of the authenticated user
MYSQL.DATABASE—String of the database associated with the connection
MYSQL.CAPABILITIES—An indicator of client capabilities established during handshake
MYSQL.CHARSET—The Character Set sent by the client Another classification of properties or information that an appliance may expose through policy expressions is command parameters. Command parameters may include characteristics of the actual request. Command parameters may be protocol specific and hence may incorporate protocol specific namespacing. Examples of policy expressions for command parameters may include:

MYSQL.REQ.SIZE—Size of the request

MYSQL.REQ.COMMAND—The type of command

MYSQL.REQ.SIZE—Integer representing the size of the request. This is similar to CONTENT_LENGTH property of HTTP.

MYSQL.REQ.COMMAND—Enum for the type of request command. The different values of the ENUM may be QUERY, INIT_DB, etc.

Yet another classification of properties or information that an appliance may expose through policy expressions is based on SQL Query Information. Data manipulation on a database may be carried out using SQL queries. The grammar for these queries are mostly standard for databases. In some embodiments, there are different approaches for exposing SQL queries to the user through policies. One approach may be to expose the entire query string to the user and allow the user to make decisions using existing string manipulation functions. Another approach may involve parsing the query and exposing parts of the query using policy expressions. One non-limiting example of a SQL query is:

SELECT COL1,COL2 FROM TABLE1 WHERE CONDITION1;

(command) (selectpart) (frompart) (wherepart)

Each section of the SQL query may have an associated name. These names we may be used in or identified using policy expressions. Examples of policy expressions based on SQL query information include:

MYSQL.REQ.SIZE—Size of the request

MYSQL.REQ.QUERY.SELECTPART

MYSQL.REQ.QUERY.INSERTPART

MYSQL.REQ.QUERY.FROMPART

MYSQL.REQ.QUERY.TEXT—String covering the entire query.

MYSQL.REQ.QUERY.TEXT(n)—String covering the first n bytes of query. Like HTTP.BODY(n)

MYSQL.REQ.QUERY.COMMAND—String for the first keyword of the query.

Another classification of properties or information that an appliance may expose through policy expressions is Response Parameters. Response parameters, such as server status and error numbers, may be exposed through expressions. Expressions for rows and field set can also be exposed. To expose the individual column, the appliance can be configured to use terminology similar to JDBC, where the datatype of the column may be known to the user. If the datatype of the column sent by a server is different from that of the expression, an undefined return value (e.g., UNDEF) may be raised. NULL columns may be checked using an IS_NULL( ) expression, for example. Examples of policy expressions based on response parameters include:

MYSQL.RESP.ERROR

MYSQL.RESP.STATUS

MYSQL.RES.ROW(i).TEXT_T_ELEM(j)

MYSQL.RES.ROW(i).NUM_AT_ELEM(j)

MYSQL.RES.ROW(i).BOOL_AT_ELEM(j)

MYSQL.RES.ROW(i).DOUBLE_AT_ELEM(j)

MYSQL.RES.ROW(i).IS_NULL(j)

MYSQL.RES.TYPE—Enum for the response type. Its values can be MYSQL_RES_ERROR, MYSQL_RES_OK, MYSQL_RES_RESULT_SET MYSQL.RES.ERROR.NUM—This may include the error number field of the error response. If this expression is called when the response type is not error, then an UNDEF may be raised. Using ERROR as a namespace to indicate ERROR response type.

MYSQL.RES.ERROR.SQLSTATE—String for the sqlstate field of the error response.

MYSQL.RES.ERROR.MESSAGE—String for the message field of the error response.

MYSQL.RES.OK.AFFECTED_ROWS—Long integer for the affected_rows field of OK packet MYSQL.RES.OK.INSERT_ID—Long integer for the insert_id field of OK packet MYSQL.RES.OK.STATUS—Integer for the status field of OK packet MYSQL.RES.OK.WARNING_COUNT—Integer for the warning count field of OK packet MYSQL.RES.OK.MESSAGE—String for the message field of the OK packet.

MYSQL.RES.RESULT_SET.STATUS—Integer for the status field of result set response

MYSQL.RES.RESULT_SET.WARNING_COUNT—Integer for the warning count field of result set response MYSQL.RES.FIELDS_COUNT—Long Int for the number of columns in the response MYSQL.RES.FIELDS[index].CATALOG—String, property of the index'th field MYSQL.RES.FIELDS[index].DB—String, property of the index'th field MYSQL.RES.FIELDS[index].TABLE—String, property of the index'th field MYSQL.RES.FIELDS[index].ORGIGINAL_TABLE—String, property of the index'th field MYSQL.RES.FIELDS[index].NAME—String, property of the index'th field MYSQL.RES.FIELDS[index].ORGINAL_NAME—String, property of the index'th field MYSQL.RES.FIELDS[index].CHAR_SET—String, property of the index'th field MYSQL.RES.FIELDS[index].DATATYPE—String, property of the index'th field MYSQL.RES.FIELDS[index].FLAGS—Integer property of the index'th field MYSQL.RES.FIELDS[index].LENGTH—Integer property of the index'th field MYSQL.RES.FIELDS[index].DECIMALS—Integer property of the index'th field MYSQL.RES.ROWS_COUNT—Long Integer for the number of Rows in the response MYSQL.RES.ROW[i].NUM_AT_ELEM[j]—The j'th column of the I'th row returned as an integer MYSQL.RES.ROW[i].TEXT_T_ELEM[j]—The j'th column of the I'th row returned as a string MYSQL.RES.ROW[i].BOOL_AT_ELEM[j]—The j'th column of the I'th row returned as a boolean MYSQL.RES.ROW[i].DOUBLE_AT_ELEM[j]—The j'th column of the I'th row returned as a double MYSQL.RES.ROW[i].IS_NULL_ELEM[j]—If the j'th column of the I'th row is NULL or not, returned as a boolean In view of the policy expressions described above, as well as in connection with FIGS. 7A through 11B, an appliance can be configured to provide various database proxy services. For example, policy expressions configured for HTTP or other protocols may be adapted for SQL. The appliance may provide and manage content switching and/or load balancing between connections, databases and/or database servers by applying policy expressions to parse database communications received by the appliance. Via policy expressions, for example, a policy of the appliance may provide user persistence by directing database queries from the same user to a single database connection. An appliance may manage switching between databases by applying one or more policies on a query to identify related information managed via multiple databases and/or database servers. An appliance may also provide health monitoring with respect to database queries of a particular user by using policies to identify the databases, connections and/or database servers that a user uses within a session.

In some embodiments, the appliance may identify that a SQL query is made across multiple packets. The appliance may parse any portion of a query, which may include one or more packets, only to the extent identified by a policy or needed for a particular operation. For example, the appliance may identify a database servers by parsing a first keyword of the query (e.g., in a first packet of the query) via policy expressions. The appliance may associate the database server with the query without inspecting the other packets of the query, thereby providing server persistence. This decision-making based on inspecting a first packet of a query may also reduce processing latency. In doing so, the appliance may be able to improve efficiency and performance in processing database queries. In some embodiments, the appliance uses query hashes to provide persistency to the server, e.g., similar to the mechanism employed in HTTP URL Hash Persistence. The appliance may parse a SQL hash and reduce server load by sending the same query to the same server.

In some embodiments, the appliance may provide a centralized log for database operations and/or communications. The appliance may perform logging (e.g., database audit logging) based on policies. For example, policy expressions may identify a database protocol, user, or other information for logging particular query or set of queries. Similarly, the appliance may perform tailored health monitoring using policies and policy expressions.

Although much of SQL is standard, each database implementation may include many proprietary elements. To support various database implementations, the appliance may provide different policy expressions for each implementation. By way of illustration, at least some of the policy expressions described above are MYSQL policy expressions. Some of these policy expressions may be used with or adapted for other databases.

In some embodiments, the appliance supports nested queries. A SQL query can contain nested SQL queries, for example:

SELECT t1. * from (select * from t2) as t1;
where the portion in parenthesis is a nested query. One method would be expose this as a string. Another method is to support a construct (e.g., "TYPE_CAST_TO_SQL_QUERY") which can treat a string as a SQL query and then allow any part of it to be accessible to the user through the earlier mentioned policy expression.

In some embodiments, the appliance supports multiple queries in single command. Such a single command packet can contain multiple SQL queries which are separated by a separator (e.g., ";"). The appliance can provide a control or knob to a user, to indicate to the appliance whether to parse each query to determine the presence of multiple queries.

In some embodiments, a substantial portion of requests to a database are SQL queries. The appliance may parse these queries for tracking transactions. If a policy has been configured which references a part of the query, the appliance will parse the query. In some embodiments, the appliance may parse only the portion of a query being referenced in a policy. Various sections of the query may be determined based on the presence of certain keywords like FROM, WHERE, INTO, etc. For example if a FROMPART of a query is needed, then the part of the query extending to the end of FROMPART may be parsed. In some embodiments, this parsing is performed in a streaming manner, e.g., for efficiency reasons. The state of the parser may be stored in a parameter, SqlInfo, which is similar to Httpinfo for the HTTP protocol.

In some embodiments, the appliance can monitor the health of various database servers using one or more types of monitors. The monitors may include one or more features of embodiments of monitors described above in connection with FIGS. 6A-6E. The appliance may use a TCP Monitor. This form of monitoring indicates if the database server is up or not. In some embodiments, most if not all services (e.g., including database-related services) may be monitored using a TCP monitor. In some embodiments, the appliance may use a SNMP Monitor. Database servers may expose information through SNMP. In some embodiments, a user may be able to determine the status of a server based on SNMP. In certain embodiments, an appliance may use a SQL Query Monitor. The status of database servers can be determined by first sending custom SQL queries and then inspecting the response. Such monitors can be configured on an appliance by using user-space monitors. The appliance may be configured with adequate libraries for a user to include such monitors. In cases where user space monitors are already be present, the appliance may also provide native monitors. These monitors may receive information about an SQL user, a query and/or a PIRL expression, and inspect the response to determine server status. For SQL query monitors, the appliance may provide policy expressions to read the response. By way of illustration, one embodiment of a command for adding a SQL monitor is as follows:

```
add lb monitor mysql_mon MYSQL -sql_user my_user -sql_db my_db -sql_charset utf8 -
sql_query "SELECT * FROM table1" -up_condition "MYSQL.RES.ROWS[0].COLUMN[0]
== 1"
```

In certain embodiments, since database protocols differ between one another, an appliance may distinguish a corresponding service from each database protocol to be of a different service type. In some embodiments, various services of an appliance may be configured as follows:

add lb vserver lb1 MYSQL|SQLSVR|ORACLE . . . -authentication ON|OFF
add cs vserver cs1 MYSQL|SQLSVR|ORACLE . . . -authentication ON|OFF
add service svc1 MYSQL
bind lb vserver lb1 svc1
add cs policy cspol1-rule "SQL.COMMAND==\"SELECT\""
bind cs vserver cs1 lb1-policy cspol1-priority 10
add sql user user1—password pass1

In some embodiments, by way of illustration, the appliance handles and/or facilitates handshake and/or authentication between a client (e.g., a client or server device) and a server (e.g., database server) as follows. In certain embodiments, the appliance may act as a "client" in communication with a database server. The appliance may also operate (e.g., issue or modify requests) on behalf of a client accessing a database of a database server.

Figure 12A:
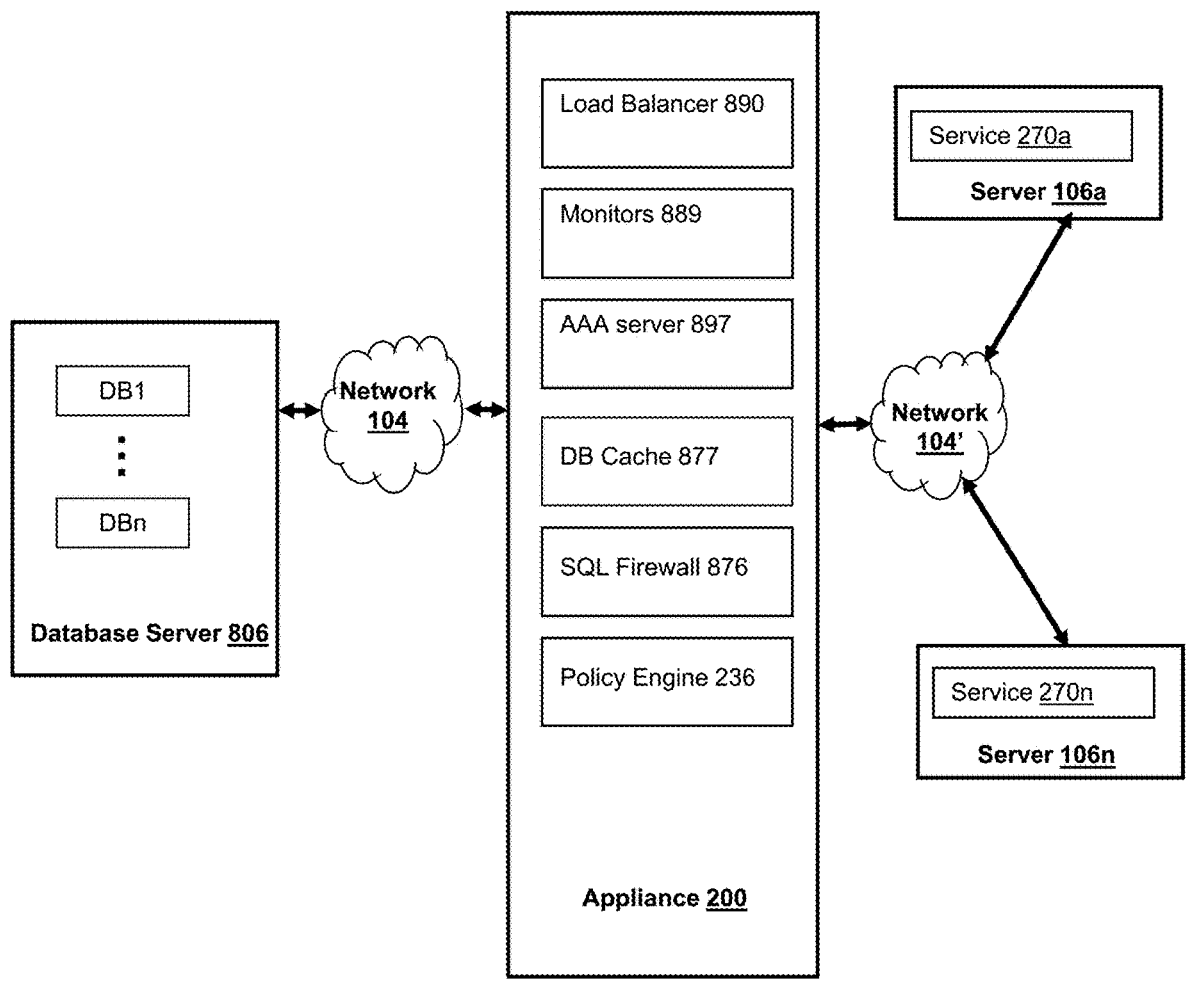
FIG. 12A is a block diagram of one embodiment of a system for selecting by an intermediary device a database from a plurality of databases to forward a structured query language (SQL) query request.
Figure 12B:
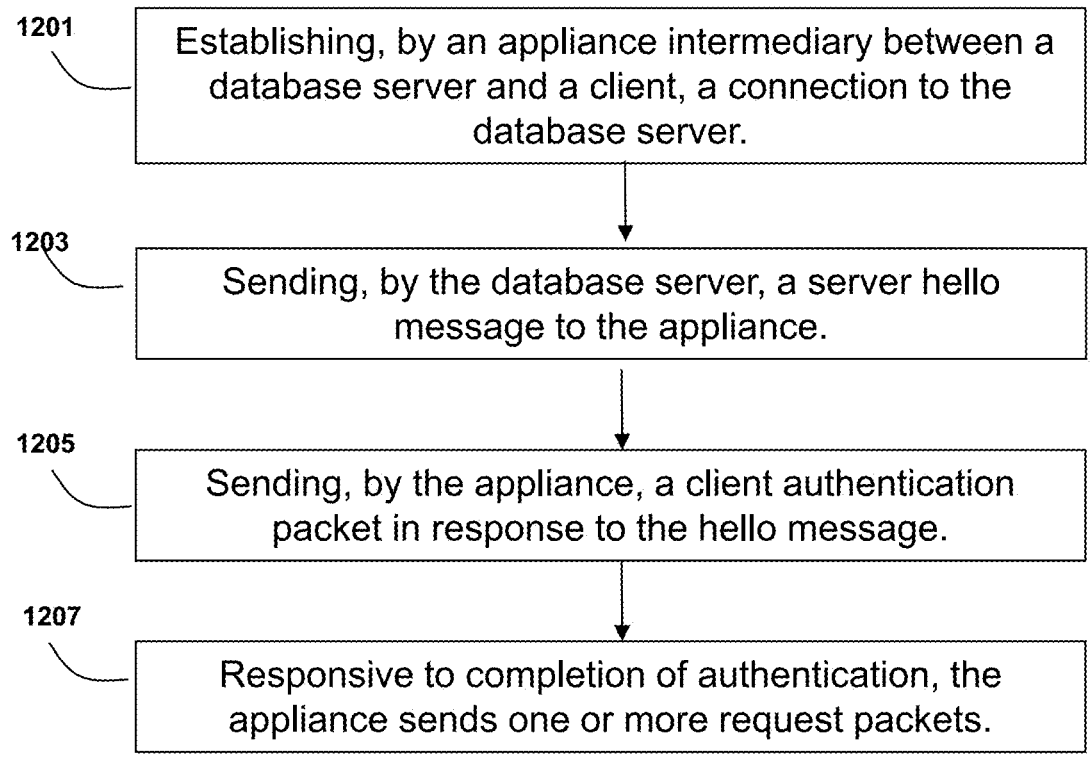
FIG. 12B is a block diagram of one embodiment of a method a system for providing database proxy services.

Referring to FIG. 12B, one embodiment of a method for providing database proxy services is depicted. In brief overview, the method includes the step of establishing, by an appliance intermediary between a database server and a client, a connection to a database server (1201). The database server sends a server hello packet to the appliance (1203). The appliance may send a client authentication packet in response to the hello packet (805). The server may generate a response (1205). Responsive to completion of authentication, the appliance may send one or more request packets (1207).

In further details of 1201, an appliance intermediary between a database server and a client establishes a connection to the database server. In some embodiments, when the appliance initiates or establishes a connection to the database server, the server may perform handshaking and/or authentication with the appliance. The server (e.g., database server) may send a hello packet (1203). In some embodiments, the database server sends a hello packet with one or more of the following details:
  protocol version: a string value.
  svr version: A string value.
  capabilities: This may indicates whether the server supports SSL,Compression, v4.1 protocol, etc. Certain capabilities may be handled with an explicit action.
  language: This may identify the current server character of the server. In some embodiments, the language is matched between the client and server connections.
  status: This may include additional information, e.g., whether the server is in autocommit or transaction mode. Other status flags may be configured or utilized.
  scramble: This may include a random key. This may identify or involve a client password, e.g., a SHA1 hashed with the random key. If there is a change of user, the same scramble may be used.

In some embodiments of 1205. the appliance may send a client authentication packet in response to the hello packet. The client or appliance may send a client authentication packet in response to the hello packet. The client authentication packet may include the following parameters or information:
  user: This may indicate an user to authenticate the connection with. In some embodiments, this is not a compulsory field as the information can be specified using a client command.
  scrambled password: This may include a password which has been SHA1 hashed. The server may authenticate the user using this password.
  database: This may indicate a database upon which subsequent queries operate on.
  capabilities: This may include one or more bits indicating the capabilities that the server passed as available. The client may leave some of the bits (i.e., capabilities) on, add others, and pass the selected capabilities back to the server. For example, a flag may indicate whether compression is supported or desired. Another flag (e.g., CLIENT_CONNECT_WITH_DB may indicate the presence of an optional databasename.
  charset_number: In some embodiments, this may be similar to the server language parameter described above. This may be used to identify cases where the client is not synchronized with the language sent by the server.
  max_packet_size: This may indicate the maximum number of bytes in a packet for the client. This may be viewed as analogous to the MSS feature in TCP. The client and server connections may be checked or configured to have the same value for this parameter.

In certain embodiments, the server may generate a response. In some embodiments, the server may generate and send a response to the appliance. This response may be an OK packet or an Error packet. In some embodiments, the response includes a result packet. The response packet can be of one or a plurality of types. The type of response may be determined by the first byte of the packet, for example.

In some embodiments, the server may generate an OK response. This type of response may indicate that the operation was successful. In case of write commands, the command may also include the number of rows affected (e.g., the number of database rows written to). This response may include a server status field. If the response is an Error packet, the connection may be closed or terminated, e.g., by the client, server and/or appliance 200.

In some embodiments, the server may generate an ERROR response. This message may be returned in case of a failure. The message may include an error code field that the appliance can interpret to identify the type and/or source of the failure, any other information related to the failure, and/or actions to take in view of the failure. The OK packet may, in some embodiments indicate completion of authentication for the requesting client or user.

In some embodiments, the server may generate a response including a result set. The result set may be generated responsive to a command from the client. The result set may comprise multiple packets which may be sent in the following order: (1) Result Set Header Packet: the number of columns, (2) Field Packets: column descriptors, (3) EOF Packet: end of Field Packets, (4) Row Data Packets: row contents, and (5) EOF Packet: end of Data Packets. The appliance may monitor the state of the packets in the result set. The second EOF may indicate the completion of the response.

The appliance may parse and/or process the received packets to interpret or identify the type of each packet. In case of packets related to monitors, data included in the packets may be parsed and/or interpreted, e.g., to obtain the health and/or status of a database. In some embodiments, the appliance is able to first ascertain a need to parse a packet (e.g., based on identification of the packet) before parsing the packet. Some of these embodiments are similar to how the appliance performs HTTP body parsing.

In further details of 1207, responsive to completion of authentication, the appliance may send one or more request packets. In some embodiments, the appliance or client may send one or more request packets. A request packet may be referred to as a command packet in some embodiments. Each request packet may be one of a plurality of types of request. The first byte of this packet may indicate or define the type of the request. By way of illustration and not intended to be limiting, some of the various types of requests or commands may include:
  COM_CHANGE_USER: this command may be used to change the user associated with the connection
  COM_INIT_DB: this command may be used to change the database
  COM_FIELD_LIST: this command be used to list fields associated with connection COM_QUERY: the command may be used to represent or include a SQL query. The SQL query may be transmitted as a text string following the command byte of the request.

Figure 12C:
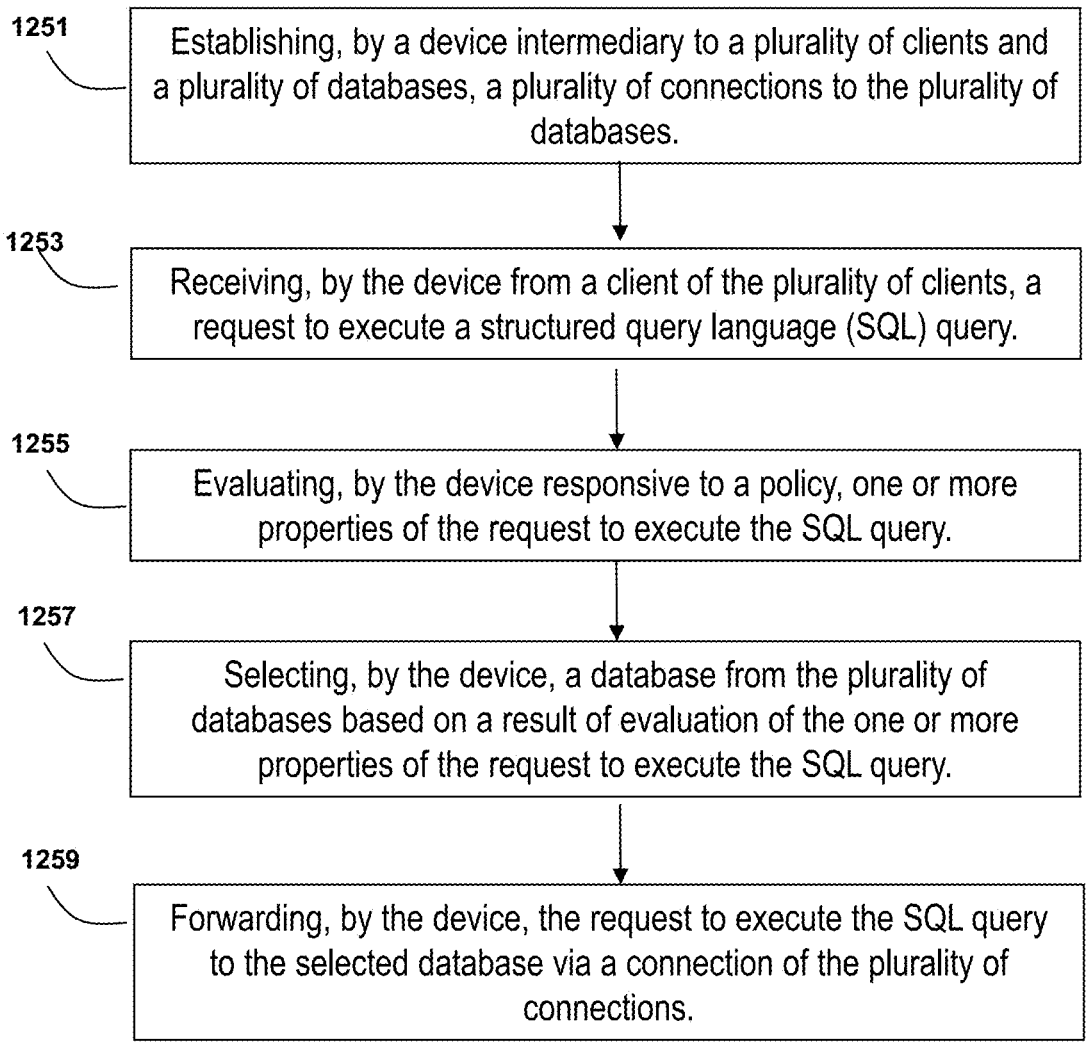
FIG. 12C is a block diagram of one embodiment of a method for selecting by an intermediary device a database from a plurality of databases to forward a structured query language (SQL) query request.

Referring to FIG. 12C, one embodiment of a method for selecting by an intermediary device a database from a plurality of databases to forward a structured query language (SQL) query request based on a property of the SQL request is depicted. In brief overview, the method includes the step of establishing, by a device intermediary to a plurality of clients and a plurality of databases, a plurality of connections to the plurality of databases (1251). The device may receive, from a client of the plurality of clients, a request to execute a structured query language (SQL) query (1253). The device may evaluate, responsive to a policy, one or more properties of the request to execute the SQL query (1255). The device may select a database from the plurality of databases based on a result of evaluation of the one or more properties of the request to execute the SQL query (1257). The device may forward the request to execute the SQL query to the selected database via a connection of the plurality of connections (1259)

In further details of 1251, a device intermediary to a plurality of clients and a plurality of databases may establish a plurality of connections to the plurality of databases or database servers (generally "databases"). In some embodiments, the device establishes a connection to a database responsive to receiving a query in connection with the database. For example, the device may determine that the query is addressed/directed to the database, or can be appropriately processed by the database. In certain embodiments, the device establishes a connection to a database, operating as a proxy of the database. The device may establish a plurality of connections to a plurality of databases to operate as a switch (e.g., access or content switch) between the databases. The device may establish a connection to a database to provide, facilitate, protect, control and/or manage access to the database. In some embodiments, (1251) may incorporate any of the steps or features discussed above in connection with (1201) of FIG. 12B.

In various embodiments, the device may establish a connection to each database server. In some embodiments, the device may establish a connection to each database residing in, or accessed via one or more database servers. Some database servers or databases may support certain character sets. The appliance may be configured to support a number of character sets, some of which may match, or is compatible with, that of certain database servers. In some embodiments, the appliance may be configured to support a matching dataset with respect to a respective database server during connection establishment.

The device may establish a pool of connections to each database of the plurality of databases. The pool of connections may include connections supporting different properties and/or variants of SQL protocol. The pool of connections may include active connections (e.g., actively handling communications) and inactive connections. The pool of connections may include some connections that are available for reuse from a previous communication session (e.g., database query or transaction). In some embodiments, the device may transmit different queries to the same database over different connections to the database. The device may multiplex, distribute or redirect SQL requests/queries from a plurality of clients, via the pool of connections, to one or more databases of the plurality of databases.

Referring now to (1253), the device may receive, from a client of the plurality of clients, a request to execute a structured query language (SQL) query. The device may receive the SQL query as a proxy for a database server. In some embodiments, the device intercepts all or some queries or requests transmitted from a client. For example, the device may be configured to intercept SQL queries or requests from a client. The device may proxy and/or process the SQL queries or requests. In some embodiments, the device performs load balancing across connections, databases and/or database servers responsive to receiving a plurality of queries or requests from one or more clients.

The device may receive the SQL query or request in any type or form of communication packet, frame or message. The device may parse and/or process received packets to interpret or identify the type of each packet. For example, the device may determine that a message includes a query in MYSQL or any other type of database protocol. The device may recognize or determine that the message or request includes a SQL query or request, for example, by parsing some portion of the message or request (e.g., header information). The device may engage in an initial handshake with the client for exchanging capabilities and/or compatibilities in a client-server relationship. The handshake may include authentication of the client. In some embodiments, the device determines that a message or request is a SQL message based on the handshaking process. The device may determine that a message or request may include a SQL message based on an identification of the destination (e.g., destination address is an IP address of a database server) and/or connection (e.g., a connection ID of a connection that supports properties of a SQL query).

In some embodiments, a SQL firewall of the device may perform checking and protection of database communications traversing the device, such as checking SQL queries and responses. The SQL firewall may allow, deny, return, filter or redirect a database query from a client, e.g., by applying one or more firewall policies. In some embodiments, the device may authenticate a user and/or client side connection to the device. The device may provide an audit point and/or authentication for funneling requests, e.g., from one or more client side connections to different server-side connections. The device may recognize or support a SQL user as a new type of user, e.g., to distinguish from a typical AAA-type user. The device may authenticate a SQL user using SQL or database-specific policies prior to assigning a server-side connection to transmit a query of the user. The device may apply SQL or database-specific policies in response to receiving a query from a SQL user.

In further details of (1255), the device may evaluate, responsive to a policy, one or more properties of the request to execute the SQL query. The device may parse queries sent by one or more clients. The device may expose and/or make portions of each request and/or response available to an administrator through policy expressions. The device may determine a type, property and/or characteristic of a SQL transaction or query. The device can then parse the body of a SQL packet based on the packet type. The device may parse a query to identify a character set of the query (e.g., extract the value of C2, to associate with a corresponding connection for example). In certain embodiments, the appliance processes multiple queries in single command or packet. In some embodiments, the device can parse and/or evaluate nested SQL queries, and may evaluate the queries according to the nested sequence.

In some embodiments, the device manages switching and/or load balancing between databases based on application of one or more policies and policy expressions on a database request or query. The device may identify or determine one or more properties related to the client, query and/or database, for example, based on information extracted from the query and/or the type of the query. One or more properties may be used by the device to identify a connection for directing a query to an appropriate database or database server. For example and in some embodiments, a character set identified based on a SQL query may be associated with a connection. The device may determine, based on the one or more properties, a connection, database and/or database server that is available and/or suitable handling the query. For example, the device may determine, via application of a policy or otherwise, that a particular existing connection is able to support SSL or data compression associated with one or more identified properties.

In certain embodiments, to support various database implementations, the appliance may provide different policy expressions for each implementation. The appliance may create, store, maintain, manage, select and/or enforce policies for processing a database query. The appliance may maintain and/or select particular policies directed to certain types of SQL queries and/or properties associated with received SQL queries. Responsive to a policy, the device may evaluate one or more properties of the request to process or redirect the SQL query. In some embodiments, the policy may specify an expression (e.g., policy expression) to evaluate the one or more properties. The one or more properties, may include a characteristic of a database connection for the request to execute the SQL query. The one or more properties or characteristics may, for example, include one or more of the following: identification of an authenticated user, a name of the database, a character set sent by the client and client's capabilities. Other embodiments of properties that can be evaluated are described above in connection with FIG. 12A.

The one or more properties or characteristics may, in certain embodiments, include one or more command parameters of the request for the SQL query. A command parameter may include one or more of the following: a size of the request and a type of command. Some embodiments of command parameters are described above in connection with FIG. 12A. In some embodiments, the policy may specify an expression to evaluate the one or more properties of the request to execute the SQL query, comprising a grammar part and a data part of the SQL query. Embodiments of these properties are described above in connection with FIG. 12A.

Referring now to (1257), the device may select a database from the plurality of databases based on a result of evaluation of the one or more properties of the request to execute the SQL query. The device may select a database that matches or is compatible with the capabilities of the client and/or SQL transaction. For example, the device may select a database that supports a character set indicated by the request or query. The device may select a database based on availability of data or content requested by the client. In some embodiments, the device may select a database from the plurality of databases based on any one or more of the following: an address or identifier of the database in the request, the level of access provided to the authenticated user, the availability of a suitable connection to the database, the proximity and/or availability of the corresponding database server, and the load on the corresponding database server.

In some embodiments, a load balancer of the device selects the database from the plurality of databases. For example, the load balancer may select a database based on least connection load balancing (e.g., the number of active and inactive connections to the database, the total number of connections to the database), availability of the respective database server, available bandwidth on a connection to the database, the amount of SQL queries processed by the database server, the number of queries buffers or queued for the database or database server, and/or other properties determined based on the request. The device may select from one of a plurality of database servers providing access to a requested content, file or type of data. The device may select from one of a plurality of servers that is consistent with, or supports the properties identified based on the received query. The device may select from one of a plurality of connections that is consistent with, or supports the properties (e.g., character set) identified based on the received query.

The device may select one of the plurality of servers and/or connections for handling the query based on application of a load balancing or other policy on one or more properties identified. In certain embodiments, the device may select one of a plurality of servers and/or connection that supports a transaction type identified based on one or more received queries. The device may select one of the plurality of servers and/or connections that is presently not handling any queries, or handling fewer queries than another server and/or connection. By way of illustration, the device may determine that one or more queries have been buffered/stored for a first connection or database server, and may select another connection or database server for handling a new query.

In some embodiments, the device determines, responsive to the result of the evaluation, that the request to execute the SQL query comprises a write query. The device may select a database that includes a master database in a master and slave configuration. In some embodiments, the device determines, responsive to the result of the evaluation, that the request to execute the SQL query comprises a read query. The device may select a database that includes a slave database in a master and slave configuration. In certain embodiments, the device determines, responsive to the result of the evaluation, that the SQL query is directed to a database corresponding to one or more of: a current connection, a present SQL transaction, a predetermined user, a predetermined database name and a predetermined table.

In certain embodiments, by recognizing certain properties using policy expressions, the device may be able to support user persistence for database communications with respect to a database connection, database, database server, and/or processing core (e.g., of a multi-core system in the device for handling SQL communications). The device can use policy expressions to maintain transaction persistence for a group of SQL communications, with respect to a database, database server, database connection, etc.

In further details of (1259), the device may forward the request to execute the SQL query to the selected database via a connection of the plurality of connections. In certain embodiments, the device selects a database that has a suitable connection to convey the request (e.g., secured with SSL). In some embodiments, the device selects a connection or establishes a connection to the database after selecting the database. In some of these embodiments, the device selects an available connection to the selected database, e.g., from a pool of established connections. The device may reconfigure an available connection to the selected database, e.g., based on the one or more properties identified. For example, the one or more properties may request SSL or local caching features to be supported. The device may select a connection that supports the requested features, or reconfigure a connection to support the requested features.

In some embodiments, the device may grant different permissions to different users (e.g., based on the identified properties). The device may assign a particular connection (e.g., supporting a certain level of access permissions) to an authenticated user to prevent multiplexing of requests between different users with different access permissions.

In certain embodiments, the device may select a connection based on a UDB of the client. The UDB may represent a data structure that stores client properties such as username, database, character set, etc. The device may select a connection that matches the UDB of the client from a pool of connections (e.g., a connection re-use pool), when making a server-side connection to the database. In some embodiments, the appliance may reconfigure a selected connection based on the query and/or one or more properties identified. In some other embodiments, the appliance may establish a new connection for sending the query to the selected database server.

In some embodiments, the device may store or buffer a plurality of queries for each connection. When the device determines that a predetermined number of queries has been accumulated or stored, the device may trigger a special mode for handling, e.g., Abort Conn Tracking Mode. In some embodiments, in response to the determination, the device may forward the queries in batch mode via the assigned connection.

By way of illustration of the methods described herein, the device may perform connection multiplexing between a plurality of databases. The device may track the beginning and end of each SQL request and response. The device may accumulate and/or parse incoming request data until the device determines the appropriate server for sending the request to. In some embodiments, the device accumulates the request header in this process. Once the server is selected or identified (e.g., via a policy determination based on properties identified in the request header), the device may identify or select a back-end connection from the server-side pool. The device may link the back-end connection to the client connection. The server-side connection may be selected based on corresponding or matching properties or parameters (e.g., user, client and/or database capabilities). In situations where a matching connection is not available, a new back-end connection may be established by the device.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

In view of the structure, functions and apparatus of the systems and methods described here, the present solution provides a dynamic, efficient and intelligent system for providing database proxying and switching. Having described certain embodiments of methods and systems for providing the monitoring in a multi-core system, it will now become apparent to one of skill in the art that other embodiments incorporating the concepts of the invention may be used. Therefore, the invention should not be limited to certain embodiments, but rather should be limited only by the spirit and scope of the present disclosure.

We claim:

1. A method comprising:
   (a) receiving, by a device intermediary to a client and a plurality of databases, a request of the client, the request comprising a structured query language (SQL) query;
   (b) identifying, by the device, one or more properties of the SQL query;
   (c) evaluating, by the device, the one or more properties of the SQL query using a policy for selecting a database from the plurality of databases for which to forward the SQL query;
   (d) selecting, by the device, the database from the plurality of databases using at least a result of evaluation of the one or more properties using the policy; and
   (e) forwarding, by the device, responsive to selecting the database from the plurality of databases, the request to the selected database.

2. The method of claim 1, further comprising establishing, by the device, one or more connections between the device and each of the plurality of databases.

3. The method of claim 2, wherein (d) further comprises selecting, by the device, a connection from the one or more connections to forward the request to the selected database.

4. The method of claim 1, wherein (c) further comprises specifying, by the policy, an expression to evaluate the one or more properties of the SQL query, wherein the one or more properties comprising a grammar part and a data part of the SQL query.

5. The method of claim 1, wherein (c) further comprises evaluating the one or more properties comprising one of the following: identification of an authenticated user, a name of the database, a character set sent by the client and client's capabilities.

6. The method of claim 1, wherein (c) further comprises evaluating the one or more properties comprising one of the following: a size of the request and a type of command.

7. The method of claim 1, wherein (c) further comprises determining, by the device responsive to the result of the evaluation, that the SQL query comprises a write query and wherein (d) further comprises selecting the database comprising a master database from the plurality of databases deployed in a master and slave configuration.

8. The method of claim 1, wherein (c) further comprises determining, by the device responsive to the result of the evaluation, that the SQL query comprises a read query and wherein (d) further comprises selecting the database comprising a slave database from the plurality of databases deployed in a master and slave configuration.

9. The method of claim 1, wherein (d) further comprises selecting, by the device, the database from the plurality of databases using load balancing.

10. The method of claim 1, wherein (e) further comprises forwarding, by the device, the request using multiplexing via one or more connections pooled between the device and the selected database.

11. A system comprising:
    a device intermediary to a client and a plurality of databases, wherein the device is configured to
        receive a request of the client, the request comprising a structured query language (SQL) query;

identify one or more properties of the SQL query of the request;

evaluate the one or more properties of the SQL query using a policy for selecting a database from the plurality of databases for which to forward the SQL query;

select the database from the plurality of databases using at least a result of evaluation of the one or more properties using the policy; and forward the request to the selected database.

12. The system of claim 11, wherein the device is further configured to establish one or more connections between the device and each of the plurality of databases.

13. The system of claim 12, wherein the device is further configured to select a connection from the one or more connections to forward the request to the selected database.

14. The system of claim 11, wherein the policy is further configured to specify an expression to evaluate the one or more properties of the SQL query, wherein the one or more properties comprising a grammar part and a data part of the SQL query.

15. The system of claim 11, wherein the device is further configured to evaluate the one or more properties comprising one of the following: identification of an authenticated user, a name of the database, a character set sent by the client and client's capabilities.

16. The system of claim 11, wherein the device is further configured to evaluate the one or more properties comprising one of the following: a size of the request and a type of command.

17. The system of claim 11, wherein the plurality of databases are deployed in a master and slave configuration and wherein the device is further configured to determine, responsive to the result of the evaluation, that the SQL query comprises a write query and to select as master database as the selected database.

18. The system of claim 11, wherein the plurality of databases are deployed in a master and slave configuration and wherein the device is further configured to determine, responsive to the result of the evaluation, that the SQL query comprises a read query and select a slave database as the selected database.

19. The system of claim 11, wherein the device is further configured to select the database from the plurality of databases using load balancing.

20. The system of claim 11, wherein the device is further configured to forward the request using multiplexing via one or more connections pooled between the device and the selected database.

* * * * *